(12) United States Patent
Iqbal et al.

(10) Patent No.: US 10,144,087 B2
(45) Date of Patent: *Dec. 4, 2018

(54) METHOD FOR MAKING A WELDING ARTICLE

(71) Applicant: KING FAHD UNIVERSITY OF PETROLEUM AND MINERALS, Dhahran (SA)

(72) Inventors: Zafar Iqbal, Dhahran (SA); Abdelrahman N. Shuaib, Phoenix, AZ (US); Necar Merah, Dhahran (SA); Nouari Saheb, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,337

(22) Filed: Jul. 18, 2018

(65) Prior Publication Data

US 2018/0318957 A1 Nov. 8, 2018

Related U.S. Application Data

(60) Continuation of application No. 15/918,849, filed on Mar. 12, 2018, which is a continuation of application
(Continued)

(51) Int. Cl.
*B23K 20/00* (2006.01)
*B23K 20/12* (2006.01)
(Continued)

(52) U.S. Cl.
CPC ............ *B23K 20/1255* (2013.01); *B22F 9/04* (2013.01); *B22F 9/14* (2013.01); *C22C 27/04* (2013.01);
(Continued)

(58) Field of Classification Search
CPC .......... B22F 2005/002; B23K 20/1255; B23K 2201/20; B23K 20/122; B23K 20/125
See application file for complete search history.

(56) References Cited

U.S. PATENT DOCUMENTS 7,357,292 B2 4/2008 Tolle et al.
9,283,637 B2 3/2016 Grant et al.
(Continued)

FOREIGN PATENT DOCUMENTS

GB 2306366 A 5/1997
JP 4721659 B2 4/2011
(Continued)

OTHER PUBLICATIONS

Todd Leonhardt, "Properties of tungsten-rhenium and tungsten-rhenium with hafnium carbide," Journal of the Minerals, Metals & Materials Society, vol. 61, No. 7, Jul. 2009.
(Continued)

*Primary Examiner* — Erin B Saad
(74) *Attorney, Agent, or Firm* — Oblon, McClelland, Maier & Neustadt, L.L.P.

(57) ABSTRACT

A friction stir welding tool comprising a composite of a tungsten-rhenium alloy and hafnium carbide particles, wherein a crystallite size of the tungsten-rhenium alloy is no more than 100 nm, wherein the hafnium carbide particles are dispersed within the tungsten-rhenium alloy, a method of fabricating the friction stir welding tool, and a method of friction stir welding a metal joint using the tool. Various embodiments of the friction stir welding tool, the method of fabricating the tool, and the method of friction stir welding using the tool are provided.

5 Claims, 73 Drawing Sheets

Related U.S. Application Data

No. 15/797,359, filed on Oct. 30, 2017, now Pat. No. 10,016,839, which is a division of application No. 15/454,706, filed on Mar. 9, 2017.

(51) Int. Cl.

| | | |
|---|---|---|
| *B22F 9/04* | (2006.01) | |
| *C22C 27/04* | (2006.01) | |
| *B22F 9/14* | (2006.01) | |
| *B23K 103/04* | (2006.01) | |

(52) U.S. Cl.
CPC ..... *B22F 2009/043* (2013.01); *B23K 2103/04* (2018.08)

(56) References Cited

U.S. PATENT DOCUMENTS

| | | |
|---|---|---|
| 2007/0119276 A1 | 5/2007 | Liu |
| 2010/0279146 A1 | 11/2010 | Rowe et al. |
| 2013/0126588 A1 | 5/2013 | Grant et al. |
| 2014/0191443 A1 | 7/2014 | Park et al. |
| 2015/0183054 A1 | 7/2015 | Okada |

FOREIGN PATENT DOCUMENTS

| | | |
|---|---|---|
| KR | 10-2015-0074269 A | 7/2015 |
| WO | WO 2005/059191 A2 | 6/2005 |
| WO | WO 2008/102209 A2 | 8/2008 |

OTHER PUBLICATIONS

C. Meran et al., "Friction Stir Welding of austenitic stainless steels," Journal of Achievements in Materials and Manufacturing Engineering, vol. 43, No. 1, Nov. 2010, pp. 432-439.

Hyun-Kuk Park et al., "Fabrication and mechanical properties of WC-10 wt % Co hard materials for a friction stir welding tool application by a spark plasma sintering process," Journal of Ceramic Processing Research, vol. 13, No. 6, 2012, pp. 705-712.

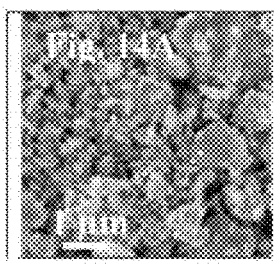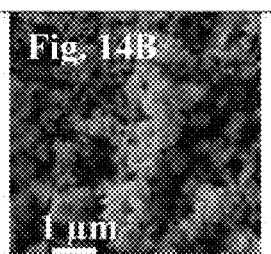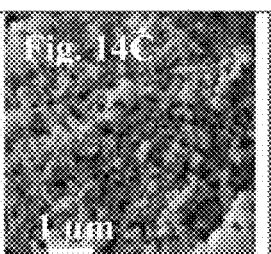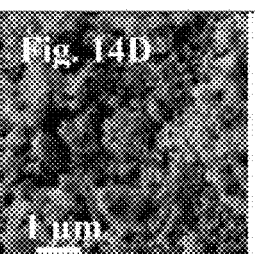

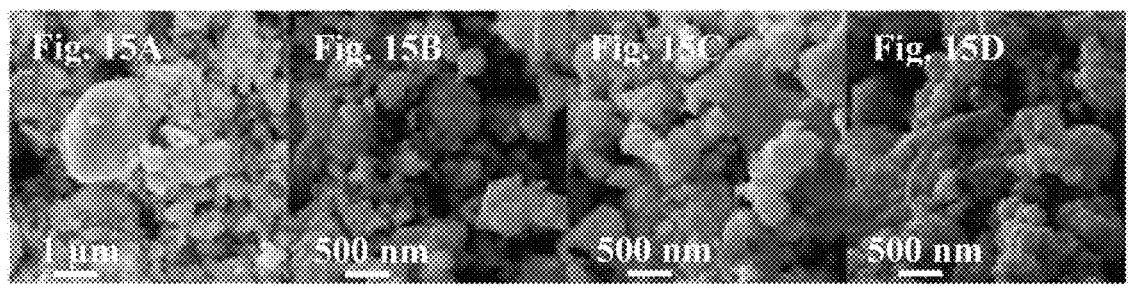

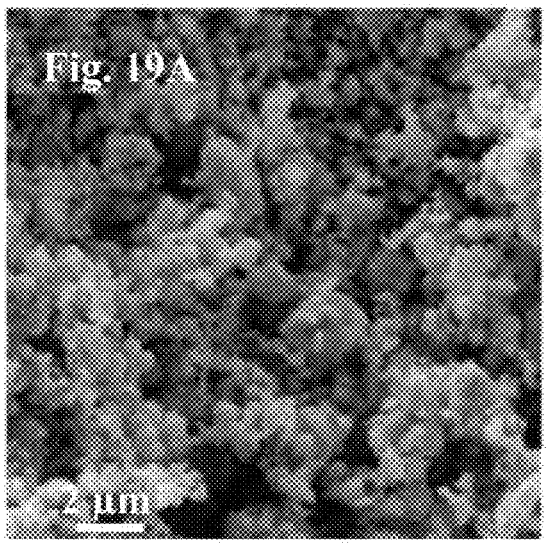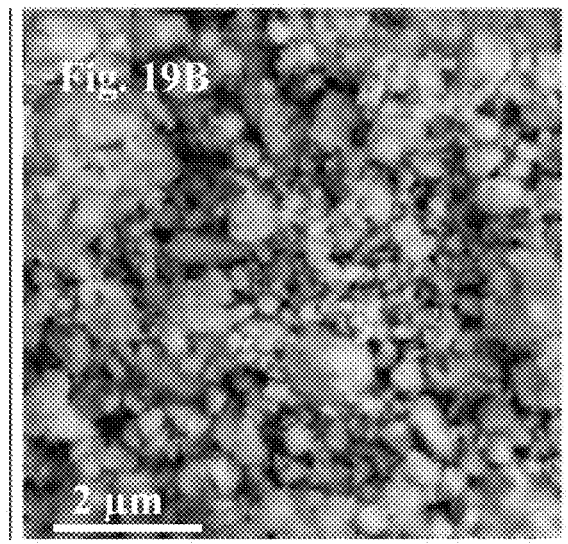

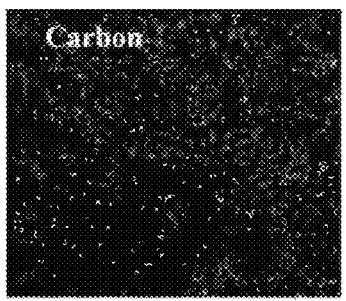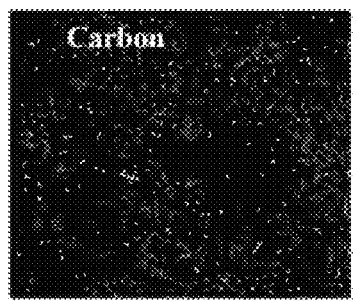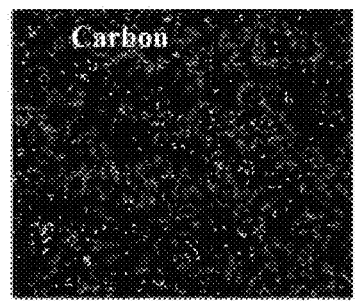
Fig. 20A Fig. 20B Fig. 20C
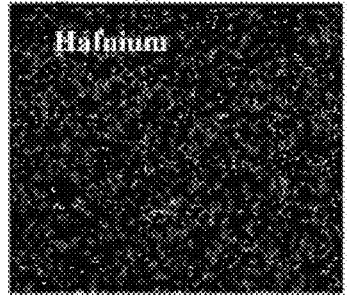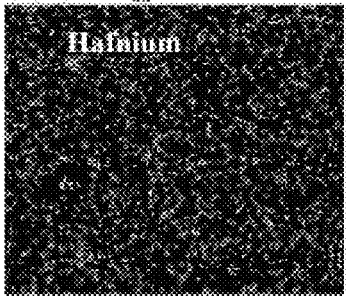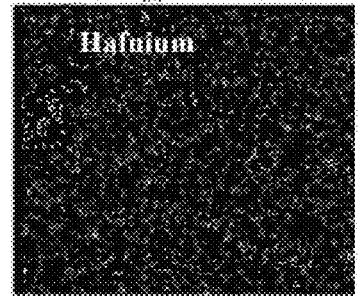

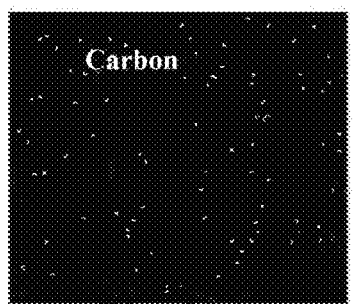
Fig. 21A
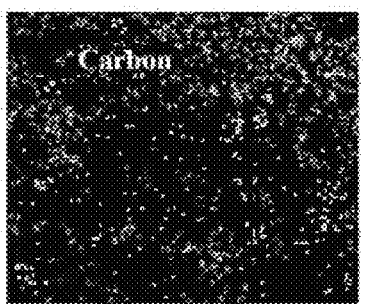
Fig. 21B
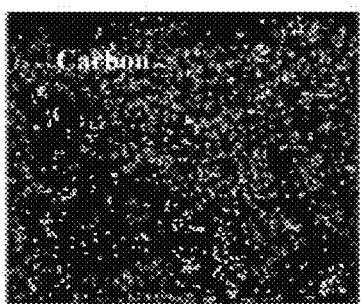
Fig. 21C
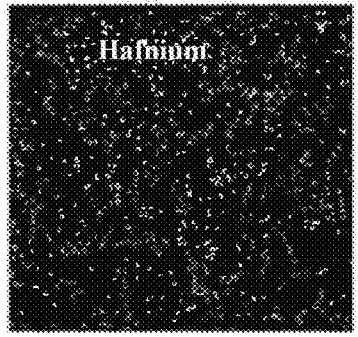
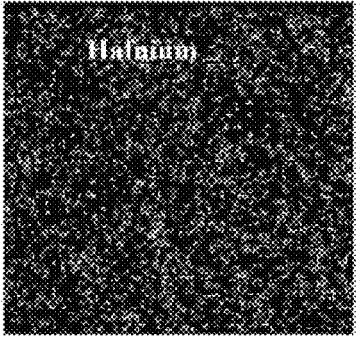
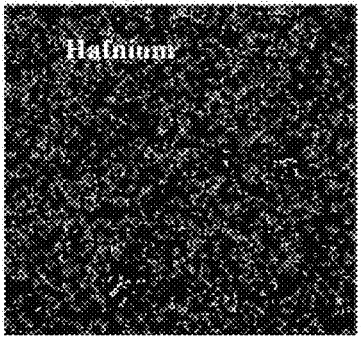

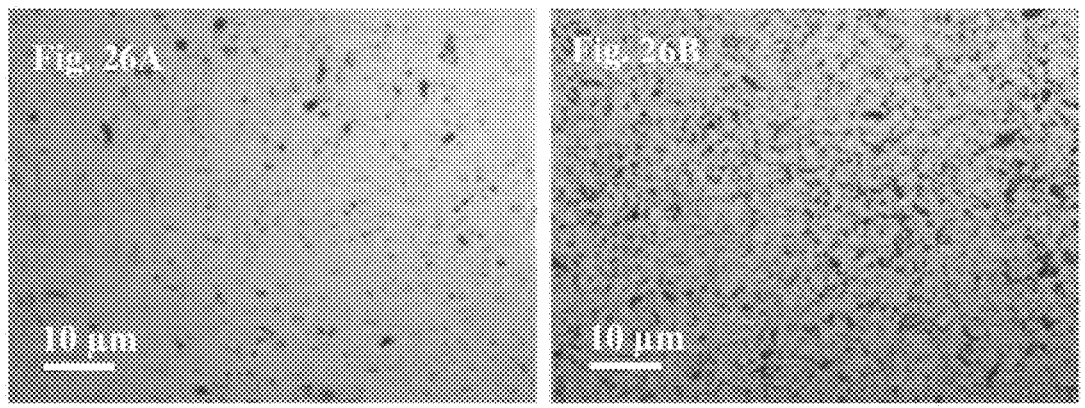

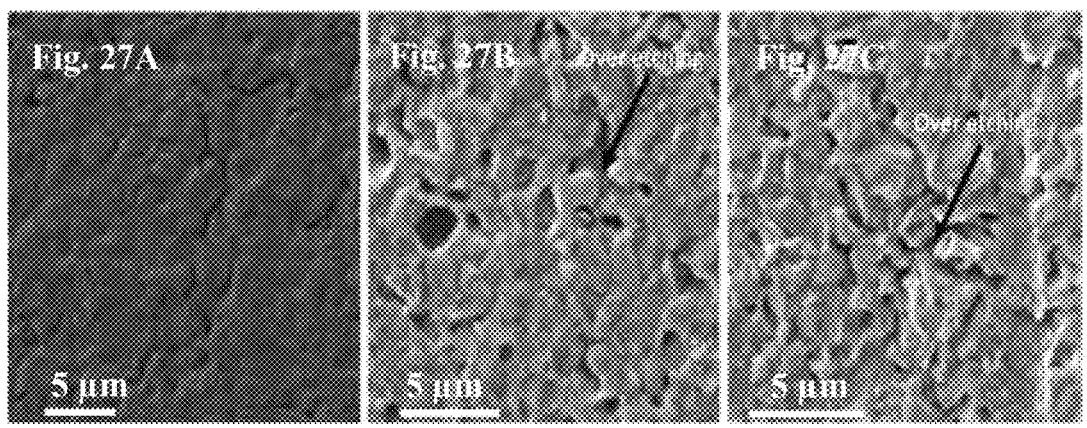

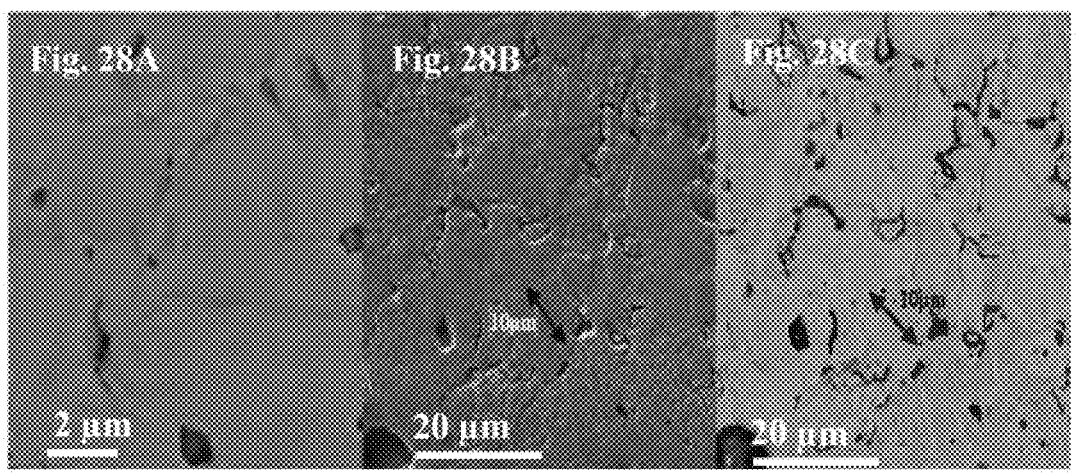

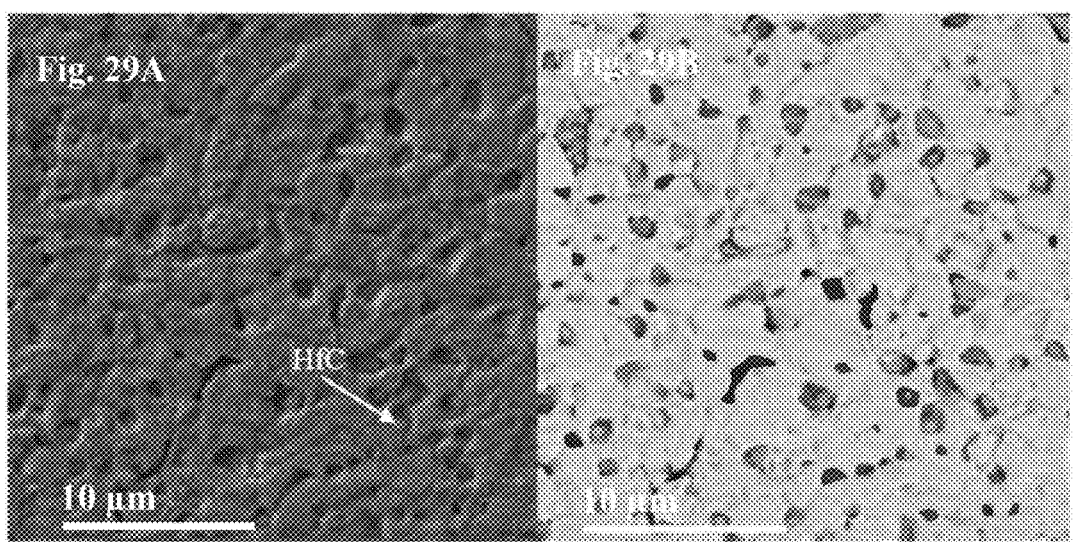

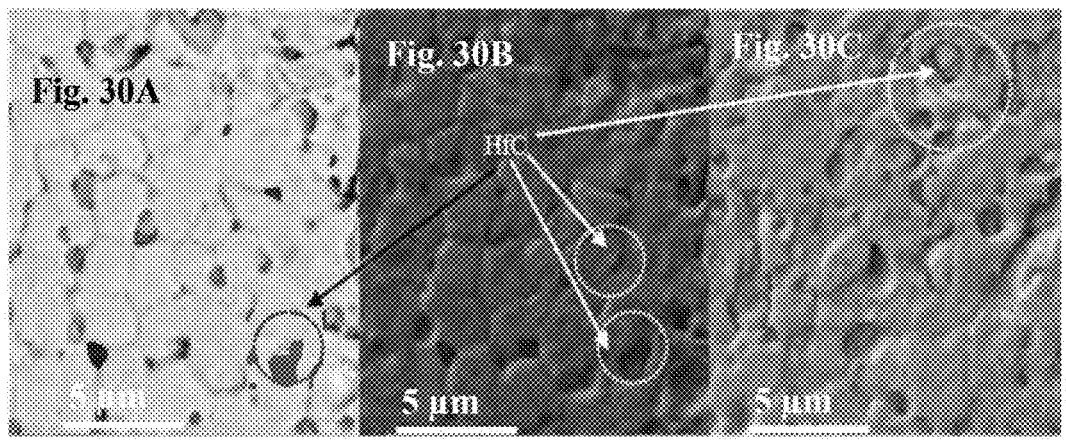

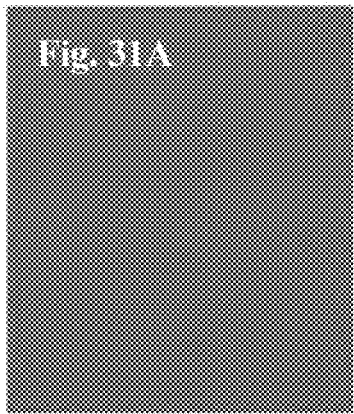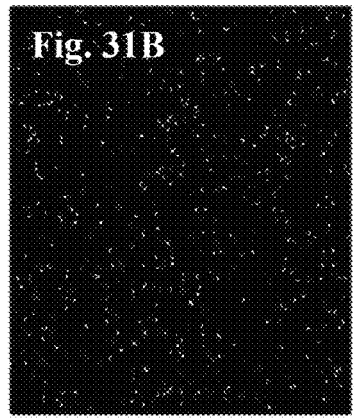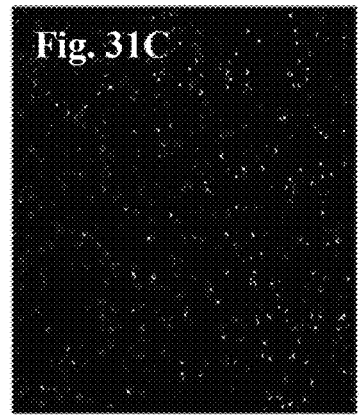

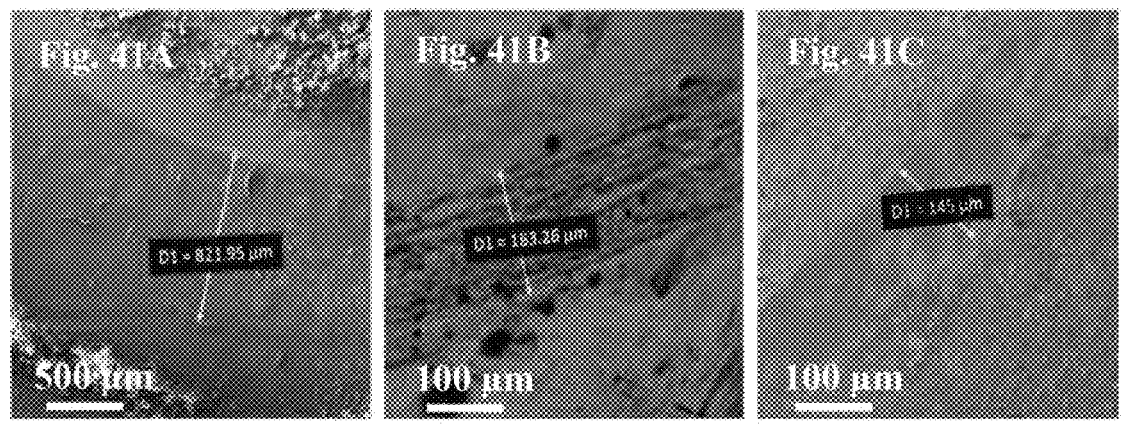

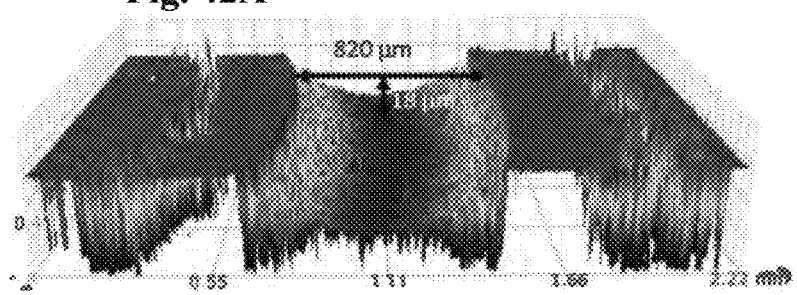
Fig. 42A
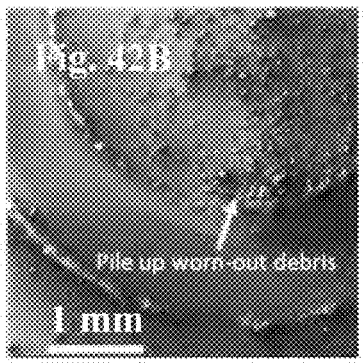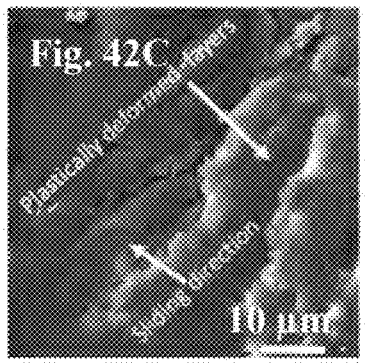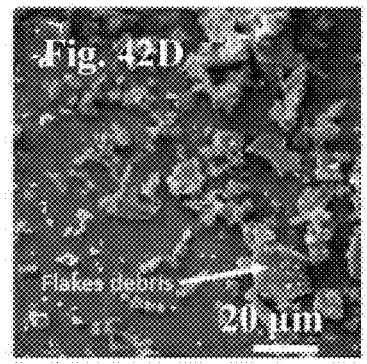

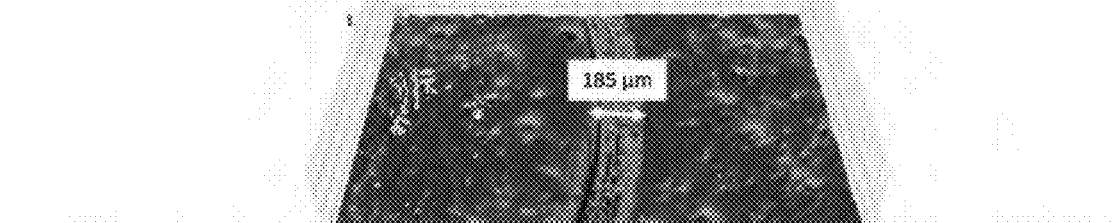
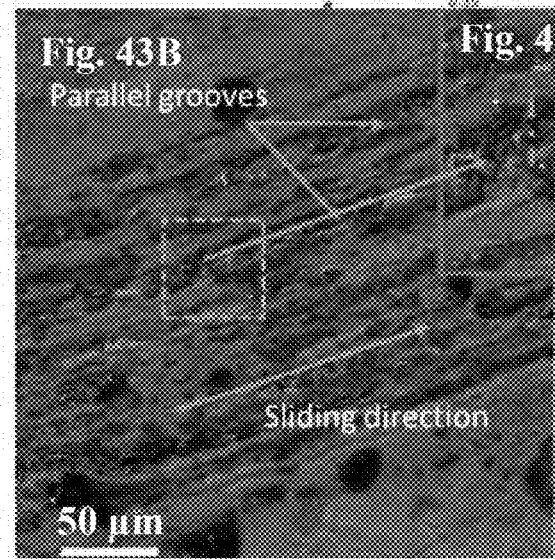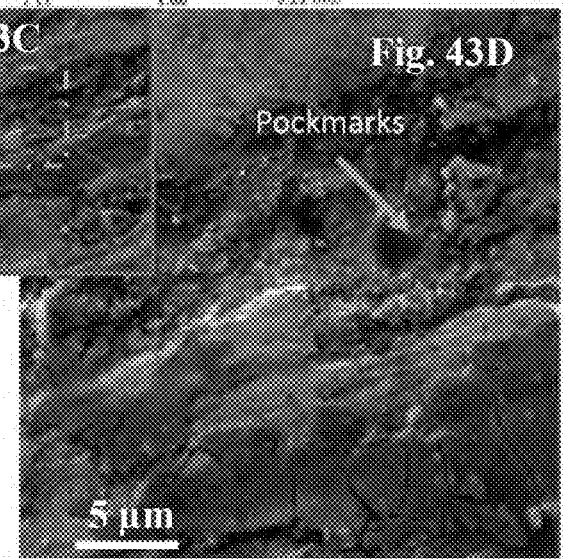
Fig. 43A
Fig. 43B Parallel grooves  Fig. 43C  Fig. 43D Pockmarks

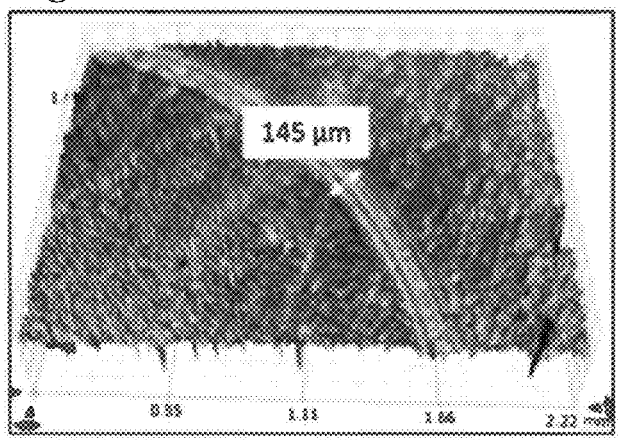
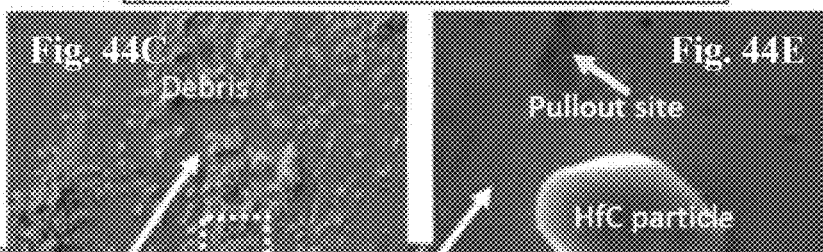
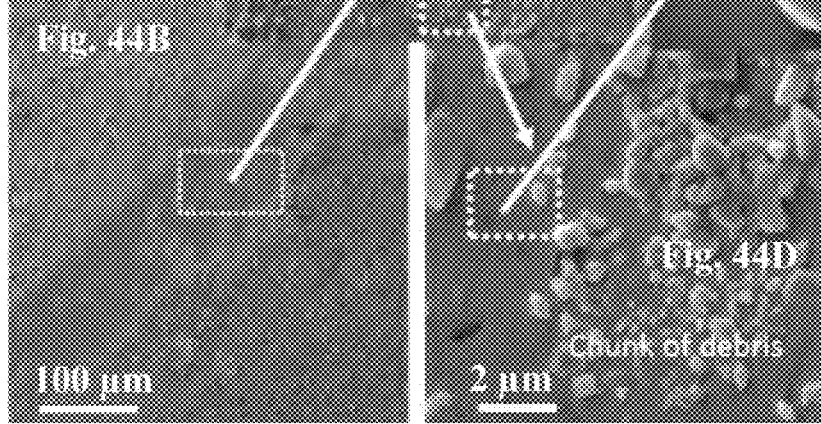

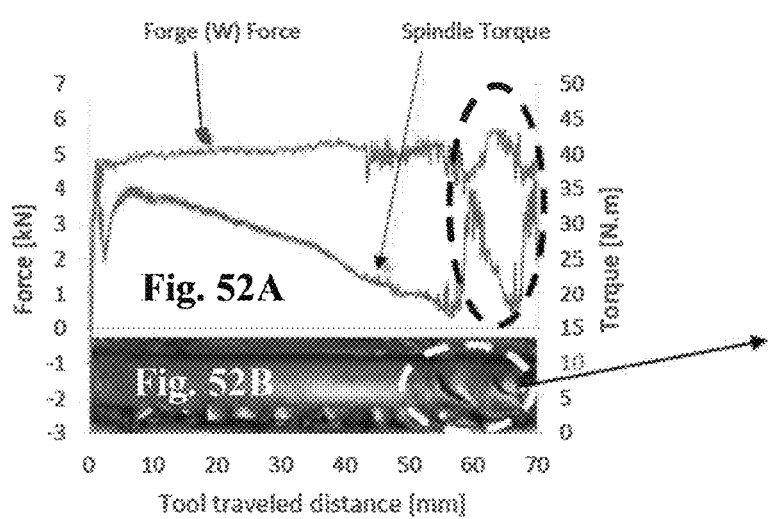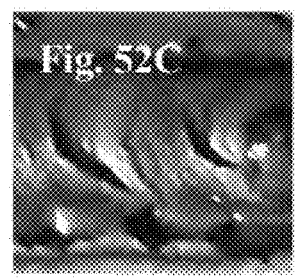

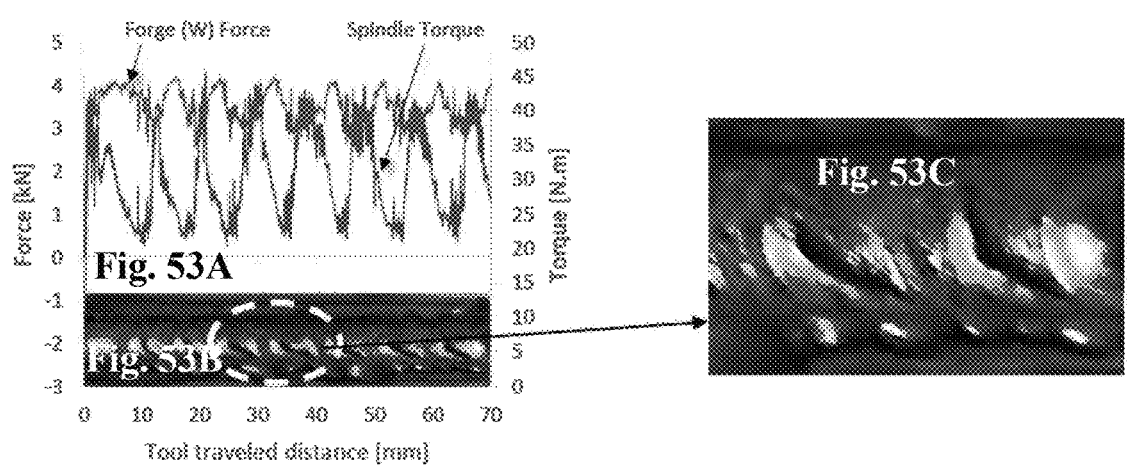

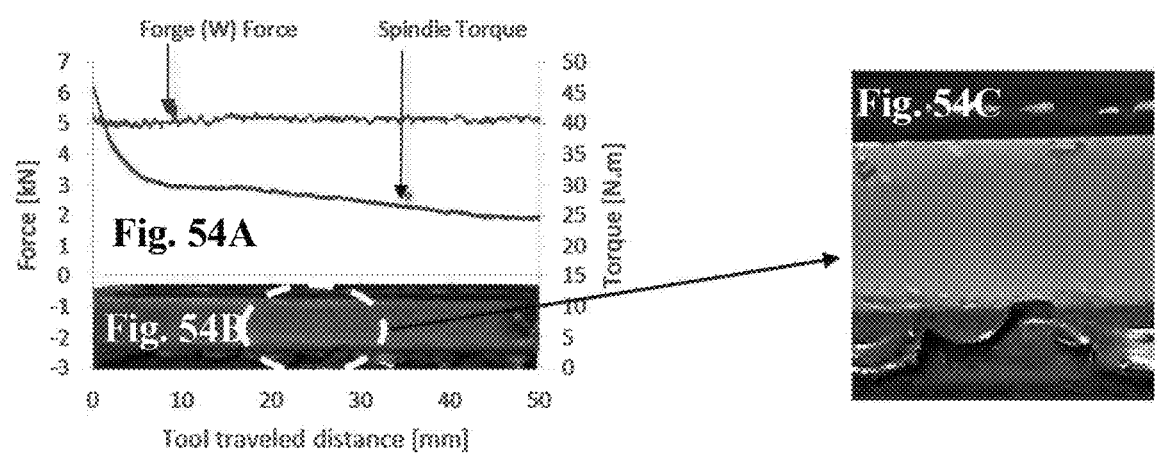

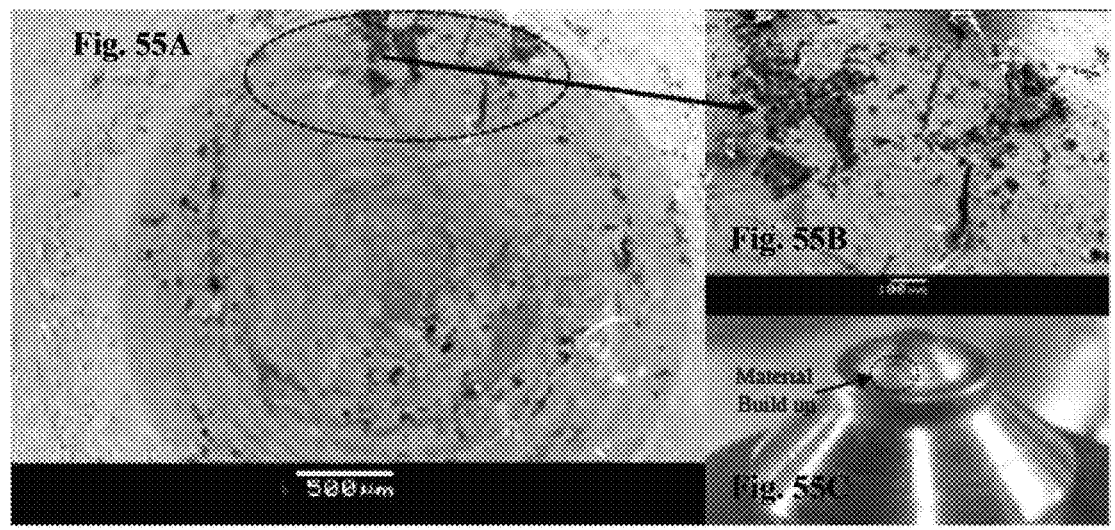

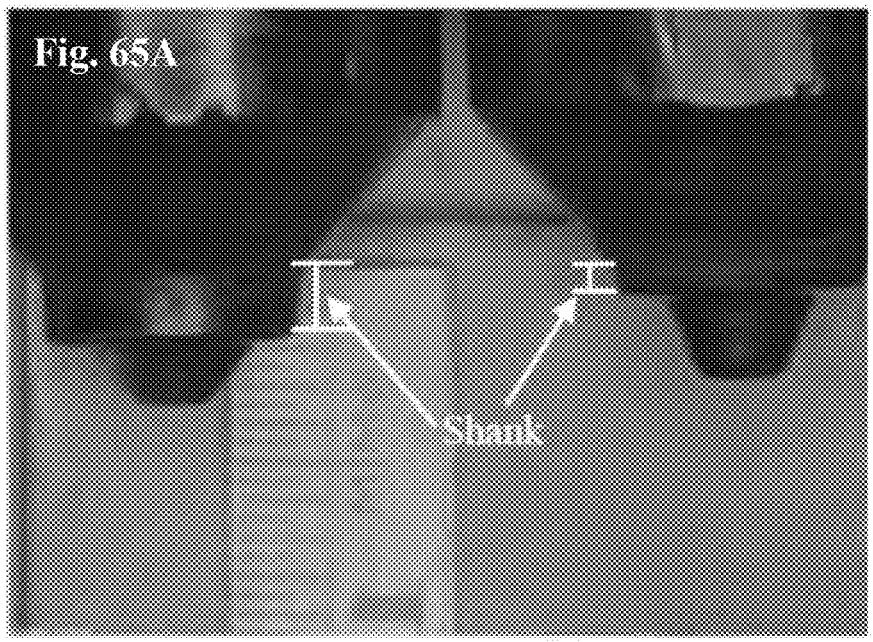
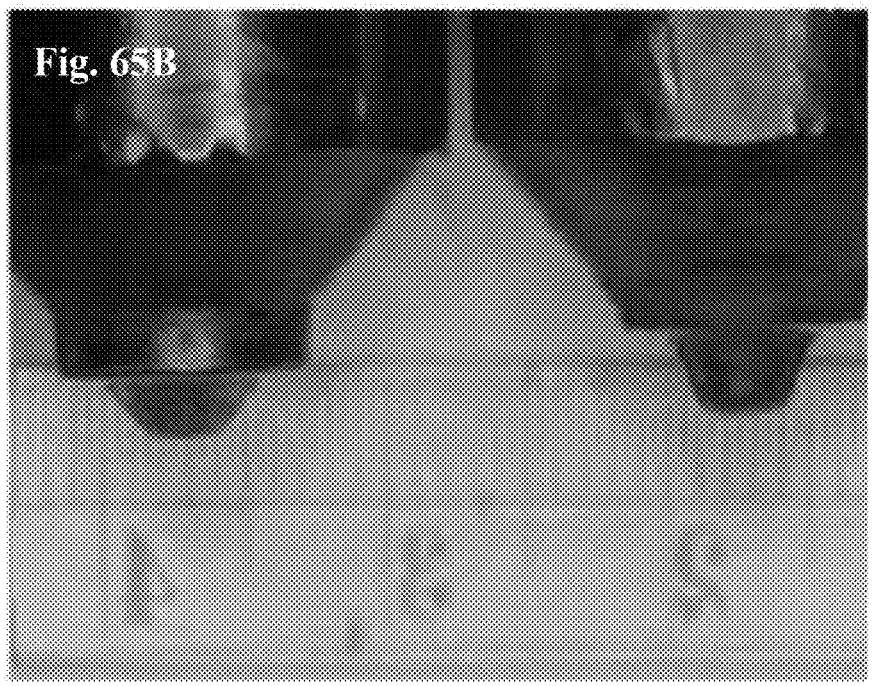

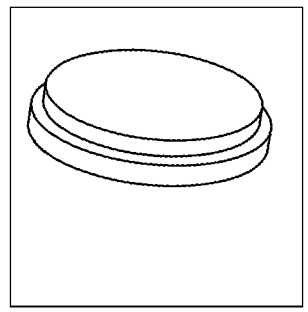
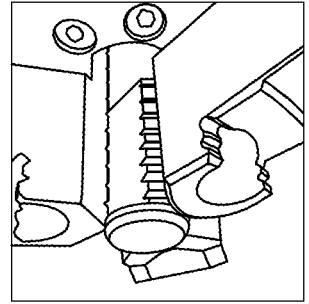
Fig. 66A    Fig. 66B
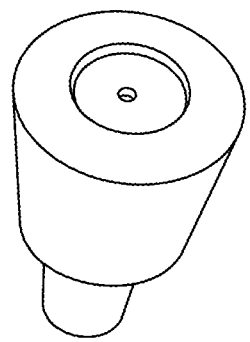
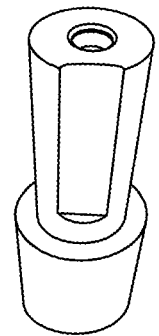
Fig. 66C    Fig. 66D
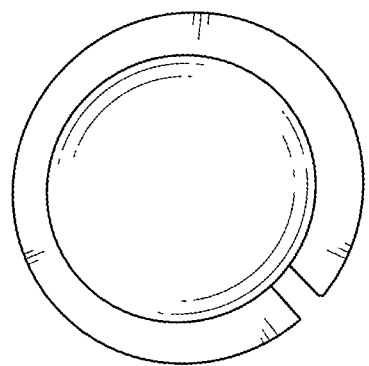
Fig. 66E

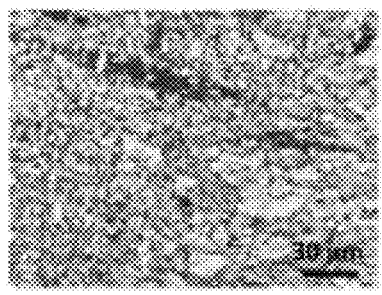 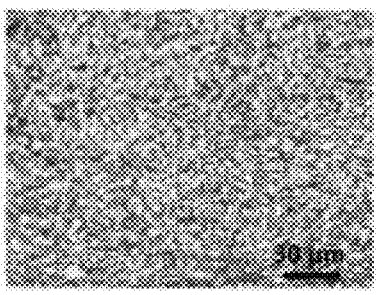 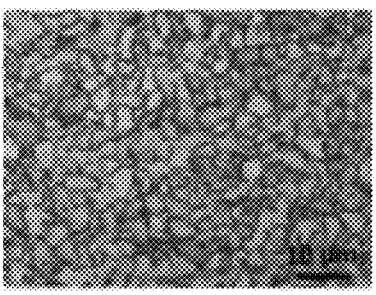
Fig. 70A                    Fig. 70B                    Fig. 70C

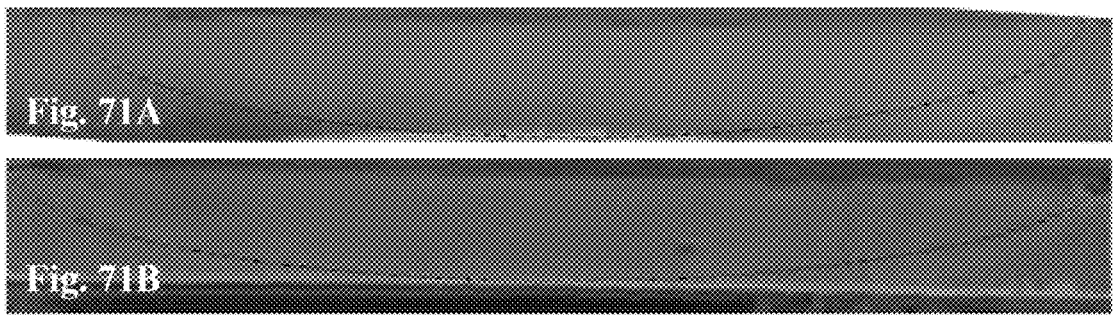

METHOD FOR MAKING A WELDING ARTICLE

CROSS-REFERENCE TO RELATED APPLICATIONS

The present application is a Continuation of Ser. No. 15/918,849, now allowed, having a filing date of Mar. 12. 2018, which is a Continuation of Ser. No. 15/797,359, now U.S. Patent No. 10/016,839, having a filing date of Oct. 30, 2017, which is a Division of Ser. No. 15/454,706, abandoned, having a filing date of Mar. 9, 2017.

STATEMENT OF FUNDING ACKNOWLEDGEMENT

The funding support provided by King Abdulaziz City for Science and Technology (KACST) through the Science and Technology Unit at King Fahd University of Petroleum and Minerals (KFUPM) under project no. NSTIP 11-ADV2130404 and NSTIP 13-ADV-2155-041 gratefully acknowledged.

BACKGROUND OF THE INVENTION

Technical Field

The present invention relates to a friction stir welding tool comprising a composite of a tungsten-rhenium alloy and hafnium carbide particles, wherein the tungsten-rhenium alloy has a crystallite size of no more than 100 nm.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Friction Stir Welding (FSW) process was invented by The Welding Institute (TWI) in 1991. See W. Konig and A. Neises: 'Wear mechanisms of ultrahard, nonmetallic cutting materials', Wear, 1993, 162, 12-21, incorporated herein by reference in its entirety. The process employs a spinning pin tool that produces frictional heat in the welding of the workpiece. The pin tool is pressed into contact with a seam to be welded. A typical FSW system is shown in FIG. 1. See M. Senmweldi and C. Metals, "ADVANCES IN TOOLING MATERIALS FOR FRICTION," pp. 1-11, 1991, incorporated herein by reference in its entirety. The base metal heats up due to the rubbing of tool faces by visco-plastic dissipation of mechanical energy at high strain rates. See Y. Gao, and R. H. Wagoner, "A simplified model for heat generation during the uniaxial tensile test", Metallurgical Transactions, 18A: 1001-1009,1987; H. C. Braga, and R. A. Barbosa, "Simulation of the increase in temperature due to adiabatic heating in hot deformation processes", Proceedings of 47th Brazilian Association of Metallurgy and Materials (ABM). Annual Conference, pp. 441-457, ABM,1992; A. C. Nunes, E. L. Jr., Bernstein, and J. C. McClure, "A rotating plug model for friction stir welding", 81st American Welding Society Annual Convention. Chicago, Ill.; Apr. 26-28, 2000, each incorporated herein by reference in their entirety. When the heat of the workpiece reaches about 80% of its melting point it becomes soft and easy to form joining.

FSW has been used for welding low melting point materials such as aluminum Microstructural examination of aluminum alloys joined by FSW exhibits several zones in the weld or bead. These are Stir Zone (SZ), Thermo-Mechanical Heat Affected Zone (TMAZ) around the nugget and Heat Affected Zone (HAZ). See L. E. Murr, G. Liu, and J. C. McClure, "A TEM study of precipitation and related microstructures in friction stir welded 6061 aluminum" Journal of Materials Science, 33: 1243-1251. 1998; C. G. Rhodes, M. W. Mahoney, W. H. Bingel, R. A. Spurling. and C. C. Bampton, "Effects of friction stir welding on microstructure of 7075 aluminum" Scripta Materiala, 36(1): 69-75, 1997; M. W. Mahoney, C. G. Rhodes, J. G. Flintoff, W. H. Bingel, and R. A. Spurling, "Properties of friction stir welded 7075 T651 aluminum" Metallurgical and Materials Transactions 29A: 1955-1964, 1998, each incorporated herein by reference in their entirety. Stir zone experiences the highest strain rates and consequently higher temperatures. See T. Weinberger, N. Enzinger, and H. Cerjak. "Microstructural and mechanical characterisation of friction stir welded 15-5PH steel" Sci. Technol. Weld. Join, vol. 3, no. 14, pp. 210-215, 2009, incorporated herein by reference in its entirety. These zones are related to thermomechanical cycle during FSW of aluminum metal and alloys.

Although the FSW process has initially been developed for joining non-ferrous materials such as aluminum, by using suitable tool materials the use of the process has been extended to harder and higher melting point materials such as steels, titanium alloys and copper. Recently, a considerable attention has been given to FSW of high melting temperature alloys such as steel, due to the process advantages over conventional welding methods, which avoids many problems of fusion welding like porosity, cracking, and solidification. See T. Weinberger, N. Enzinger, and H. Cerjak, "Microstructural and mechanical characterisation of friction stir welded 15-5PH steel" Sci. Technol. Weld. Join, vol. 3, no. 14, pp. 210-215, 2009, incorporated herein by reference in its entirety.

Finding a high strength material as the friction stir welding tool is key to the success of the process. Recent efforts have been dedicated to produce cost effective and reusable tools for Friction Stir Welding (FSW) steel and hard alloys; however, most of these efforts need improvement in tool material development aspects. See S. Park, Y. Sato, H. Kokawa, K. Okamoto, S. Hirano and M. Inagaki: 'Boride formation induced by pcBN tool wear in friction-stir-welded stainless steels', Metall. Mater. Trans. A, 2009 40A, (3), 625-636: P. L. Raffo, "Yielding and fracture in tungsten and tungsten rhenium alloys" J. Less Common Met., vol. 2, no. 17, pp. 133-149, 1969; R. Rai, H. K. D. H. Bhadeshia, and T. Debroy, "Review: friction stir welding tools," Sci. Technol., vol. 16, no. 4, pp. 325-342, 2011, each incorporated herein by reference in their entirety. FSW of these hard alloys put stringent conditions for the tool material as tool will be exposed to harsh condition during the process.

E. Y. Ivanov et al. investigated the synthesis of nanocrystalline tungsten-rhenium alloy by mechanical alloying. See E. Y. Ivanov, C. Suryanarayana, and B. D. Bryskin, "Synthesis of a nanocrystalline W-25 wt % Re alloy by mechanical alloying," vol. 251, pp. 255-261, 1998, incorporated herein by reference in its entirety. They found that mechanical alloying of a W-25 wt. % a Re powder mixture for 14hr in a high energy mill led to the development of nanocrystalline W—Re alloy. Jonathan et al. investigated the effect of temperature and holding time on the relative density of W-25% Re mixture during spark plasma sintering and it was found that with the increase of temperature and hold time, the relative density decreases as shown in FIG. 8. See Jonathan A. Webb Indrajit Charit Cory Sparks Darryl P. Butt Megan Frary Mark Carroll, "SPS Fabrication of Tungsten-Rhenium Alloys in Support of NTR" Fuels Development, Nuclear and Emerging Technologies for Space 2011, INL/CON-10-20354, incorporated herein by reference in its entirety. This is attributed to the diffusion of carbon from graphite dies.

M. A Yar et al. synthesized Nano-crystalline W-1% $Y_2O_3$ powder by a modified solution chemical reaction of ammonium paratungstate (APT) and yttrium nitrate. See M. a. Yar, S. Wahlberg, H. Bergqvist, H. G. Salem, M. Johnsson, and M. Muhammed, "Spark plasma sintering of tungsten-yttrium oxide composites from chemically synthesized nanopowders and microstructural characterization," J. Nucl. Mater., vol. 412, no. 2, pp. 227-232, May 2011, incorporated herein by reference in its entirety. Spark plasma sintering (SPS) was used to consolidate the powder at 1100 and 1200° C. for various holding times. It was found that dispersion of yttrium oxide enhanced the sinterability of W powder as compared to lanthanum oxide. Park et al. synthesized dense, ultrafine WC-10 wt. % Co tool materials by SPS and shaped the tool to perform FSW on steel. See H. Park, H. Youn, J. Ryu, H. Son, H. Bang, and I. Shon, "Fabrication and mechanical properties of WC-10 wt. % Co hard materials for a friction stir welding tool application by a spark plasma sintering process," vol. 13, no. 6, pp, 705-712, 2012, incorporated herein by reference in its entirety. They also investigated the mechanical and microstructural investigation of the tool as well as steel. Luo et al. investigated the mechanical properties of W-3.6Re-.26HfC composite at 1700-2980K and found that HfC play very important role in strengthening the alloy up to 2960 K due its outstanding thermal stability at very high temperature. See Luo, K. S. Shin, and D. L. Jacobson, "Hafnium carbide strengthening in a tungsten-rhenium matrix at ultrahigh temperatures," Acta Metall. Mater., vol. 40, no. 9, pp. 2225-2232, September 1992, incorporated herein by reference in its entirety. Mingqui et al. studied the growth behavior of HfC dispersed in the W—Re matrix and investigated the effect of its dispersion on the strength of the alloy at temperature above 2200K and they found that from 2200 K to 2600K there was little growth of HfC with very slow growth rate. See M. Liu and J. Cowley, "Hafnium carbide growth behavior and its relationship to the dispersion hardening in tungsten at high temperatures," Mater. Sci. Eng. A, vol. 160, no. 2, pp. 159-167, February 1993, incorporated herein by reference in its entirety. Rapid growth occurs after 2600K due to enhanced diffusion along the grain boundaries. John et al. studied the high temperature creep behavior of tungsten-4 wt % rhenium-0.32 wt % hafnium carbide at temperatures ranging from 2200 to 2400 K at 40-70 MPa. See J. J. Park, "Creep strength of a tungsten-rhenium-hafnium carbide alloy from 2200 to 2400 K," Mater. Sci. Eng. A, vol. 265, no. 1-2, pp. 174-178, June 1999, incorporated herein by reference in its entirety. The stress exponent for secondary stage creep was 5.2. Activation energy for this stage was found to be 594 kJ/mol. Rea et al. consolidated the W-1.3 wt % HfC by hot isostatic pressing. See K. E. Rea, V. Viswanathan, a. Kruize, J. T. M. De Hosson, S. O'Dell, T. McKechnie, S. Rajagopalan, R. Vaidyanathan, and S. Seal, "Structure and property evaluation of a vacuum plasma sprayed nanostructured tungsten-hafnium carbide bulk composite," Mater. Sci. Eng. A, vol. 477, no. 1-2, pp. 350-357, March 2008, each incorporated herein by reference in its entirety. High resolution transmission electron microscopy (HRTEM) of the consolidated sample is indicated the uniform dispersion of nanosize HfC in the tungsten matrix.

Anhua et al. presented the effects of rhenium concentration on the strength properties of the W—Re—$ThO_2$ alloys at high temperatures and the yield strength of the alloys decreased with increasing temperature due to strengthening effect of Re in the system. See A. Luo, K. Shin, and D. Jacobson, "High temperature tensile properties of W—Re—$ThO_2$ alloys," Mater. Sci. Eng. A, 1991, incorporated herein by reference in its entirety. Liu et al. investigated the effect of micro-size (0.2% Zr) alloying and nano-sized (1% $Y_2O_3$) oxide dispersion in tungsten and then sintered by SPS. Oxygen at W grain boundaries reacts with Zr to form zirconia. See R. Liu, Z. M. Xie, T. Hao, Y. Zhou, X. P. Wang, Q. F. Fang, and C. S. Liu, "Fabricating high performance tungsten alloys through zirconium micro-alloying and nano-sized yttria dispersion strengthening," vol. 451, pp. 35-39, 2014, incorporated herein by reference in its entirety.

S. K. Rakhunathan et al. studied the high energy and high rate consolidation of W and W based composites. See S. K. Raghunathan, C. Persad, and D. L. Bourell, "High-energy, High-rate Consolidation of Tungsten and Tungsten-based Composite Powders," Mater. Sci., vol. 131, pp. 243-253, 1991, incorporated herein by reference in its entirety. The pure tungsten compact exhibited a ductile failure of the infiltered copper matrix. Z. Zak Fang et al. reviewed the synthesis, sintering, and mechanical properties of nanocrystalline cemented tungsten carbide. See Z. Z. Fang, X. Wang, T. Ryu, K. S. Hwang, and H. Y. Sohn, "Int. Journal of Refractory Metals & Hard Materials Synthesis, sintering, and mechanical properties of nanocrystalline cemented tungsten carbide—A review," Int. J. Refract. Met. Hard Mater., vol. 27, no. 2, pp. 288-299, 2009, incorporated herein by reference in its entirety. They also discuss the effect of addition of grain growth inhibitor such as VC on the grain size. They reported that there was almost no grain growth up to 1100° C. and addition of VC inhibits the grain growth at higher temperatures.

David et al. studied the dislocation density as a result of implantation of ions on W—Re ions. See D. E. J. Armstrong and T. B. Britton, "Effect of dislocation density on improved radiation hardening resistance of nano-structured tungsten-rhenium," Mater. Sci. Eng. A, vol. 611, pp. 388-393, August 2014, incorporated herein by reference in its entirety. Increase in hardness measured by nanoindentation was attributed to the interaction between irradiation loop and dislocations. Dongju et al. investigated the effect of milling and sintering on the phases of HfC—W composite. See D. Lee, M. A. Umer, H. J. Ryu, and S. H. Hong, "The effect of HfC content on mechanical properties HfC—W composites," Int. J. Refract. Met. Hard Mater., vol. 44, pp. 49-53, May 2014, incorporated herein by reference in its entirety. This class of composite was spark plasma sintered at 1800° C. Ozherelyev et al. discussed the X-Ray Diffraction studies of Hf—W alloys. See V. V. Ozherelyev, a. I. Bocharov, a. V. Bondarev, and Y. V. Barmin, "X-ray diffraction study of atomic structure of Hf—W amorphous alloys," Int. J. Refract. Met. Hard Mater., vol. 48, pp. 141-144, January 2015, incorporated herein by reference in its entirety. They found that with the increase of tungsten contents, positions of the peaks shift from right to left suggesting solid solution formation.

Shuaib et al. reported the results of friction stir welding of tube-tubesheet joints made of steel. See F. A. Al-Badour, N. Merah, A. N. Shuaib, and A. Bazoune, "Experimental Investigation of Friction Stir Seal Welding of Tube-Tubesheet" Journal of Pressure Vessel Technology, Vol. 137/011402, 2015, incorporated herein by reference in its entirety. Void defects were reported at the root of some welded regions. Larger voids were observed at the joints having holes without chamfers compared to those with holes with chamfers. Chung et al. conducted a study of FSW (WC tool) for high carbon steel below and above eutectoid temperature. See C. Y. Dong, F. Hidetoshi, N. Kazuhiro, and N. Kiyoshi, "Friction stir welding of high carbon tool steel (SK85) below Eutecoid temperature" Transactions of JWRI, vol. 38, no. 1. pp. 37-41, 2009, incorporated herein by reference in its entirety. These authors reported the presence of a mixture of pearlite and cementite structure present below A1 (A1 temperature below which there will be no phase transformation) whereas all other conditions show martensite plus pearlite structure. In this investigation it was found that below A1 with 100 mm/min welding speed and 100 rpm rotation speed, the microstructure is totally pearlite and cementite whereas when conditions were changed to 200 mm/min and 400 rpm the microstructures at locations of joints were different at the top 65% was the martensite which decreases to 20% at the bottom.

B. W Ahn et al. investigated the FSW of 409L SS by using a silicon nitride tool. See B. W. Ahn, D. H. Choi, D. J. Kim, and S. B. Jung, "Microstructures and properties of friction stir welded 409L stainless steel using a Si 3 N 4 tool," Mater. Sci. Eng. A, vol. 532, pp. 476-479, 2012, incorporated herein by reference in its entirety. The base metal (BM) has hot rolled ferrite grain structure and stir zone (SZ) had an equiaxed ferrite grain structure with a diameter of approximately 50 μm. The equiaxed grain size was formed due dynamic recrystallization. Meshram et al. investigated the mechanical behavior of friction stir welding of stainless steel performed by PCBN pin tool. See M. P. Meshram, B. K. Kodli, and S. R. Dey, "Friction Stir Welding of Austenitic Stainless Steel by PCBN Tool and its Joint Analyses," Procedia Mater. Sci., vol. 6, no. Icmpc, pp. 135-139, 2014, incorporated herein by reference in its entirety. The base metal was found to have 608 MPa UTS whereas Friction stir welded sample showed 630 MPa. The weld behaved almost similar to base metal. Konkol et al. compared the Friction Stir Welding and Submerged Arc Welding of HSLA-65 Steel. See Konkol, "Comparison of Friction Stir Weldments and Submerged Arc Weldments in HSLA-65 Steel," no. July, pp. 187-195, 2007, incorporated herein by reference in its entirety. The welding of the 3 m length of HSLA-65 with the refractory alloy tool was done successfully. The W—Re pin showed almost no wear or change in length at the completion of the weld.

Zafar et al. investigated the effect of friction stir welding parameters on the weld microstructure of mild steel using a W-25% Re pin tool. See Z. Iqbal, A. N. Shuaib, F. Al-badour, N. Merah, and A. Bazoune, "Microstructure and hardness of friction stir weld bead on steel plate using W-25% Re pin tool.," Proc. ASME 2014 12th Bienn. Conf Eng. Syst. Des. Anal. ESDA Jun. 25-27, 2014, Copenhagen, Denmark, pp. 1-6, 2014, incorporated herein by reference in its entirety. The effect of tool travel speed on bead surface finish as well as bead width can be observed from FIG. 9 where the weld bead is superimposed on the load profiles of the pin tool. In the first 30 mm length of the bead, the tool was traveling at 15 mm/min zone (A). Toward the end of zone (A), two surface defects or discontinuities, marked by dashed circles, developed, which caused an increase in the magnitude of the axial welding force.

Buffa et al. investigated a quantitative analysis of the tool life in FSW of 3 mm thick Ti-6V-4Al titanium alloy sheets by using W-25% Re tool and found it successful in welding the alloy. See G. Buffa, L. Fratini, F. Micari, and L. Settineri, "On the Choice of Tool Material in Friction Stir Welding of Titanium Alloys," vol. 40, 2012, incorporated herein by reference in its entirety. Lienert et al. studied the FSW for joining of mild steel by characterizing the process of friction stir welds on mild steel by using refractory tools. See T. J. Lienert, W. L. Stellwag, Jr., B. B. Grimmett, and R. W. Warke, "Friction Stir Welding Studies on Mild Steel" Welding Research, Supplement to the Welding Journal, January, pp. 1-9. 2003, incorporated herein by reference in its entirety. Park et al. synthesized dense, ultrafine WC-10 wt. % Co tool materials by SPS and shaped the tool to perform FSW on steel. This tool was used to friction stir weld the low carbon steel sheet of thickness 2 mm. No visible defects were present in the nugget of weld. Stir zone is the region where base material comes in direct contact with the tool and heat affected zone is the region where grain growth can be found.

Thompson et al. evaluated the diffusional wear of three different Tungsten base tool with same geometry for the FSW of steel and titanium alloys. See Thompson, B., Babu, S. S., 2010, Tool degradation characterization in the friction stir welding of hard metals, Welding Journal (Miami, Fla), 89 (12): 256s-261, incorporated herein by reference in its entirety. They found that Tungsten-Titanium workpiece cross diffusion was more rapid than Tungsten-steel cross diffusion. However, microstructural investigation showed that tungsten from the tool was diffused into the steel. They also reported that W—Re and W—Re—HfC tools showed minimal tool degradation. Barnes et al. investigated the effect of tool material on developed microstructure in FS welded HSLA-65 steel. See Barnes, S. J., Bhatti, A. R., Steuwer, A., Johnson, R., Altenkirch, J., & Withers, P. J. (2012). Friction stir welding in HSLA-65 steel: part I. Influence of weld speed and tool material on microstructural development. Metallurgical and Materials Transactions A, 43(7), 2342-2355, incorporated herein by reference in its entirety. The authors compared the performance of PNCB to W-25% Re, and they found that excessive level of abrasive wear occurred on the W—Re tool as compared with PNCB tool, and it found to be increasing with tool temperature.

FSW tool wear occurs when it passes through the workpiece. The reduction in yield strength of tool may happen due to high load application and elevated temperature generated during the FSW of harder metal and alloys such as steel and titanium alloys. Wear of the tool can be due to abrasion, adhesion or diffusion. Due to the involvement of high temperature, diffusional wear can play a vital role in the tool wear. From thermodynamic point of view, Ellingham diagram can help to find out relative ability of oxidation at elevated temperature for such metallic tools. In most of the cases, tool failures are related to pin rather than shoulder as pin has to face more resistance to motion when immersed in the workpiece. Moreover, the pin has lower load bearing capability when compared to shoulder part which results in higher torsional and bending stresses in the former. Steel and titanium alloys were recently friction stir welded by W—Re alloy tool as discussed earlier.

There are several varieties of tool materials available in the markets, which include: high carbon steels, high speed steels (HSS), and cemented carbides (WC)-based and ceramics, alumina-based, silicon nitride-based, sintered polycrystalline diamond), and sintered polycrystalline cubic boron nitride (PCBN). Diamond and cubic boron nitride (BN) are known as super hard materials due to their exceptional hardness. So we can say that going from carbon steels to diamond, the tool material shows an increase in wear resistance, hardness, plastic deformation resistance, and cost while the thermal shock resistance and ease of fabrication decrease.

Cubic boron nitride (cubic BN, Knoop hardness 4700 kgfmm$^{-2}$) is not available in nature Synthesis of cubic BN requires the transformation of BN from hexagonal to cubic form at high temperature-high pressure. FIG. 5 compares important mechanical properties of friction and fusion welds with those of the parent metal. See K. Brookes, "There's more to hard materials than tungsten carbide alone," Met. Powder Rep., vol. 66, no. 2, pp. 36-37, 39-45, 2011, incorporated herein by reference in its entirety. Diamond is the hardest materials (Knoop hardness 8000 kgfmm$^{-2}$). The brittleness of some important tool materials such PCBN is a major issue that needs to be addressed.

Commercially pure tungsten (cp-W) is strong at higher temperatures but has poor toughness at room temperature. Pure tungsten exhibits high wear when utilized as a tool material for Friction Stir Welding of steels and titanium alloys. Exposure of cp-W to temperatures higher than 1473 K results in crystallization and brittleness when cooled to room temperature. Addition of Re to tungsten lowers the ductile to brittle transition temperature as a result of changing the Peierls stress for dislocation motion. This led to the development of tungsten rhenium alloys, with W-25 wt-% Re as a candidate material for FSW tools. Steels and titanium alloys are friction stir welded by W-25 wt-% Re tool. The weld microstructure can be affected due to interaction with the tool material. Wear of the tool will increase the cost of the tool if the tool has lower yield strength at elevated temperature. The tool material under investigation should have high strength, high thermal conductivity and low coefficient of thermal expansion at high temperature. The interaction of work piece with the tool is also important at high temperature. Pin tools made from PCBN and W based alloys have found to be suitable candidates for FSW of steel and titanium alloys.

PCBN (Polycrystalline Boron Nitride) and other ceramic tool materials such as $Si_3N_4$ are currently being used on commercial scale due to their high hardness and strength at elevated temperatures. However, processing PCBN involves a combination of very high temperatures and pressures. In addition, PCBN easily fail during the plunging stage due to its low toughness. Tool wear affects not only the tool life but also the weld characteristics. FSW of steels with PCBN involves boron and nitrogen pick-up from worn tool leaving the material susceptible to corrosion and pitting. Workpiece may be contaminated with Nitrogen. Nitrogen can also react with oxygen to make detrimental oxides. PCBN has high thermal conductivity (100-250 W m$^{-1}$ K$^{-1}$) which results in higher heat loss and lower workpiece temperatures.

Synthesis of the tool materials plays an important role in gauging the performance of the tool under severe conditions of friction stir welding of steel. Table 1 provides a comparison of mechanical alloying and sintering parameters for different tungsten base composites mainly consolidated by spark plasma techniques whereas Table 2 shows some other techniques used for the consolidation of tungsten base alloys and composites.

TABLE 1

List of tungsten base materials synthesized by various techniques

| System | Temp (° C.) | Sinter time (min) | Technique | Ref. |
|---|---|---|---|---|
| Pure tungsten | 1800 | 0-15 | Plasma | K. Cho, L. Kecskes, R. Dowding, B. Schuster, Q. Wei, and R. Z. Valiev, "Nanocrystalline and Ultra-Fine Grained Tungsten for Kinetic Energy Penetrator and Warhead Liner Applications," Mater. Res., no. June, 2007 |
| W—25Re | 2400 | 180 | Cold press | E. Y. Ivanov, C. Suryanarayana, and B. D. Bryskin, "Synthesis of a nanocrystalline W— 25 wt. % Re alloy by mechanical alloying," vol. 251, pp. 255-261, 1998 |
| W—Cu | — | — | — | Jonathan A. Webb Indrajit Charit Cory Sparks Darryl P. Butt Megan Frary Mark Carroll, "SPS Fabrication of Tungsten-Rhenium Alloys in Support of NTR" Fuels Development, Nuclear and Emerging Technologies for Space 2011, INL/CON-10-20354 |
| W—7Ni—0.1$Y_2O_3$ | 1500 | 30 | Cold press | S. N. Alam, "Synthesis and characterization of W—Cu nanocomposites developed by mechanical alloying," Mater. Sci. Eng. A, vol. 433, no. 1-2, pp. 161-168, October 2006 |
| W—$B_4C$ | 1700 | — | Cold press | F. Jing-lian, L. Tao, C. Hui-chao, and W. Deng-long, "Preparation of fine grain tungsten heavy alloy with high properties by mechanical alloying and yttrium oxide addition," J. Mater. Process. Technol., vol. 208, no. 1-3, pp. 463-469, November 2008 |
| W—1%$Y_2O_3$ | 1200 | 3-5 | SPS | N. Ünal, "Mechanical means help make better tungsten matrix composites," Met. Powder Rep., vol. 63, no. 10, pp. 28-33, November 2008 |
| W—5$Y_2O_3$ | 1700 | 3 | SPS | M. a. Yar, S. Wahlberg, H. Bergqvist, H. G. Salem, M. Johnsson, and M. Muhammed, "Spark plasma sintering of tungsten-yttrium oxide composites from chemically synthesized nanopowders and microstructural characterization," J. Nucl. Mater., vol. 412, no. 2, pp. 227-232, May 2011 |
| W—30 vol % HfC | 1850 | — | SPS | Y. Kim, K. H. Lee, E.-P. Kim, D.-I. Cheong, and S. H. Hong, "Fabrication of high temperature oxides dispersion strengthened tungsten composites by spark plasma sintering process," Int. J. Refract. Met. Hard Mater., vol. 27, no. 5, pp. 842-846, September 2009 |
| WC—10 wt % Co | 1200 | 12 | SPS | J. Lee, J.-H. Kim, and S. Kang, "Advanced W—HfC Cermet using In-Situ Powder and Spark Plasma Sintering," J. Alloys Compd., October 2012 |

TABLE 2

List of tungsten base composites synthesized by various techniques

| System | Sinter Temp (° C.) | time (min) | Technique | Ref. |
|---|---|---|---|---|
| W—3.6Re—0.26HfC | — | — | Arc melted | H. Park, H. Youn, J. Ryu, H. Son, H. Bang, and I. Shon, "Fabrication and mechanical properties of WC-10 wt. % Co hard materials for a friction stir welding tool application by a spark plasma sintering process," vol. 13, no. 6, pp. 705-712, 2012 |
| W—3.6Re—0.35HfC | — | — | Arc melted | Luo, K. S. Shin, and D. L. Jacobson, "Hafnium carbide strengthening in a tungsten-rhenium matrix at ultrahigh temperatures," Acta Metall. Mater., vol. 40, no. 9, pp. 2225-2232, September 1992 |
| W—4Re—0.32HfC | — | — | Arc melted | M. Liu and J. Cowley, "Hafnium carbide growth behavior and its relationship to the dispersion hardening in tungsten at high temperatures," Mater. Sci. Eng. A, vol. 160, no. 2, pp. 159-167, February 1993 |
| W—1.5HfC | 1800 | 240 | HIP | J. J. Park, "Creep strength of a tungsten-rhenium-hafnium carbide alloy from 2200 to 2400 K," Mater. Sci. Eng. A, vol. 265, no. 1-2, pp. 174-178, June 1999 |
| 90W—7Ni—3Fe | 1500 | 30 | MW | K. E. Rea, V. Viswanathan, a. Kruize, J. T. M. De Hosson, S. O'Dell, T. McKechnie, S. Rajagopalan, R. Vaidyanathan, and S. Seal, "Structure and property evaluation of a vacuum plasma sprayed nanostructured tungsten-hafnium carbide bulk composite," Mater. Sci. Eng. A, vol. 477, no. 1-2, pp. 350-357, March 2008 |

Oxidation of the above mentioned materials as a tool is also a serious concern during FSW. FIG. 6 shows the high oxidative resistance of Tungsten and Rhenium at high temperature which is the key physical property in the development and the performance of the tool during the service. The FSW tool failures are mainly attributed to diffusion and wears. Ellingham diagram shown in FIG. 6 provides information about the regions of stability of oxide formation at high temperature. FIGS. 10A and 10B show oil hardened steel tool used in friction stir welding of A16061-20 vol % Al$_2$O$_3$ composite. It was noted that wear rate decreases (due to second phase hard particles) after the initial wear.

The challenges of finding a suitable tool material for friction stir welding of steels and high temperature alloys may be addressed by manipulating tungsten base alloys and composites. Although pure tungsten (W) has sufficient strength at elevated temperatures, its application has been limited due to very low toughness, particularly at room temperature, and also a large amount of wear when used as a tool material for FSW. Since tungsten is also susceptible to embrittlement and recrystallization at temperatures higher than 1200° C., Rhenium (Re) can be added to lower the ductile to brittle transition temperature and increases the recrystallization temperature. Furthermore, hafnium carbide particles may increase a microhardness of the tool material.

In view of the forgoing, one objective of the present invention is to provide a friction stir welding tool made of a composite of a tungsten-rhenium alloy, and hafnium carbide particles, wherein the hafnium carbide particles are homogenously dispersed within the tungsten-rhenium alloy, and which is fabricated by ball-milling a solid solution of tungsten-rhenium alloy and hafnium carbide particles followed by spark-plasma-sintering. Spark-plasma-sintering the solid solution forms a composite, wherein the tungsten-rhenium alloy has a crystallite size in the range of 20 to 100 nm. Another objective of the present invention relates to a method of friction stir welding a high strength metal joint using the friction stir welding tool.

BRIEF SUMMARY OF THE INVENTION

According to a first aspect, the present disclosure relates to a friction stir welding tool, including a composite of a tungsten-rhenium alloy and hafnium carbide particles, wherein the tungsten-rhenium alloy has crystallites with a crystallite size of no more than 100 nm, and wherein the hafnium carbide particles are dispersed within the tungsten-rhenium alloy in the composite.

In one embodiment, the tungsten-rhenium alloy has a crystallite size of no more than 80 nm.

In one embodiment, a concentration of rhenium in the tungsten-rhenium alloy is in the range of 20 to 30 wt %, relative to the total weight of the tungsten-rhenium alloy.

In one embodiment, a concentration of the hafnium carbide particles is in the range of 1 to 15 vol %, relative to the total volume of the composite.

In one embodiment, the friction stir welding tool has a Vickers hardness of 400 to 550 HV at a temperature of 20 to 30° C.

In one embodiment, the friction stir welding tool has a relative density of 95% to 99%.

In one embodiment, the friction stir welding tool has a tip and a shoulder, wherein the tip has a cylindrical, a conical, a triangular, or a pyramidal geometry.

In one embodiment, the friction stir welding tool has a tip and a shoulder, wherein the shoulder is cylindrical with a diameter of 5 to 15 mm and a height of 1 to 5 mm, wherein the tip is conical with a height of 1 to 3 mm, a base diameter of 3 to 10 mm, and a head diameter of 1 to 5 min, and wherein the tip is not threaded.

In one embodiment, the friction stir welding tool has a tip and a shoulder, wherein the tip is threaded.

In one embodiment, the friction stir welding tool further includes a titanium carbide coating, which covers at least a portion of an external surface of the friction stir welding tool.

According to a second aspect, the present disclosure relates to a method of fabricating a composite of a tungsten-rhenium alloy and hafnium carbide particles, involving i) ball-milling a tungsten-rhenium alloy for no more than 25 hours to form a first powder, wherein a concentration of rhenium is in the range of 20 to 30 wt %, relative to the total weight of the tungsten-rhenium alloy, ii) mixing hafnium carbide particles with the first powder to form a second powder, wherein a concentration of hafnium carbide particles in the second powder is in the range of 1 to 15 vol %, relative to the total volume of the second powder, iii) ball-milling the second powder for no more than 15 hours to form a third powder, iv) spark-plasma-sintering the third powder at a temperature of 1500 to 2000° C. for no more than 10 minutes to form the composite of a tungsten-rhenium alloy and hafnium carbide particles, wherein the hafnium carbide particles are dispersed within the tungsten-rhenium alloy, and wherein the tungsten-rhenium alloy has a crystallite size of no more than 100 nm.

In one embodiment, the method further involves extruding the composite to form a friction stir welding tool that has a tip and a shoulder, wherein the tip has a cylindrical, a conical, a triangular, or a pyramidal geometry.

In one embodiment, a crystallite size of the tungsten-rhenium alloy in the third powder is in the range of 10 to 50 nm.

In one embodiment, the third powder is compacted with a pressure of 40 to 60 MPa during the spark-plasma-sintering.

In one embodiment, the tungsten-rhenium alloy is ball-milled in an inert atmosphere with a milling speed of 200 to 300 rpm, wherein a ball-to-powder weight ratio is in the range of 6:1 to 10:1.

In one embodiment, the second powder is ball-milled in an inert atmosphere with a milling speed of 100 to 200 rpm, wherein a ball-to-powder weight ratio is in the range of 4:1 to 6:1.

According to a third aspect, the present disclosure relates to a method of friction stir welding a metal joint, involving i) rotating a shaft of a friction stir welding machine, wherein a friction stir welding tool is secured on the shaft via a tool holder, ii) plunging the friction stir welding tool into the metal joint to melt at least a portion of the metal joint, iii) moving the shaft along the metal joint to weld the metal joint, wherein the friction stir welding tool includes a composite of a tungsten-rhenium alloy and hafnium carbide particles, wherein the tungsten-rhenium alloy has a crystallite size of no more than 100 nm.

In one embodiment, the metal joint comprises two steel plates forming a butt joint.

In one embodiment the shaft is rotated with a rotational speed of 400 to 2000 rpm.

In one embodiment, the friction stir welding tool is plunged into the metal joint with a plunging rate of no more than 5 mm/min.

In one embodiment, the shaft is moved along the metal joint with a traverse speed of 15 to 40 mm/min.

In one embodiment, the method of friction stir welding further involves i) heat-treating the tool holder at a temperature of 800 to 900° C., ii) tempering the tool holder prior to the mounting, wherein the tool holder has a hardness of 50 to 60 HRC.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14A is an FE-SEM micrograph of an alloyed W-25 wt % Re powder.

FIG. 14B is an FE-SEM micrograph of the alloyed W-25 wt % Re powder.

FIG. 14C is an FE-SEM micrograph of the alloyed W-25 wt % Re powder.

FIG. 14D is an FE-SEM micrograph of the alloyed W-25 wt % powder.

FIG. 15A is a magnified FE-SEM micrograph of the alloyed W-25 wt % Re powder.

FIG. 15B is a magnified FE-SEM micrograph of the alloyed W-25 wt % Re powder.

FIG. 15C is a magnified FE-SEM micrograph of the alloyed W-25 wt % Re powder.

FIG. 15D is a magnified FE-SEM micrograph of the alloyed W-25 wt % Re powder.

FIG. 19A is an FE-SEM micrograph of a milled composite of the alloyed W-25 wt % Re powder and 5 vol % hafnium carbide, after 15 hours of milling.

FIG. 19B is an FE-SEM micrograph of a milled composite of the alloyed W-25 wt % Re powder and 10 vol % hafnium carbide. after 15 hours of milling.

FIG. 20A is an X-ray mapping of a milled composite of the alloyed W-25 wt % Re powder and 5 vol % hafnium carbide, after 5 hours of milling.

FIG. 20B is an X-ray mapping of a milled composite of the alloyed W-25 wt % Re powder and 5 vol % hafnium carbide, after 10 hours of milling.

FIG. 20C is an X-ray mapping of a milled composite of the alloyed W-25 wt %/Re powder and 5 vol % hafnium carbide, after 15 hours of milling.

FIG. 21A is an X-ray mapping of a milled composite of the alloyed W-25 wt % Re powder and 10 vol % hafnium carbide, after 5 hours of milling.

FIG. 21B is an X-ray mapping of a milled composite of the alloyed W-25 wt %/Re powder and 10 vol % hafnium carbide, after 10 hours of milling.

FIG. 21C is an X-ray mapping of a milled composite of the alloyed W-25 wt % Re powder and 10 vol % hafnium carbide, after 15 hours of milling.

FIG. 26A is an optical image of a surface of a sintered W-25% Re after 1 second of etching.

FIG. 26B is an optical image of a surface of a sintered W-25% Re after 3 second of etching.

FIG. 27A is an FE-SEM micrograph of an etched surface of a sintered W-25% Re after 3 second of etching.

FIG. 27B is an FE-SEM micrograph of an etched surface of a sintered W-25% Re after 5 second of etching.

FIG. 27C is an FE-SEM micrograph of an etched surface of a sintered W-25% Re after 7 second of etching.

FIG. 28A is an FE-SEM micrograph of an un-etched surface of a sintered semi-alloyed W-25% Re.

FIG. 28B is an FE-SEM micrograph of an etched surface of a sintered semi-alloyed W-25% Re using secondary electron detector.

FIG. 28C is an FE-SEM micrograph of an etched surface of a sintered semi-alloyed W-25% Re using back-scatter electron detector.

FIG. 29A is an FE-SEM micrograph of an etched surface of a sintered composite of the alloyed W-25 wt %/Re powder and 5 vol % hafnium carbide using secondary electron detector.

FIG. 29B is an FE-SEM micrograph of an etched surface of a sintered composite of the alloyed W-25 wt % Re powder and 5 vol % hafnium carbide using back-scatter electron detector.

FIG. 30A is an FE-SEM micrograph of a surface of a sintered composite of the alloyed W-25 wt % Re powder and 5 vol % hafnium carbide using secondary electron detector.

FIG. 30B is an FE-SEM micrograph of a surface of a sintered composite of the alloyed W-25 wt % Re powder and 5 vol % hafnium carbide using back-scatter electron detector.

FIG. 30C is an FE-SEM micrograph of a surface of a sintered composite of the alloyed W-25 wt % Re powder and 10 vol % hafnium carbide using secondary electron detector.

FIG. 31A is an FE-SEM micrograph of a surface of a sintered composite of the alloyed W-25 wt % Re powder and 5 vol % hafnium carbide.

FIG. 31B is a mapping diagram of hafnium in a sintered composite of the alloyed W-25 wt % Re powder and 5 vol % hafnium carbide.

FIG. 31C is a mapping diagram of carbon in a sintered composite of the alloyed W-25 wt % Re powder and 5 vol % hafnium carbide.

FIG. 41A is an FE-SEM micrograph of a worn surface of the sintered W-25 wt % Re powder at a sintering temperature of 1500° C.

FIG. 41B is an FE-SEM micrograph of a worn surface of the sintered W-25 wt % Re powder at a sintering temperature of 1800° C.

FIG. 41C is an FE-SEM micrograph of a worn surface of the sintered composite of the alloyed W-25 wt % Re powder and hafnium carbide at a sintering temperature of 1800° C.

FIG. 42A is an optical illustration of the surface of the sintered W-25 wt % Re powder after the wear test, when sintering temperature is 1500° C.

FIG. 42B is an FE-SEM micrograph of the sintered W-25 wt % Re powder that shows a track of a ball after the wear test, when sintering temperature is 1500° C.

FIG. 42C is an FE-SEM micrograph of the sintered W-25 wt % Re powder that shows surface deformations after the wear test, when sintering temperature is 1500° C.

FIG. 42D is an FE-SEM micrograph of the sintered W-25 wt % Re powder that shows debris formed after the wear test, when sintering temperature is 1500° C.

FIG. 43A is an optical illustration of the surface of the sintered W-25 wt % Re powder after the wear test, when sintering temperature is 1800° C.

FIG. 43B is an FE-SEM micrograph of the sintered W-25 wt % Re powder that shows a track of a ball after the wear test, when sintering temperature is 1800° C.

FIG. 43C is a magnified FE-SEM micrograph of the sintered W-25 wt % Re powder that shows a track of a ball after the wear test, when sintering temperature is 1800° C.

FIG. 43D is an FE-SEM micrograph of the sintered W-25 wt % Re powder that shows surface deformations and debris after the Wear test, when sintering temperature is 1800° C.

FIG. 44A is an optical illustration of the surface of the sintered composite of the alloyed W-25 wt % Re powder and hafnium carbide after the wear test, when sintering temperature is 1800° C.

FIG. 44B is an FE-SEM micrograph of the surface of the sintered composite of the alloyed W-25 wt % Re powder and hafnium carbide that shows a track of a ball after the wear test, when sintering temperature is 1800° C.

FIG. 44C is an FE-SEM micrograph of the surface of the sintered composite of the alloyed W-25 wt % Re powder and hafnium carbide that shows debris formed after the wear test, when sintering temperature is 1800° C.

FIG. 44D is an FE-SEM micrograph of the surface of the sintered composite of the alloyed W-25 wt % Re powder and hafnium carbide that shows chunk of debris after the wear test, when sintering temperature is 1800° C.

FIG. 44E is a magnified FE-SEM micrograph of the debris formed.

FIG. 52A represents a forge force and a spindle torque of the friction stir welding.

FIG. 52B shows a weld beads, at a shaft rotational speed of 800 rpm, a welding speed of 15 to 40 mm/min, and a plunging depth of 1.65 mm.

FIG. 52C shows a magnified weld beads, at a shaft rotational speed of 800 rpm a welding speed of 15 to 40 mm/min, and a plunging depth of 1.65 mm.

FIG. 53A represents a forge force and a spindle torque of the friction stir welding.

FIG. 53B shows a weld beads, at a shaft rotational speed of 800 rpm, a welding speed of 15 to 40 mm/min, and a plunging depth of 1.65 mm.

FIG. 53C shows a magnified weld beads, at a shaft rotational speed of 800 rpm, a welding speed of 15 to 40 mm/min, and a plunging depth of 1.65 mm.

FIG. 54A represents a forge force and a spindle torque of the friction stir welding.

FIG. 54B shows a weld beads, at a shaft rotational speed of 800 rpm, a welding speed of 15 to 40 mm/min, and a plunging depth of 1.65 mm.

FIG. 54C shows a magnified weld beads, at a shaft rotational speed of 800 rpm, a welding, speed of 15 to 40 mm/min, and a plunging depth of 1.65 nm.

FIG. 55A is an FE-SEM micrograph of the surface of the friction stir welding tool.

FIG. 55B is a magnified FE-SEM micrograph of the surface of the friction stir welding tool that shows buildup of a base metal on the tool.

FIG. 55C is an image of the friction stir welding tool,after a friction stir welding process.

FIG. 65A is an image of the friction stir welding tool before a friction stir welding process.

FIG. 65B is an image of the friction stir welding tool after the friction stir welding process.

FIG. 66A is an image of a disc-shape friction stir welding tool.

FIG. 66B is an image of a machining setup.

FIG. 66C is an image of a tool holder for a disc-shape friction stir welding tool.

FIG. 66D is an image of a tool holder for a disc-shape friction stir welding tool.

FIG. 66E is an image of a cross-section of the tool holder that holds the disc-shape friction stir welding tool.

FIG. 67A is an image of the disc-shape friction stir welding tool in the tool holder.

FIG. 67B is an image of a stir spindle.

FIG. 67C shows coolant accessory of the friction stir welding setup.

FIG. 67D is an image of a damaged tool holder.

FIG. 67E is an image of a damaged friction stir welding tool, after the friction stir welding process.

FIG. 67F is an image of a proper friction stir welding tool, after the friction stir welding process.

Figures 68A, 68B:
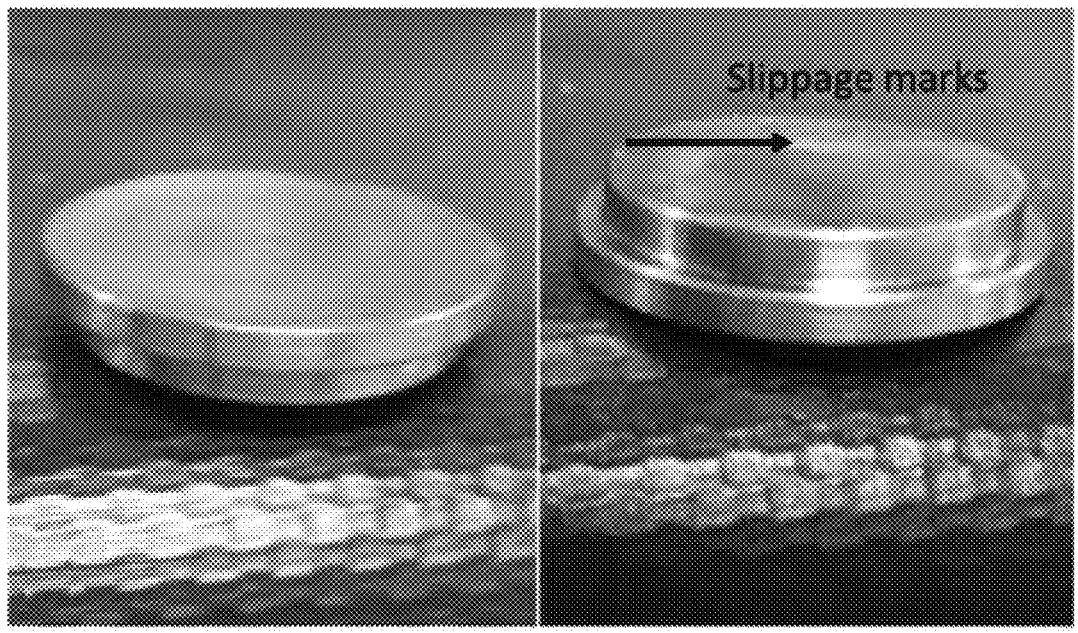

FIG. 68A is an image of a proper friction stir welding tool, before a friction stir welding process.

FIG. 68B is an image of a proper friction stir welding tool, after a friction stir welding process.

Figures 69A, 69B, 69C:
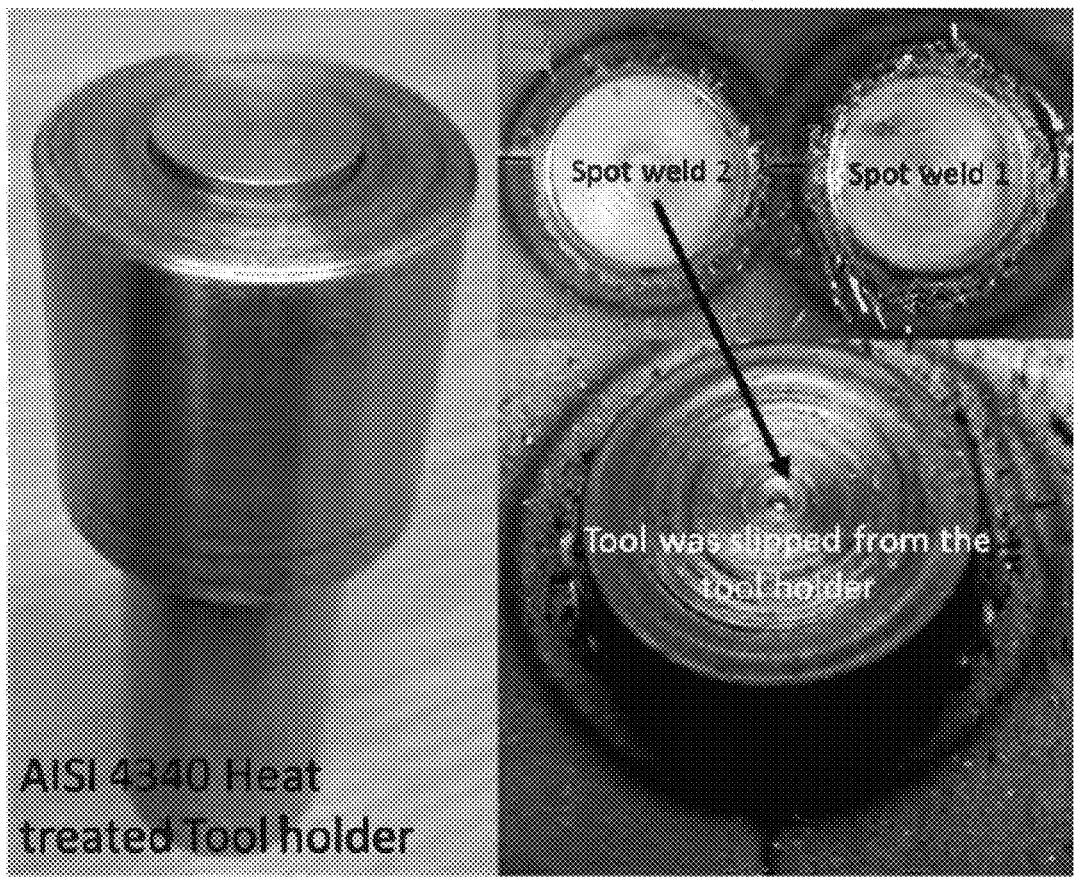

FIG. 69A is an image of the disc-shape friction stir welding tool in the tool holder.

FIG. 69B is an image of spot welds on a slipped friction stir welding tool.

FIG. 69C is an image of a friction stir welding tool that is slipped from a tool holder.

FIG. 70A is an optical image of a base metal, after a friction stir spot welding process at a shaft rotational speed of 800 rpm.

FIG. 70B is an optical image of the base metal near the stir zone, after a friction stir spot welding process at a shaft rotational speed of 800 rpm.

FIG. 70C is a magnified optical image of the base metal near the stir zone, after a friction stir spot welding process at a shaft rotational speed of 800 rpm.

FIG. 71A shows the quality of the base metal after a friction stir spot welding process at a shaft rotational speed of 500 rpm.

FIG. 71B shows the quality of the base metal after a friction stir spot welding process at a shaft rotational speed of 600 rpm.

Figure 72:
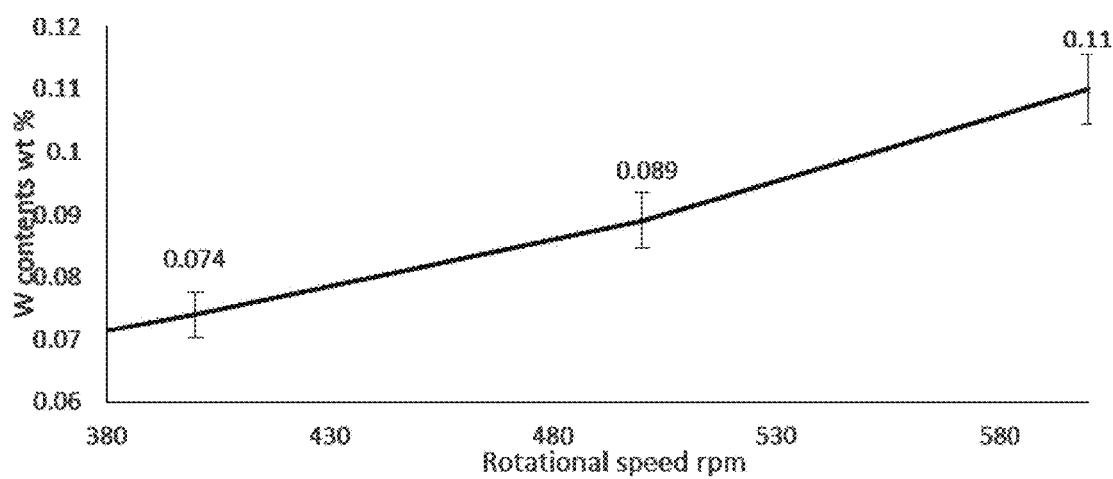

FIG. 72 represents a diffusion of tungsten from the tool to the base metal after a friction stir spot welding process at various shaft rotational speeds.

DETAILED DESCRIPTION OF THE EMBODIMENTS

According to a first aspect, the present disclosure relates to a friction stir welding tool, including a composite of a tungsten-rhenium alloy and hafnium carbide particles, wherein the tungsten-rhenium alloy has crystallites with an average crystallite size of no more than 100 nm, preferably no more than 95 nm preferably no more than 90 nm, preferably no more than 85 nm. Preferably, an average crystallite size of the tungsten-rhenium alloy in the composite is in the range of 20 to 100 nm, preferably 30 to 95 nm, preferably 40 to 90 nm, preferably 45 to 85 nm, preferably 50 to 80 nm, preferably 60 to 75 nm, preferably 65 to 73 nm.

The term "composite" as used herein refers to a solid solution of tungsten-rhenium alloy and hafnium carbide particles after being spark-plasma-sintered.

Figure 25:
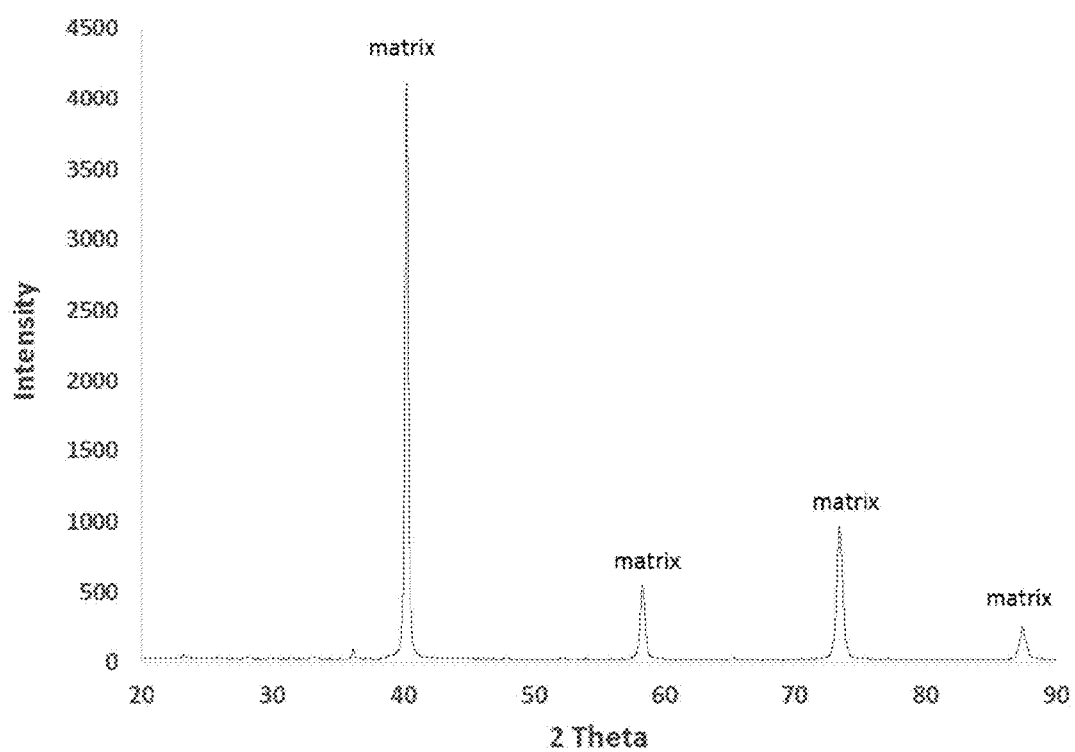
FIG. 25 is an XRD spectrum of the sintered composite of the alloyed W-25 wt % Re powder and 5 vol % hafnium carbide.
Figure 33:
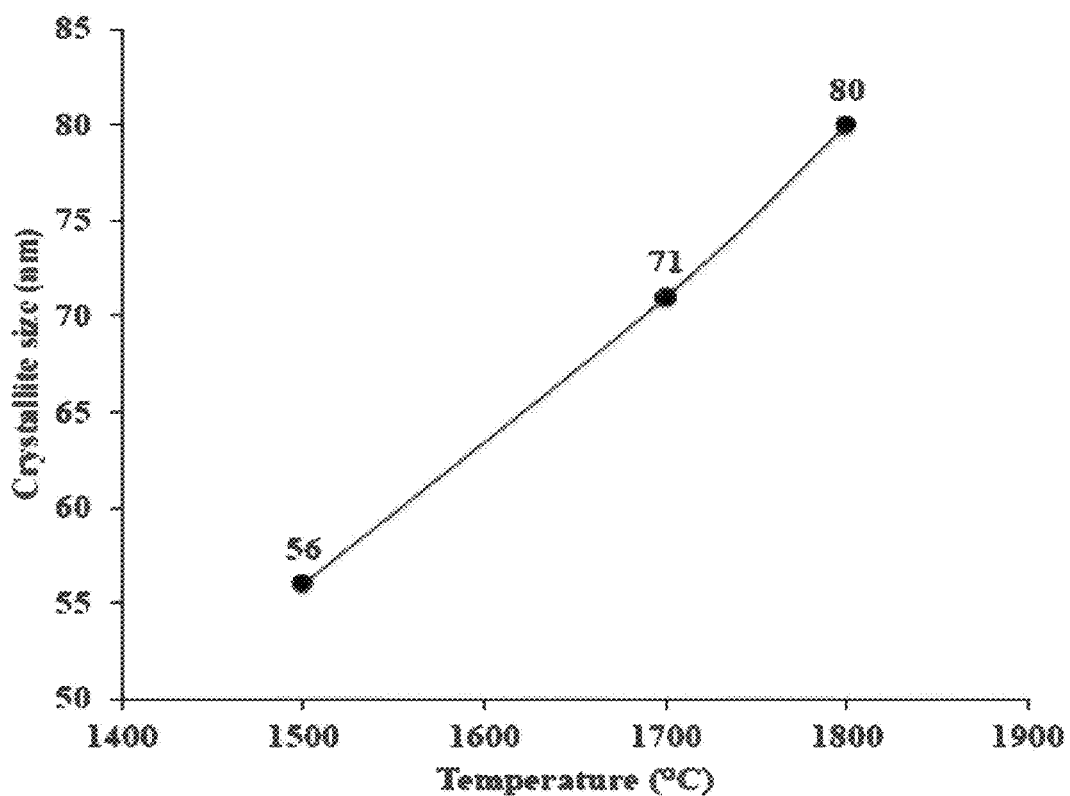
FIG. 33 represents a crystallite size of the sintered W-25 wt % Re powder at different sintering temperatures.

The term "crystallite" as used herein refers to a sub-grain structural element of the tungsten-rhenium alloy. In one embodiment, the average crystallite size of the tungsten-rhenium alloy in the composite is calculated from peak broadening of corresponding peaks in an XRD spectrum (as shown in FIG. 25) of the composite via the Williamson method, according to the following equation:

$$\beta_{tot}\cos\theta = C\varepsilon*\sin\theta + \frac{K\lambda}{L}$$

wherein $\beta_{tot}$ is the broadening of a diffraction peak in the XRD spectrum, $\theta$ is the angle in which the diffraction peak appeared, $C\varepsilon$ is the crystallite strain, K is the Schemer constant, $\lambda$ is the wavelength of the x-ray, and L is the crystallite size. Accordingly, an average crystallite size of the tungsten-rhenium alloy in the composite is calculated and values are depicted in FIG. 33, with respect to corresponding sintering temperatures of the composite. See Zak, A. Khorsand, et al. "X-ray analysis of ZnO nanoparticles by Williamson-Hall and size-strain plot methods." Solid State Sciences 13.1 (2011): 251-256.

The term "grain" as used herein refers to a structural element of the composite that contains tungsten-rhenium alloy. A grain may include a plurality of crystallites. A grain of the alloy in the composite may have an average grain size in the range of 0.1 to 10 μm, preferably 0.2 to 5 μm, preferably 0.5 to 4 μm, preferably 1 to 3 μm, preferably 1.5 to 2 μm. In one embodiment, the average grain size of the composite is measured via SEM micrographs from a surface of the composite. Accordingly, Scanning Electron Microscope (SEM) images as presented in FIG. 29 and FIG. 30 provide information about grain size.

In one embodiment, an average crystallite size of the tungsten-rhenium alloy in the composite (i.e. after being spark-plasma-sintered) is five times, preferably four times, preferably three times larger than an average crystallite size of the tungsten-rhenium alloy before being spark-plasma-sintered. Accordingly, the average crystallite size of the tungsten-rhenium alloy may be in the range of 1-60 nm, preferably 2-50 nm, preferably 5-40 nm, preferably 10-30 nm before spark-plasma sintering, wherein the average crystallite size of the tungsten-rhenium alloy is in the range of 20 to 100 nm, preferably 30 to 95 nm, preferably 40 to 90 nm, preferably 45 to 85 nm, preferably 50 to 80 nm after spark-plasma sintering.

In one embodiment, the composite includes substantially equiaxed grains of the tungsten-rhenium alloy. The term "equiaxed grains" as used herein refers to grains that have axes with substantially similar lengths. In another embodiment, the composite includes grains of the tungsten-rhenium alloy with an even size distribution. For example, in one embodiment, in any 500 μm³, preferably 600 μm³, preferably 700 μm³, preferably 800 μm³, preferably 900 μm³, preferably 1000 μm³ volume of the composite, at least 80%, preferably at least 85%, preferably at least 90%, preferably at least 95%, preferably at least 99% of the grains have a grain size within 1% standard deviation of the average grain size.

In one embodiment, a concentration of rhenium in the tungsten-rhenium alloy is in the range of 20 to 30 wt %, preferably 21 to 29 wt %, preferably 22 to 28 wt %, preferably 23 to 27 wt %, preferably 24 to 26 wt %, preferably about 25 wt %, relative to the total weight of the tungsten-rhenium alloy.

In one embodiment, a volumetric concentration of the hafnium carbide particles in the composite is in the range of 1 to 15 vol %, preferably 2 to 14 vol %, preferably 3 to 13 vol %, preferably 4 to 12 vol %, preferably 5 to 11 vol %, preferably 5 to 10 vol %, relative to the total volume of the composite. Accordingly, a volume fraction of the hafnium carbide particles in the composite is in the range of 0.01 to 0.15, preferably 0.02 to 0.14, preferably 0.03 to 0.13, preferably 0.04 to 0.12, preferably 0.05 to 0.11, preferably 0.05 to 0.1.

In one embodiment, the hafnium carbide particles are present in the composite in a size range of less than 3 μm, preferably less than 2 μm, preferably less than 1 μm, preferably less than 500 nm, preferably less than 200 nm, preferably less than 100 nm, preferably less than 50 nm, preferably less than 20 rim, preferably less than 15 nm, preferably less than 10 nm. The hafnium carbide particles may have various particulate shape including spherical, cylindrical, disc-shape, star-shape, pyramidal, conical, cubical, etc. In a preferred embodiment, the hafnium carbide particles are spherical with a diameter of less than 2 μm, preferably less than 1 μm, preferably less than 500 nm, preferably less than 200 nm, preferably less than 100 nm, preferably less than 50 nm, preferably less than 20 nm, preferably less than 15 nm, preferably less than 10 nm. In another embodiment, the hafnium carbide particles may be agglomerated within the composite, however, the size of agglomerations when present is less than preferably less than 2 μm, preferably less than 1 μm, preferably less than 500 nm, preferably less than 200 nm, preferably less than 100 nm, preferably less than 50 nm. In one embodiment, the hafnium carbide particles act as grain growth inhibitors during sintering, thus form a composite having an average grain size of 0.1 to 5 µm, preferably 0.5 to 4 µm, preferably 1 to 3 µm, preferably 1.5 to 2 µm.

In a preferred embodiment, the hafnium carbide particles are homogenously dispersed within the composite. The term "homogenously dispersed" as used herein refers to an embodiment where a volume fraction of the hafnium carbide particles in any 500 µm$^3$ or less, preferably 600 µm$^3$ or less, preferably 700 µm$^3$ or less, preferably 800 µm$^3$ or less, preferably 900 µm$^3$ or less, preferably 1000 µm$^3$ or less volume of the composite falls within 5%, preferably 2%, more preferably 1% standard deviation of the mean volume fraction of the hafnium carbide particles. For example, in one embodiment, the hafnium carbide particles are homogenously dispersed, wherein in any 500 µm$^3$ or less, preferably 600 µm$^3$ or less, preferably 700 µm$^3$ or less, preferably 800 µm$^3$ or less, preferably 900 µm$^3$ or less, preferably 1000 µm$^3$ or less volume of the composite, the mean volume fraction of the hafnium carbide particles falls within 5%, preferably 2%, more preferably 1% of 0.05.

In one embodiment, the composite has a Vickers hardness of at least 25%, preferably at least 30%, more preferably at least 35% higher than a Vickers hardness of the tungsten-rhenium alloy, when hardness is measured at a temperature in the range of 20 to 30° C., preferably 22 to 28° C., preferably 24 to 26° C., preferably about 25° C. For example, in one embodiment, a Vickers hardness of the tungsten-rhenium alloy is in the range of 350 to 450 HV, preferably 355 to 430 HV, preferably 360 to 420 HV, wherein a Vickers hardness of the composite is in the range of 400 to 550 HV, preferably 420 to 540 HV, preferably 440 to 530 HV, preferably 460 to 520 HV, preferably 480 to 500 HV, preferably 490 to 498 HV, preferably about 498 HV. Vickers hardness is a measure of a resistance of a solid matter to a permanent deformation when a compressive force is applied.

In another embodiment, the composite includes 3 to 7 vol %, preferably 4 to 6 vol %, preferably about 5 vol % of the hafnium carbide particles, wherein the tool has a Vickers hardness of 400 to 500 HV, preferably 420 to 480 HV, preferably about 450 HV, at a temperature in the range of 20 to 30° C., preferably 22 to 28° C., preferably 24 to 26° C., preferably about 25° C. In another embodiment, the composite includes 8 to 12 vol %, preferably 9 to 11 vol %, preferably about 10 vol % of the hafnium carbide particles, wherein the tool has a Vickers hardness of 450 to 550 HV, preferably 490 to 500 HV, preferably about 495 HV, at a temperature in the range of 20 to 30° C., preferably 22 to 28° C., preferably 24 to 26° C., preferably about 25° C.

In one embodiment, the composite has a relative density in the range of 90% to 99%, preferably 95% to 98%, preferably 96% to 97%. The term "relative density" as used herein refers to a density of the composite, relative to a density of a composite that has a substantially similar composition with a porosity of zero. Accordingly, in another embodiment, the composite has a porosity in the range of 0.01 to 1%, preferably 0.05 to 0.5%, preferably 0.06 to 0.4%, preferably 0.07 to 0.3%, preferably 0.08 to 0.2%, preferably about 0.1%.

Figure 1:
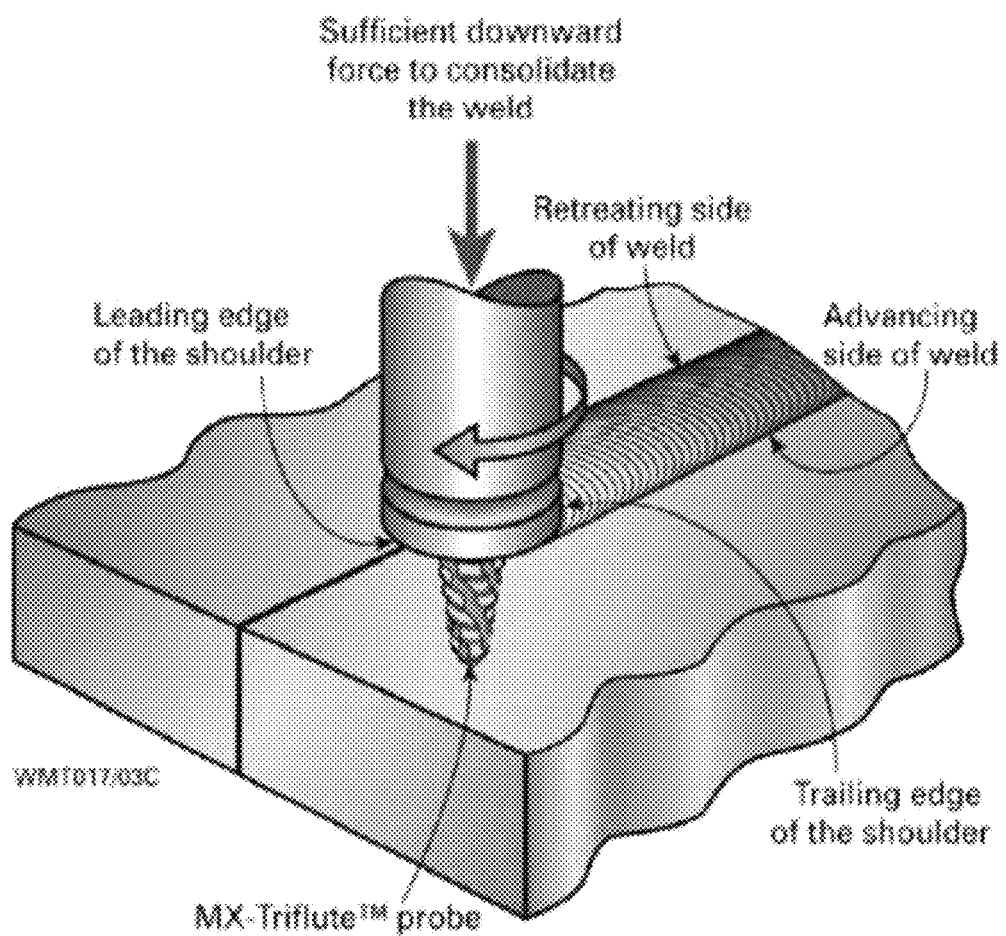
FIG. 1 is a schematic of a friction stir welding (FSW) process.
Figure 2:
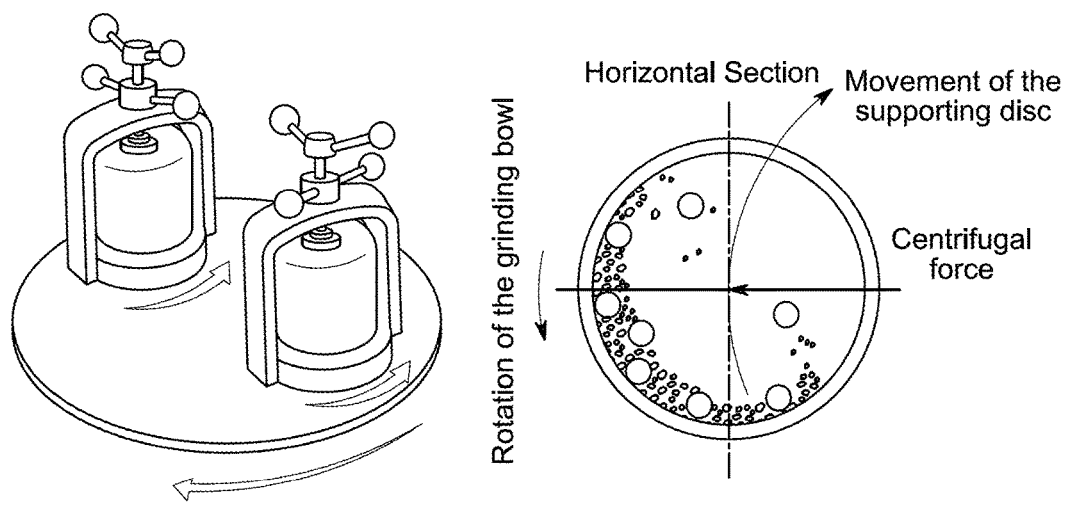
FIG. 2 is a schematic drawing of a planetary ball mill.
Figure 3:
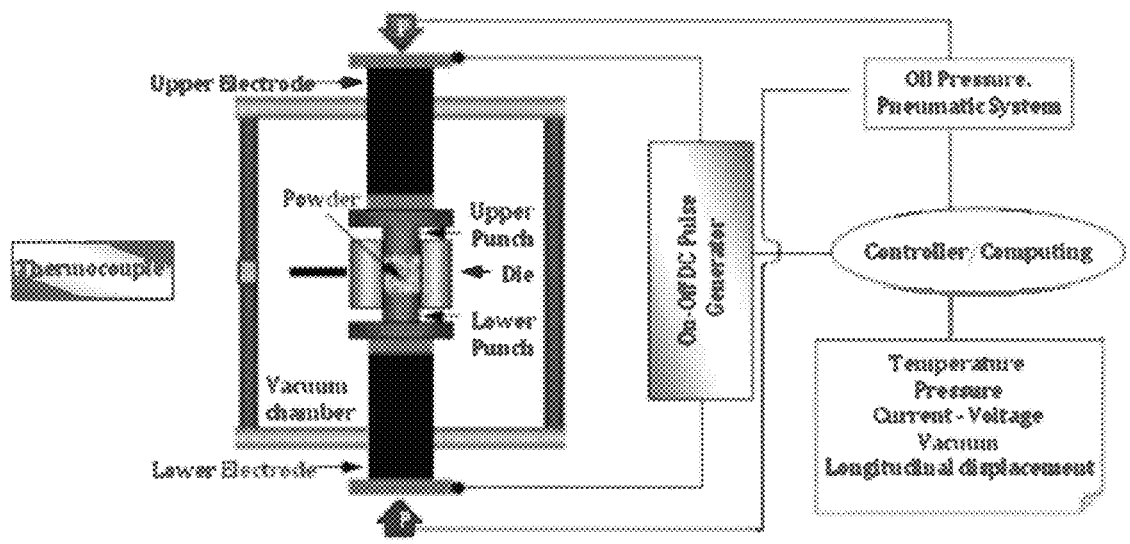
FIG. 3 is a schematic of a spark-plasma-sintering process.
Figure 4:
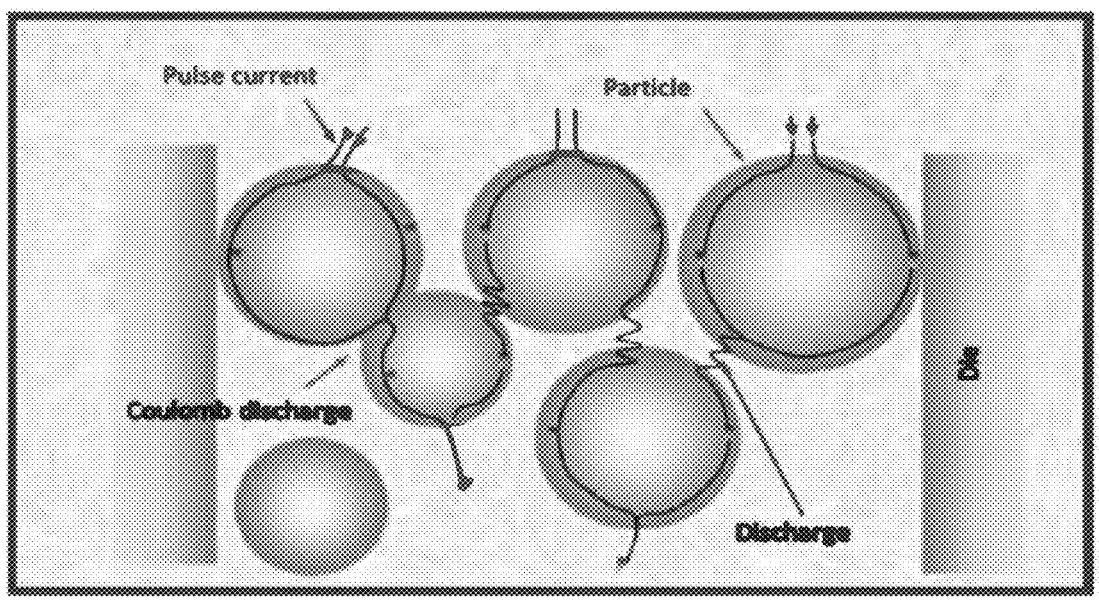
FIG. 4 is a schematic of direct current-pulse current flow through the particles in a spark-plasma-sintering process.
Figure 5:
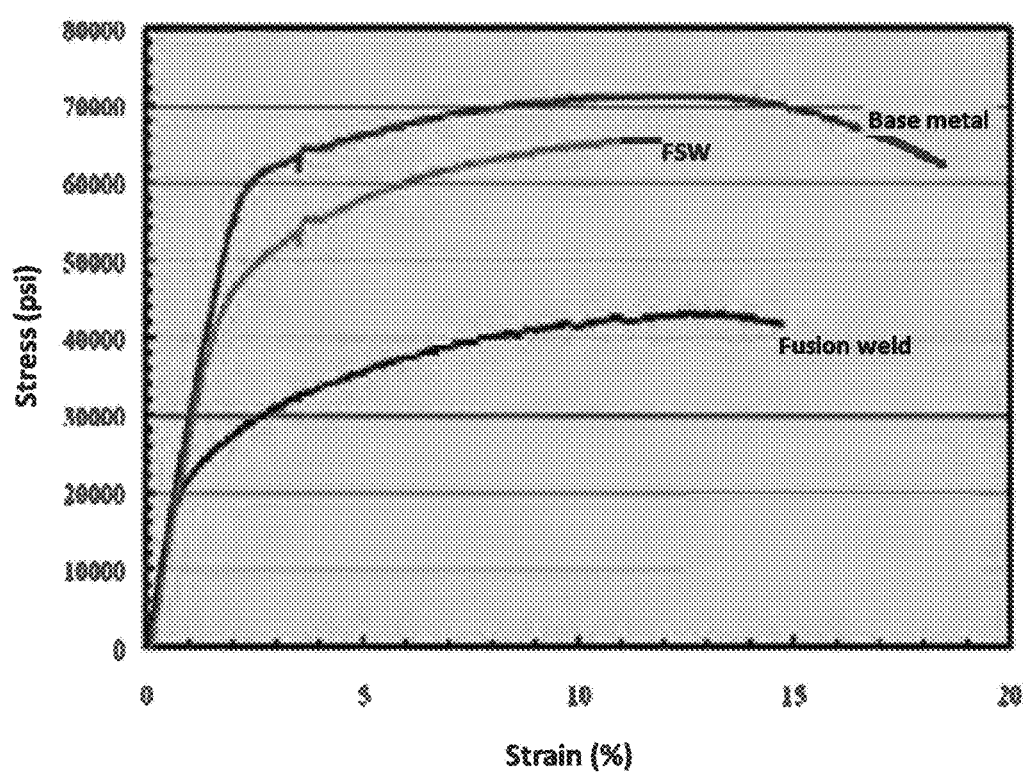
FIG. 5 represents a stress-strain behavior of a FSW, a fusion weld, and a base metal.
Figure 6:
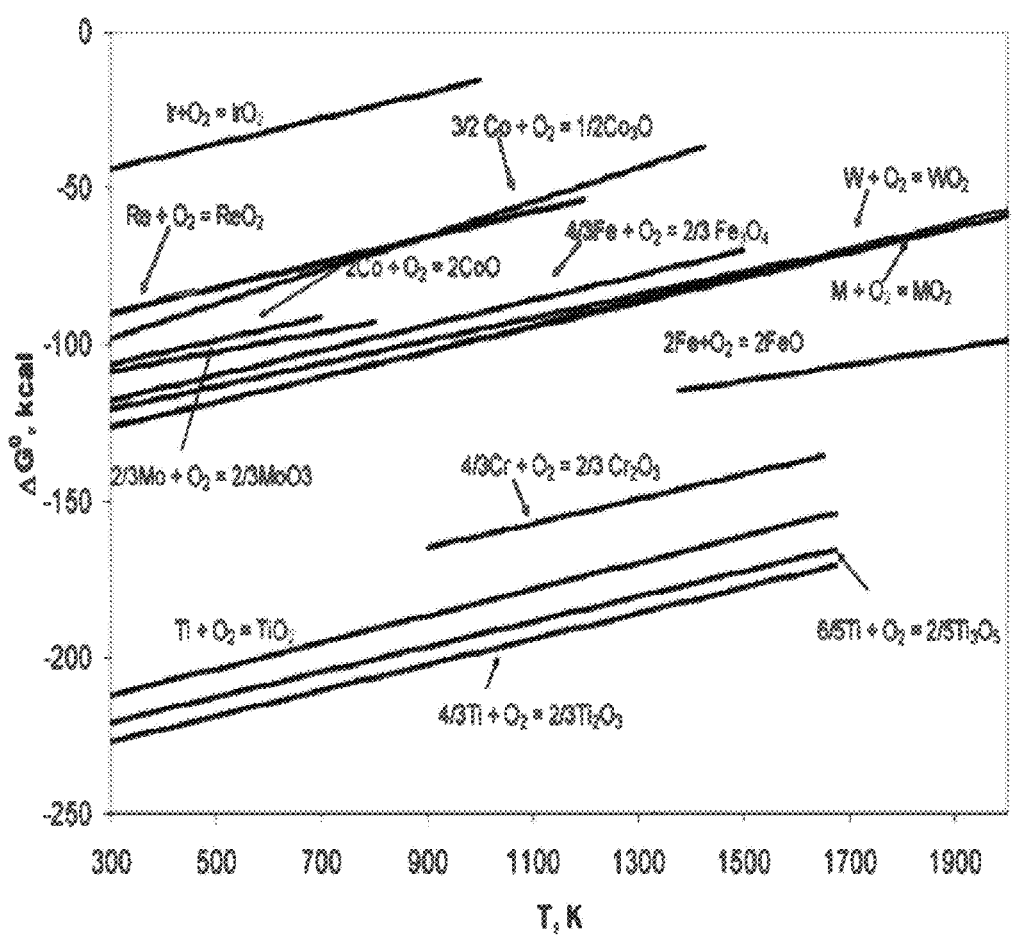
FIG. 6 represents the Ellingham diagram for some of metals used as a FSW tool material.
Figure 7:
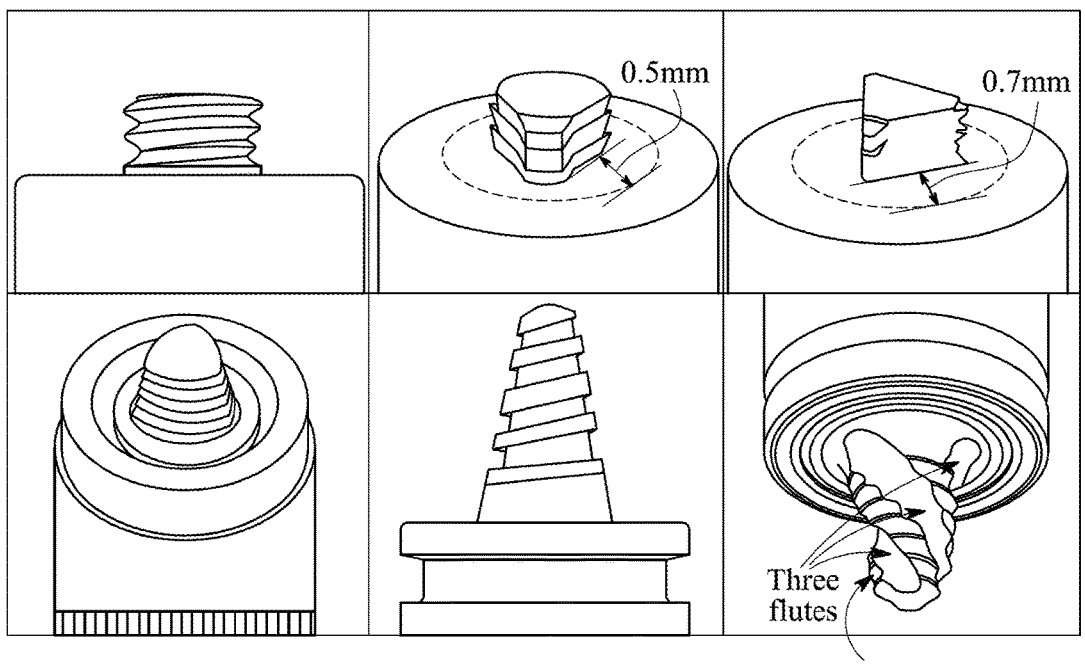
FIG. 7 represents various FSW tool pin geometries.
Figure 8:
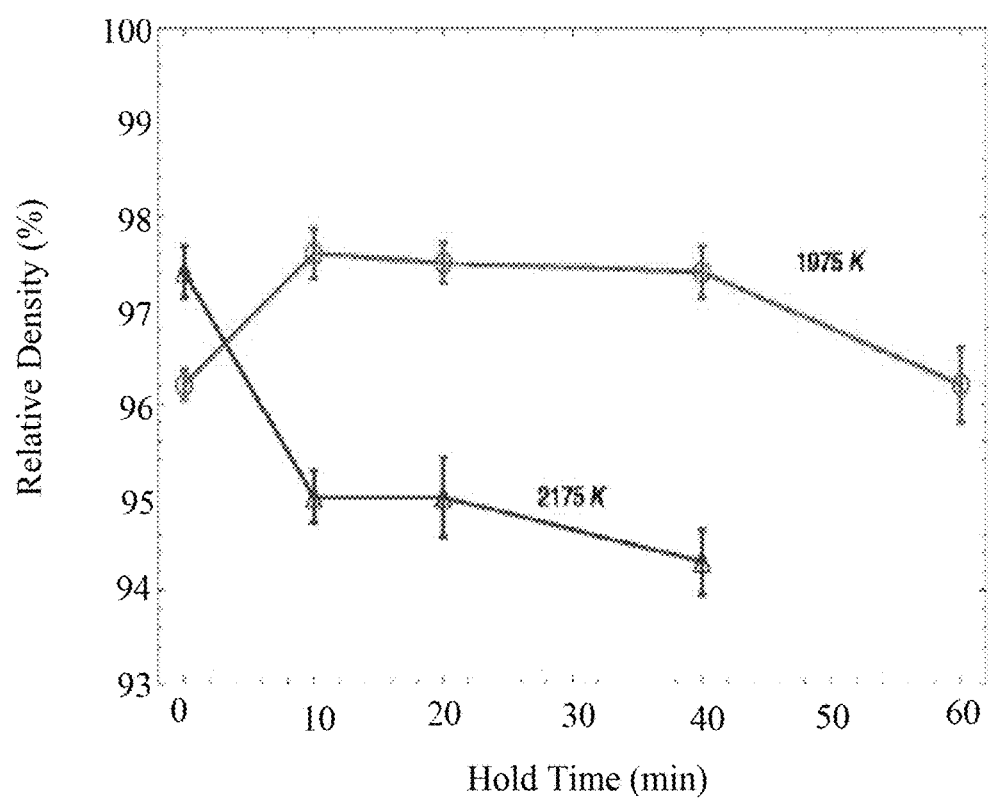
FIG. 8 represents spark-plasma-sintering of W-25% Re as a function of time and temperature.
Figure 9:
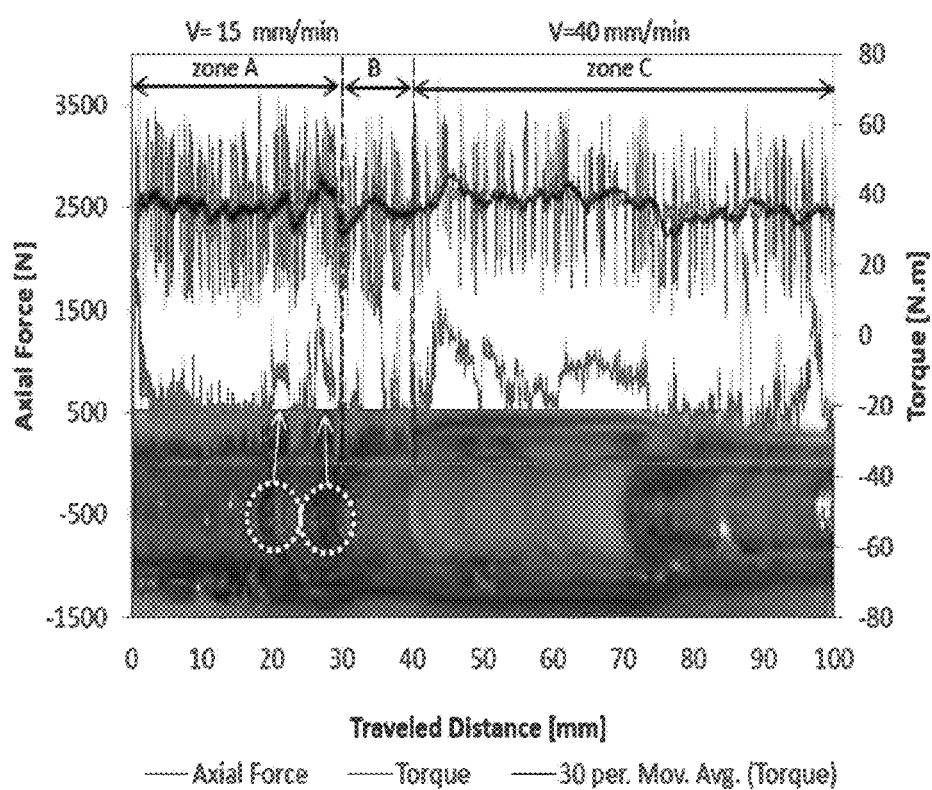
FIG. 9 represents a weld bead quality along a metal joint in FSW at 2000 rpm.
Figure 10A:
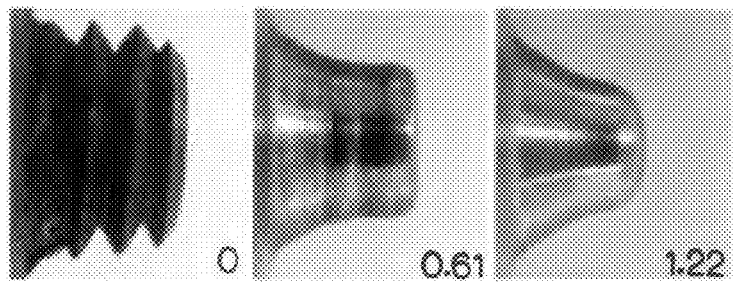
FIG. 10A represents wearing of an oil hardened steel tool at 3 mm s$^{-1}$.
Figure 10B:
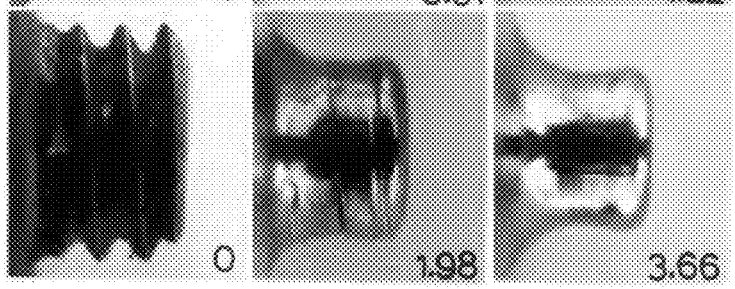
FIG. 10B represents wearing of an oil hardened steel tool at 9 mm s$^{-1}$.
Figure 50:
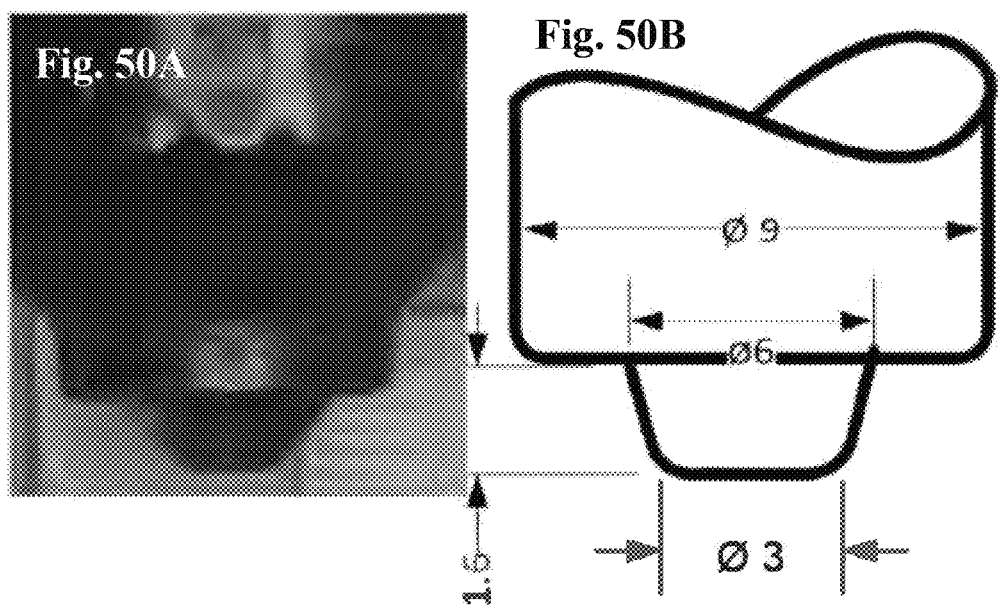
FIG. 50A is an image of a friction stir welding tool.
FIG. 50B represents a geometry of the friction stir welding tool.

Referring now to FIGS. 50A and 50B, in one embodiment, the composite is in a form of a friction stir welding tool that has a tip and a shoulder. In view of that, the tip has a cylindrical. a conical, a triangular, or a pyramidal geometry (as shown in FIG. 7). In a preferred embodiment, the shoulder of the tool is cylindrical with a diameter in the range of 5 to 15 mm, preferably 6 to 14 mm, preferably 7 to 13 mm, preferably 8 to 12 mm, preferably 9 to 10 mm, preferably about 9 mm; and a height in the range of 1 to 5 mm, preferably 2 to 4 mm, preferably about 3 mm. Further to this embodiment, the tip of the tool is conical with a height in the range of 1 to 3 mm, preferably 1.4 to 2 mm, preferably about 1.6 mm; a base diameter in the range of 3 to 10 mm, preferably 4 to 8 mm, preferably 5 to 7 mm, preferably about 6 mm; and a head diameter in the range of 1 to 5 mm, preferably 2 to 4 mm, preferably about 3 mm, wherein the tip is not threaded. In another embodiment, the friction stir welding tool has a cylindrical shoulder and a conical tip, wherein the tip is threaded. The composite may be extruded to form the friction stir welding tool with a tip and a shoulder. The composite may also be wrought to form the friction stir welding tool with a tip and a shoulder, or any other desirable shapes. In a preferred embodiment, the friction stir welding tool has a disc shape, with a diameter in the range of 5 to 50 mm, preferably 10 to 40 mm, preferably 12 to 30 mm, preferably 15 to 25 mm; and a height in the range of 1 to 10 mm, preferably 2 to 8 mm, preferably 3 to 6 mm, preferably about 5 mm.

In one embodiment, the composite further includes one or more ceramic particles selected from a group consisting of aluminum oxide, silica, silicon carbide, aluminum nitride, aluminum titanate, barium ferrite, barium strontium titanium oxide, barium zirconate, boron carbide, boron nitride, zinc oxide, tungsten oxide, cobalt aluminum oxide, silicon nitride, zinc titanate, hydroxyapatite, zirconium oxide, antimony tin oxide, cerium oxide, barium titanate, bismuth cobalt zinc oxide, bismuth oxide, calcium oxide, calcium titanate, calcium zirconate, cerium zirconium oxide, chromium oxide, cobalt oxide, copper iron oxide, copper oxide, copper zinc iron oxide, dysprosium oxide, erbium oxide, europium oxide, gadolinium oxide, holmium oxide, indium hydroxide, indium oxide, indium tin oxide, iron nickel oxide, iron oxide, lanthanum oxide, lithium titanate, magnesium aluminate, magnesium hydroxide, magnesium oxide, manganese oxide, molybdenum oxide, neodymium oxide, nickel cobalt oxide, nickel oxide, nickel zinc iron oxide, samarium oxide, samarium strontium cobalt oxide, strontium ferrite, strontium titanate, terbium oxide, tin oxide, titanium carbide, titanium carbonitride, titanium dioxide, titanium oxide, titanium silicon oxide, ytterbium oxide, yttrium oxide, yttrium aluminum oxide, yttrium iron oxide, and zinc iron oxide. Accordingly, a volume fraction of the ceramic particles present in the composite is less than 0.02, preferably less than 0.01, more preferably less than 0.005, relative to the total volume of the composite. In one embodiment, the ceramic particles have an average particle size of less than 20 nm, preferably less than 15 nm, preferably less than 10 nm, and a purity of at least 97%, preferably at least 98%, more preferably at least 99%, even more preferably at least 99.5%.

In an alternative embodiment, the composite includes the hafnium carbide particles and cerium oxide particles, wherein a volume fraction of both the hafnium carbide particles and the cerium oxide particles are in the range of 1 to 15 vol %, preferably 2 to 14 vol %, preferably 3 to 13 vol %, preferably 4 to 12 vol %, preferably 5 to 11 vol %, preferably 5 to 10 vol %, relative to the total volume of the composite.

In a preferred embodiment, the friction stir welding tool further includes a titanium carbide coating with a thickness in the range of 10 µm to 5 mm, preferably 20 µm to 4 mm, preferably 30 µm to 3 mm, preferably 40 µm to 2 mm, preferably 50 µm to 1 mm, preferably 60 µm to 900 µm, preferably 70 µm to 800 µm, preferably 80 µm to 700 µm, preferably 90 µm to 600 µm, preferably 100 µm to 500 µm. The titanium carbide coating may cover "at least a portion of an external surface of the friction stir welding tool", which as used herein, refers to the titanium carbide coating covering at least 50%, preferably at feast 60%, preferably at least 70%, preferably at least 80%, preferably at least 90%, preferably at least 95%, preferably at least 99% of an external surface of the friction stir welding tool. In a preferred embodiment, the friction stir welding tool has a cylindrical shoulder and a conical tip, wherein a titanium carbide coating covers an entire surface area of the tip.

The composite may be wrought, machined, or extruded to form a material with different geometries to be utilized in various high-temperature applications including, but are not limited to car manufacturing, aerospace, electronics, food, pharmaceutical, medical, sport goods, and the like.

According to a second aspect, the present disclosure relates to a method of fabricating a composite of a tungsten-rhenium alloy and hafnium carbide particles.

The method involves ball-milling a tungsten-rhenium alloy for at least 5 hours, preferably at least 10 hours, preferably at least 15 hours, preferably at least 20 hours, but no more than 25 hours to form a first powder. Accordingly, a concentration of rhenium in the tungsten-rhenium alloy is in the range of 20 to 30 wt %, preferably 21 to 29 wt %, preferably 22 to 28 wt %, preferably 23 to 27 wt %, preferably 24 to 26 wt %, preferably about 25 wt %, relative to the total weight of the tungsten-rhenium alloy. Preferably, the tungsten-rhenium alloy may be ball-milled in an inert atmosphere, provided by argon, helium, neon, and/or nitrogen, at room temperature (i.e. a temperature of 20 to 30° C., preferably 22 to 28° C., preferably 24 to 26° C., preferably about 25° C.), and atmospheric pressure (i.e. a pressure of about 1 atm). Alternatively, the tungsten-rhenium alloy is ball-milled in an aqueous media, for example, in deionized water. In a preferred embodiment, the tungsten-rhenium alloy is ball-milled in a planetary ball-milling machine with a tungsten carbide ball and a tungsten carbide vial, and rotated with a rotational speed of 200 to 300 rpm, preferably 220 to 280 rpm, more preferably about 250 rpm. In some embodiments, said vial acid ball are not made of steel or any other iron-containing alloys to prevent contamination of the tungsten-rhenium alloy, although said vial and ball may be made of ceramic materials such as titanium carbide, silicon carbide, etc. Preferably, the vial has a volume of 100 to 5000 mL, preferably 150 to 2000 mL, preferably 200 to 1000 mL, preferably 220 to 500 mL, preferably about 250 mL, whereas the ball is spherical with a diameter in the range of 1 to 100 ram, preferably 5 to 50 mm, preferably about 10 mm. In one embodiment, a plurality of balls may be placed in the vial for ball-milling the tungsten-rhenium alloy. Preferably, a ball-to-powder ratio is in the range of 6:1 to 10:1, preferably 7:1 to 9:1, more preferably about 8:1. In the embodiment where a plurality of balls is used, the ball-to-powder weight ratio is calculated by dividing the total weight of the balls by the total weight of the powder.

The method further involves mixing hafnium carbide particles with the first powder to form a second powder. Accordingly a volumetric concentration of hafnium carbide particles in the second powder is in the range of 1 to 15 vol %, preferably 2 to 14 vol %, preferably 3 to 13 vol %, preferably 4 to 12 vol %, preferably 5 to 11 vol %, preferably 5 to 10 vol %, relative to the total volume of the second powder. Preferably, the hafnium carbide particles are mixed with the first powder at room temperature (i.e. a temperature of 20 to 30° C., preferably 22 to 28° C., preferably 24 to 26° C., preferably about 25° C.), and atmospheric pressure (i.e. a pressure of about 1 atm). The particles may be mixed in a non-oxidizing environment (e.g. in an inert atmosphere comprising nitrogen, argon, helium, or combinations thereof). In one embodiment, the hafnium carbide particles are mixed with the first powder in a roll-milling mixer. The hafnium carbide particles and the first powder may first be diluted in an aqueous media to form a suspension prior to be mixed with the roll-milling mixer. The aqueous media may have a low boiling point, preferably less than 70° C., or preferably less than 60° C., more preferably less than 40° C., so it could easily evaporate after roll-milling. On the other hand, the aqueous media does not interact with any of the hafnium carbide particles or the tungsten-rhenium alloy. Exemplary aqueous media may include, but are not limited to chloroform, acetone, methanol, hexane, diethyl ether, tetrahydrofuran, dichloromethane, or combinations thereof. In one embodiment, the suspension is sonicated prior to be mixed with the roll-milling mixer.

The method further involves ball-milling the second powder for at least 5 hours, preferably at least 10 hours, but no more than 15 hours to form a third powder. Accordingly, an average crystallite size of the crystallites in the third powder may be in the range of 1-60 nm, preferably 2-50 nm, preferably 5-40 nm, preferably 10-30 nm, preferably 12-20 nm, preferably 13-15 nm. Preferably, the second powder is ball-milled in an inert atmosphere, provided by argon, helium, neon, and/or nitrogen, at room temperature (i.e. a temperature of 20 to 30° C., preferably 22 to 28° C., preferably 24 to 26° C., preferably about 25° C.), and atmospheric pressure (i.e. a pressure of about 1 atm). Alternatively, the second powder may be ball-milled in an aqueous media, for example, in deionized water. In a preferred embodiment, the second powder is ball-milled in a planetary ball-milling machine with a tungsten carbide ball and a tungsten carbide vial and rotated with a rotational speed of 100 to 200 rpm, preferably 120 to 180 rpm, more preferably about 150 rpm. Said vial and ball may be made of ceramic materials such as titanium carbide, silicon carbide, etc. Preferably, the vial has a volume of 100 to 5000 mL, preferably 150 to 2000 mL, preferably 200 to 1000 mL, preferably 220 to 500 mL, preferably about 250 mL, whereas the ball is spherical with a diameter in the range of 1 to 100 mm, preferably 5 to 50 mm, preferably about 10 mm. In one embodiment, a plurality of balls may be placed in the vial for ball-milling the second powder. Preferably, a ball-to-powder weight ratio is in the range of 3:1 to 7:1, preferably 4:1 to 6:1, more preferably about 5:1. In the embodiment where a plurality of balls is used, the ball-to-powder weight ratio is calculated by dividing the total weight of the balls by the total weight of the powder. Ball-milling the second powder may homogenously disperse the hafnium carbide particles within the tungsten-rhenium alloy (as shown in FIGS. 20A, 20B, 20C, 21A, 21B, and 21C).

Each of the above mentioned ball-milling steps may alternatively be referred to as "mechanical alloying (or MA)" in this disclosure, and therefore these words may be used interchangeably.

The method further involves spark-plasma-sintering the third powder to form the composite of a tungsten-rhenium alloy and hafnium carbide particles. Preferably, the third powder is spark-plasma-sintered immediately after the ball-milling. In one embodiment, the third powder is inserted in a freeze dryer and dried for at least 12 hrs, preferably at least 24 hours, until all moisture is removed. The dried powder may be placed in a desiccator before spark-plasma-sintering. In one embodiment, the third powder may be sieved prior to the spark-plasma-sintering. Accordingly, an average crystallite size of the tungsten-rhenium alloy in the third powder is in the range of 10-30 nm, preferably 11-20 nm, preferably 12-15 nm, preferably about 13 nm. In another embodiment, the third powder may by densified via a cold isostatic pressing (CIP) prior to the spark-plasma-sintering. Accordingly, the third powder is loaded into a latex cylindrical vessel and cold-pressed with a hydraulic pressure in the range of 40,000 to 60,000 psi, preferably 45,000 to 55,000 psi, preferably about 50,000 psi.

In a preferred embodiment, the third powder is spark-plasma-sintered at a temperature in the range of 1500 to 2000° C., preferably 1600 to 1900° C., preferably 1700 to 1850° C., preferably 1750 to 1825° C., preferably about 1800° C., for at least 5 minutes, preferably at least 8 minutes, but no more than 10 minutes. In view of that, a heating rate in the range of 60 to 150° C./min, preferably 80 to 120° C./min, preferably 85 to 115° C./min, preferably 90 to 110° C./min, preferably 95 to 105° C./min, preferably about 100° C./min is applied to the third powder. The high heating rate, provided by spark-plasma, causes a rapid sintering of the third powder, thus forming a sintered composite, wherein a crystallite size of the tungsten-rhenium alloy is no more than 100 nm, preferably no more than 95 nm, preferably no more than 90 nm, preferably no more than 85 nm, preferably no more than 80 nm. In a preferred embodiment, the third powder is placed in a hollow cylindrical graphite die having a diameter in the range of 5 to 50 mm, preferably 10 to 40 mm, preferably 12 to 30 mm, preferably 15 to 25 mm; and a height in the range of 1 to 10 mm, preferably 2 to 8 mm, preferably 3 to 6 mm, preferably about 5 mm. Alternatively, the third powder is placed in a graphite mold with various shapes to form the preferred shape of the friction stir welding tool.

In one embodiment, a process for spark-plasma-sintering the third powder is as follows: i) filling the third powder in a graphite mold, ii) installing said mold in a chamber of a discharge plasma sintering apparatus, iii) creating a vacuum inside the chamber, iv) applying a pressure in the range of 30 to 100 MPa, preferably 40 to 60 MPa, preferably 45 to 55 MPa, preferably about 50 MPa, to the third powder inside the graphite mold while concurrently increasing a temperature of the mold and the third powder with a heating rate in the range of 60 to 150° C./min, preferably 80 to 120° C./min, preferably 85 to 115° C./min, preferably 90 to 110° C./min, preferably 95 to 105° C./min, preferably about 100° C./min, until the temperature reaches a final target temperature in the range of 1500 to 2000° C., preferably 1600 to 1900° C., preferably 1700 to 1850° C. preferably 1750 to 1825° C., preferably about 1800° C., v) isothermally maintaining the third powder at the target temperature for at least 5 minutes, preferably at least 8 minutes, but no more than 10 minutes, vi) cooling the temperature inside of the chamber while maintaining the pressure applied to the third powder inside the mold.

Although the third powder is preferably spark-plasma-sintered in vacuum, it may be spark-plasma-sintered in a non-oxidizing environment (e.g. in the presence of nitrogen, argon, helium, neon, or combinations thereof).

In one embodiment, the graphite mold has a shape of a tool with a shoulder and a tip, and thus a molded tool with a shoulder and a tip is formed after the spark-plasma-sintering. In view of that, in some embodiments, the tip has a cylindrical, a conical, a triangular, or a pyramidal geometry.

In an alternative embodiment, the temperature of the mold and the third powder is in eased to the final target temperature to the range of 1500 to 2000° C., preferably 1600 to 1900° C., preferably 1700 to 1850° C., preferably 1750 to 1825° C., preferably about 1800° C. via a stepwise heating protocol as follows: i) heating the mold and the third powder to a first target temperature of 550 to 650° C., preferably 575 to 625° C., preferably about 600° C., at a heating rate of 60 to 150° C./min, preferably 80 to 120° C./min, preferably about 100° C./min, and isothermally maintaining the third powder at the first target temperature for 1 to 10 minutes, preferably 2 to 8 minutes, preferably about 5 minutes; ii) heating the mold and the third powder to a second target temperature of 900 to 1000° C., preferably 950 to 995° C., preferably about 990° C., at a heating rate of 30 to 80° C./min, preferably 40 to 70° C./min, preferably about 60° C./min, and isothermally maintaining the third powder at the second target temperature for 1 to 10 minutes, preferably 2 to 8 minutes, preferably about 5 minutes; iii) heating the mold and the third powder to a third target temperature of 1000 to 1100° C., preferably 1050 to 1095° C., preferably about 1090° C., at a heating rate of 10 to 80° C./min, preferably 20 to 60° C./min, preferably 40 to 50° C./min, and isothermally maintaining the third powder at the third target temperature for 1 to 10 minutes, preferably 2 to 8 minutes, preferably about 5 minutes; iv) heating the mold and the third powder to a fourth target temperature of 1100 to 1200° C., preferably 1150 to 1195° C., preferably about 1190° C., at a heating rate of 10 to 80° C./min, preferably 20 to 60° C./min, preferably 40 to 50° C./min, and isothermally maintaining the third powder at the fourth target temperature for 1 to 10 minutes, preferably 2 to 8 minutes, preferably about 5 minutes; v) heating the mold and the third powder to a fifth target temperature of 1200 to 1300° C., preferably 1250 to 1295° C., preferably about 1290° C., at a heating rate of 10 to 80° C./min, preferably 20 to 60° C./min, preferably 40 to 50° C./min, and isothermally maintaining the third powder at the fifth target temperature for 1 to 10 minutes, preferably 2 to 8 minutes, preferably about 5 minutes; vi) heating the mold and the third powder to a sixth target temperature of 1300 to 1400° C., preferably 1350 to 1395° C. preferably about 1390° C., at a heating rate of 10 to 80° C./min, preferably 20 to 60° C./min, preferably 40 to 50° C./min, and isothermally maintaining the third powder at the sixth target temperature for 1 to 10 minutes, preferably 2 to 8 minutes, preferably about 5 minutes; vii) heating the mold and the third powder to a seventh target temperature of 1400 to 2000° C., preferably 1700 to 1900° C., preferably about 1800° C., at a heating rate of 10 to 80° C./min, preferably 20 to 60° C./min, preferably 40 to 50° C./min, and isothermally maintaining the third powder at the seventh target temperature for 1 to 10 minutes, preferably 2 to 8 minutes, preferably about 5 minutes.

After isothermally maintaining the third powder at the seventh target temperature, the inside of the chamber is cooled to a room temperature (i.e. a temperature of 20 to 30° C., preferably 22 to 28° C., preferably 24 to 26° C., preferably about 25° C.), while the pressure applied to the third powder inside the mold is maintained. Once the temperature is equilibrated at room temperature, a sintered composite is separated from the graphite mold. The sintered composite prepared through the above-mentioned processes has a structure as illustrated in FIG. 50B.

In the preparation processes, a high current having a low voltage pulsed phase is introduced into a gap between the third powder particles by the current applied through the upper and lower electrodes placed on the graphite mold, and the sintered composite is molded by thermal diffusion and electro-transport caused by high energy of discharge plasma momentarily generated by spark discharge, pressure and heat caused by electric resistance of the mold, and electric energy. Also, the pulsed current activation is a direct heating manner in which the current directly flows to the third powder. Heat is generated in the third powder (or other powder samples) at the same time when the current is applied to the mold, and a temperature difference between an inside of the powder and an outside thereof is relatively small, and also it is possible to minimize a thermal activation action generated in the sintering process, due to a relative low temperature and a short sintering time. Preferably, by spark-plasma-sintering a composite of tungsten-rhenium alloy and hafnium carbide particles, it may be possible to achieve a composite with a relative density of at least 95%, preferably at least 96%, preferably at least 97%, preferably at least 98%, preferably at least 99%, preferably at least 99.5%, and fine crystallites size in the range of 20 to 100 nm, preferably 30 to 95 nm, preferably 40 to 90 nm, preferably 45 to 85 nm, preferably 50 to 80 nm, which are proper for a friction stir welding tool. Furthermore, by spark-plasma-sintering a composite of tungsten-rhenium alloy and hafnium carbide particles, it may be possible to form a composite having a diameter and thickness which is 10 to 25 times, preferably 15 to 20 times larger than a composite sintered via conventional methods (e.g. pressureless sintering, hot pressing, hot isostatic pressing, etc.). In addition, a composite which is formed via the spark-plasma-sintering, as described, may have a higher strength, a higher abrasion resistance, a higher relative density, a lower relative porosity, and a larger crystallite size, when compared to a composite which is sintered via conventional methods such as pressureless sintering, hot pressing, hot isostatic pressing, etc. Moreover, the method of producing a composite of tungsten-rhenium alloy and hafnium carbide particles may be simpler and less expensive compared to the conventional methods, yet more effective in producing a composite with relatively small crystallites, wherein hafnium carbide particles are homogenously dispersed within.

In view of that, the friction stir welding tool may be fabricated via a single step sintering process, and may not need additional post-sintering processes such as extrusion and/or machining, because a tool shape can be formed during the spark-plasma-sintering by using a proper mold. However, in another preferred embodiment, the sintered composite is extruded to form the friction stir welding tool. The sintered composite may be coated prior to the extrusion process. "Extrusion" as used herein refers to a process through which objects with a desired cross-section are produced by pushing a material through a die of the desired cross-section. Preferably, the sintered composite may be extruded at room temperature (i.e. 25° C.), although the sintered composite may also be extruded at an elevated temperature in the range of 250-400° C., preferably 275-350° C., or preferably about 300° C.

A relative density of the sintered composite may slightly increase by 1% to 3%, preferably about 2%, after the extrusion process. In one embodiment, the sintered composite is extruded with an extrusion ratio in the range of 10:1 to 20:1, preferably 12:1 to 18:1, more preferably 14:1 to 16:1. Extrusion ratio refers to a ratio of a cross-sectional area of a material before and after an extrusion. For example, if a cross-sectional area of a material before an extrusion process is A, and a cross-sectional area of the material after the extrusion process becomes B, an extrusion ratio of the extrusion process is A:B. The sintered composite may be coated with a lubricant such as colloidal graphite, glass powders, silica particles, silicon adhesive, or a combination thereof, before being extruded. The lubricant present on the surface of the sintered composite may partially or completely be removed after the sintered composite is extruded. The sintered composite extrudate may further be wrought to a desired shape. The sintered composite extrudate may also be coated with a ceramic material such as titanium carbide.

According to a third aspect, the present disclosure relates to a method of friction stir welding a metal joint. The method involves mounting a friction stir welding tool on a tool holder. In one embodiment, the friction stir welding tool has a shoulder and a tip (as shown in FIGS. 50A and 50B) with dimensions as described previously, which is secured in the tool holder such that the tool does not slide relative to the tool holder during friction stir welding. In an alternative embodiment, the friction stir welding tool has a disc shape (as shown in FIGS. 66A and 68A) with dimensions as described previously, which is secured in the tool holder such that the tool does not slide relative to the tool holder during friction stir welding. The tool may be secured with screws and/or other means for fastening in the tool holder.

The tool holder is further secured on a shaft of a friction stir welding machine via a rotatable coupling. In view of that, the rotatable coupling includes a male fitting with a plurality of engagement teeth and a threaded sleeve, wherein said teeth are configured to engage with the shaft of the friction stir welding machine as the threaded sleeve is screwed on the male fitting.

In one embodiment, the tool holder is heat-treated at a temperature of 800 to 900° C., preferably 820 to 880° C., preferably 840 to 860° C., preferably about 850° C., prior to be secured on the friction stir welding machine. The tool holder may be quenched in oil. Heat-treating the tool holder may prevent damage to the tool holder at an extreme condition of welding a high strength metal joint. Preferably, in another embodiment, the tool holder is further tempered prior to be secured on the friction stir welding machine. Tempering an iron-based alloy refers to a process of heat treating the alloy to increase its toughness. In view of that, the tool holder is heated to a temperature below a melting point of the alloy and kept isothermal for a certain period of time, followed by cooling down the alloy in dry air. Tempering the tool holder may reduce a hardness of the tool holder to a value in the range of 50 to 60 HRC, preferably 52 to 58 HRC, preferably 53 to 55 HRC, preferably about 54 HRC.

The method of friction stir welding further involves rotating the shaft with a rotational speed of 400 to 2000 rpm, preferably 450 to 1500 rpm, preferably 500 to 1200 rpm, preferably 600 to 1000 rpm, preferably 650 to 950 rpm, preferably 700 to 900 rpm, preferably about 800 rpm.

The method of friction stir welding further involves plunging the friction stir welding tool into the metal joint to melt at least a portion of metals and to weld the metal joint. The term "plunging the friction stir welding tool into the metal joint" as used herein refers to a process of penetrating the rotating tool into the metal joint to melt at least a portion of the joint and to weld the metal joint. In one embodiment, the tool is plunged into the metal joint with a plunging rate of at least 2 mm/min, preferably at least 3 mm/min, but no more than 5 mm/min. In a preferred embodiment, the shaft is plunged into the metal joint with a tilted angle in the range of no more than 0.5°, preferably no more than 0.4°, preferably no more than 0.3°, preferably no more than 0.2°, preferably no more than 0.1°. In another preferred embodiment, the shaft is plunged into the metal joint to a penetration depth of no more than 3 mm, preferably no more than 2 mm, preferably no more than 1.6 mm. In another preferred embodiment, the shaft is plunged into the metal joint with a compressive force in the range of 1 to 20 kN, preferably 1.5 to 10 kN, preferably 2 to 5 kN, preferably 2.5 to 3 kN.

In some embodiments, the tool is plunged at least once. For example, the tool is plunged to a same penetration depth at least 5 times, wherein at least 10 cm, preferably at least 20 cm, preferably at least 30 cm, of the joint metal is welded in each time of plunging.

The method of friction stir welding further involves moving the shaft along the metal joint to weld the metal joint together. In one embodiment, the shaft is moved with a traverse speed of 15 to 40 mm/min, preferably 20 to 35 mm/min, preferably 25 to 30 mm/min. The term "traverse speed" as used herein refers to a speed of the shaft in a one-dimensional translational motion. In a preferred embodiment, the shaft is moved along the metal joint with a traverse force in the range of 100 to 1000 N, preferably 150 to 800 N, preferably 200 to 700 N, preferably 250 to 600 N, preferably 300 to 550 N, preferably 350 to 500 N, preferably about 400 N. The term "traverse force" as used herein refers to the amount of force exerted to the shaft to move the shaft along the metal joint. The phrase "moving the shaft along the metal joint" refers to a translational motion, wherein a direction of moving the shaft is parallel to the metal joint, preferably in one dimension. The phrase "moving the shaft along the metal joint" may also refer to a two dimensional translational motion. For example, in one embodiment, the shaft is moved along the metal joint, wherein a direction of moving the shaft is parallel to the metal joint, however, the penetration depth becomes larger as the shaft is moved along the joint (i.e. two dimensional translational motion in x and z directions).

In one embodiment, the metal joint includes two steel plates forming a butt joint. The term "steel" as used herein refers to an iron-carbon alloy, which may also contain Si and/or Cr, and is described as mild-, medium-, or high-carbon steels according to the percentage of carbon present in the alloy. Exemplary steels may include, but are not limited to carbon steel, Damascus steel, stainless steel, austenitic stainless steel, ferritic stainless steel, martensitic stainless steel, surgical stainless steel, tool steel, high strength low alloy (HSLA) steel, advanced high strength steels, ferrous superalloys, and cast iron.

A friction stir welding tool, as described previously, may weld any of the above listed steels for a distance of at least 1 meter, preferably at least 2 meters, preferably at least 3 meters, preferably at least 5 meters, preferably at least 8 meters, preferably at least 10 meters, preferably at least 12 meters, preferably at least 15 meters, preferably at least 18 meters, preferably at least 20 meters, but no more than 25 meters.

In a preferred embodiment, the steel plate is one selected from the group consist of ASTM A516 Grade 70 carbon steel, AISI 304 austenitic stainless steel, Ferritic Utility grade Stainless steel DIN 1.4003, and ASTM A240 Grade UNS S41003. Accordingly, the steel plate may have a thickness of 2 to 50 mm, preferably 3 to 40 mm, preferably 5 to 30 mm.

In another preferred embodiment, a non-oxidizing gas (e.g. argon and/or helium) is flowed to the welding zone to prevent oxidation of the metal joints.

In an alternative embodiment, the metal joint includes two plates, with each being a high strength metal or alloy, e.g. a titanium plate or a titanium-alloy plate.

The foregoing paragraphs have been provided by way of general introduction, and are not intended to limit the scope of the following claims. The described embodiments, together with further advantages, will be best understood by reference to the following detailed description taken in conjunction with the accompanying drawings.

The examples below are intended to further illustrate protocols for the friction stir welding tool, the method of fabricating the tool, and the method of friction stir welding using the tool, and are not intended to limit the scope of the claims.

EXAMPLE 1

The following examples demonstrate the synthesis of W-25% Re nanocrystalline alloy reinforced with Hafnium Carbide HfC by using mechanical alloying and Spark Plasma Sintering (SPS), which was shown to have a relatively high hardness and high wear resistance, and it can tolerate the harsh conditions of FSW of steel. One reason for selecting a composite of W-25% Re nanocrystalline alloy reinforced with Hafnium Carbide for this investigation is to employ the advantage of superior high temperature properties of these elements (all the components have melting points more than 3000° C.). The addition of Re will decrease the ductile to brittle transition temperature of the tool. Nanocrystalline W-25% Re solid solution can be synthesized by mechanical alloying (MA) and Spark plasma sintering (SPS). The homogenous dispersion of HfC particles inside >the W-25% Re will enhance the strengthening effect at high temperature.

EXAMPLE 2

Materials & Method

A W-25% Re alloy was chosen as the best candidate for the development of the tool. One best mode of synthesis of W-25 wt % Re alloy and W-25 wt % Re Xvol % HfC composites powders via mechanical alloying has been overviewed in this example.

Semi-alloyed W-25-wt % Re and HfC powders supplied by Rhenium Alloys, USA, were used in this investigation. Nanostructured W-25Re alloy and homogenous W-25Re—HfC composites containing 5 and 10 vol. % of HfC particles were produced using MA. The experiments were carried out in a planetary ball mill (Fritsch Pulverisette, P5, Idar-Oberstein, Germany). Since the use of steel vials and balls introduces Fe contamination, tungsten carbide vials (250 mL in volume) and balls (10 mm in diameter) were used to avoid contamination of the powders. See M. S. Boldrick, E. Yang, C. N. J. Wagner J. Non-Cryst. Solids, 150 (1992), pp. 478-482 and E. Y. Ivanov, C Suryanarayana, B. D Bryskin, Synthesis of a nanocrystalline W-25 wt % Re alloy by mechanical alloying, Materials Science and Engineering: A Volume 251, Issues 1-2, 15 Aug. 1998, Pages 255-261, each incorporated herein by reference in their entirety. Milling was performed in argon inert gas to avoid oxidation of the powders. In the first stage, the as-received and semi-alloyed W-25-wt. % Re powder was milled for 5, 10, 15, and 25 h until a single nanostructured solid solution was obtained. Milling conditions of ball-to-powder weight ratio of 8:1 and speed of 250 rpm were used.

In the second stage, HfC particles (5 and 10 vol. %) were dispersed in the obtained nanostructured alloy powder using milling conditions of a speed of 150 RPM, a ball to-powder weight ratio of 5:1, and a milling time up to 15 h. A summary of the parameters used in the investigation is shown in Table 3.

TABLE 3

Mechanical alloying and milling parameters

| Powder composition | Time (hrs) | Speed (RPM) | BPR |
|---|---|---|---|
| Semi-alloy W—5%Re | 5, 10, 15 & 25 | 250 | 8:1 |
| Fully alloyed W—25%Re + 5 vol % HfC | 5, 10 & 15 | 150 | 5:1 |
| Fully alloyed W—25%Re + 10 vol % HfC | 5, 10 & 15 | 150 | 5:1 |

Field Emission Scanning Electron Microscope (FE-SEM), Tescan Lyra-3, equipped with Energy Dispersive x-ray Spectroscopy (EDS) was used to analyze the as received powders, and mechanically alloyed powders. The dispersion of HfC particles in the synthesized powders was characterized using FE-SEM and x-ray mapping using 20 frames. X-ray diffraction experiments were carried out using a diffractometer (Broker D8, USA, with a wavelength $\lambda$=0.15405 nm) to characterize phases present in the samples and evaluate the crystallite size and lattice strain of the tungsten phase.

EXAMPLE 3

Characterization of As-Received Powders

Particles Size Analysis

Figure 11:
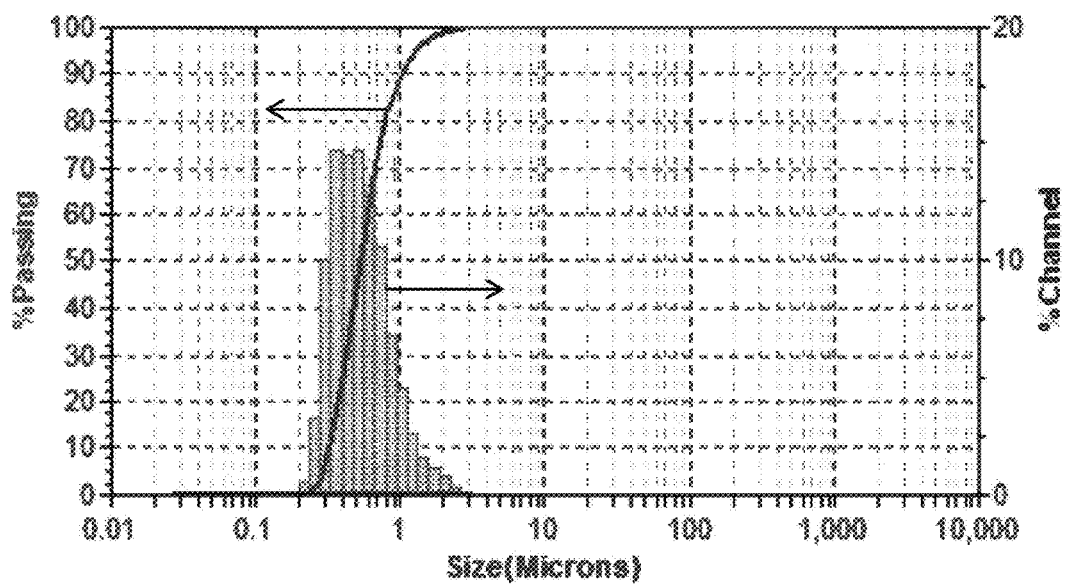
FIG. 11 represents a particle size analysis of a tungsten-rhenium alloy (W-25% Re) as-received.
Figure 12:
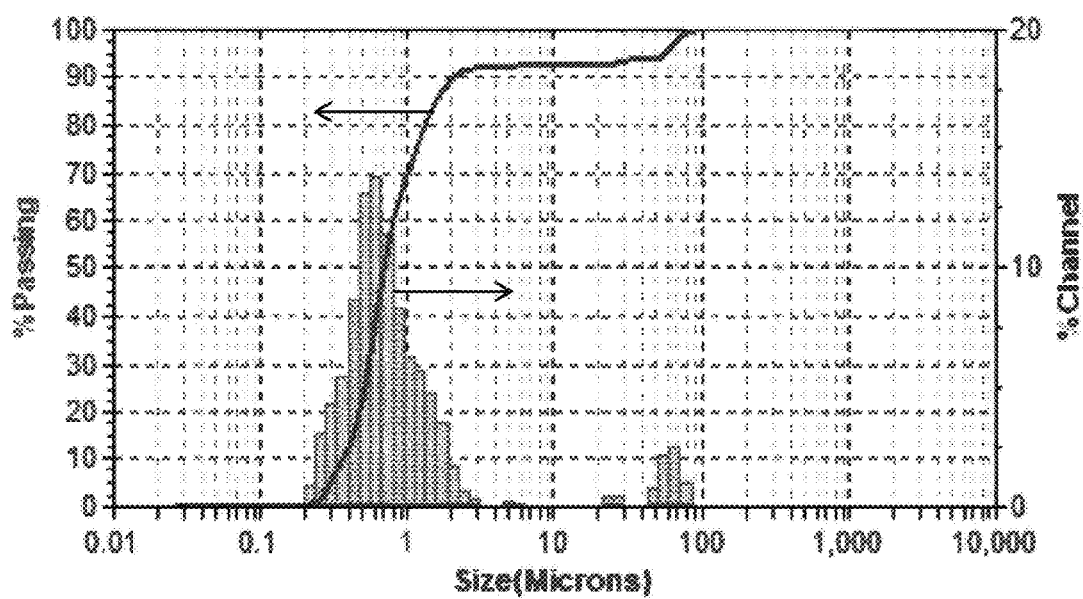
FIG. 12 represents a particle size analysis of hafnium carbide particles.

As-received powders were characterized for particle size analysis by particle size analyzer. It was found that both the powders were in the sub-micrometer size as shown in FIG. 11 and FIG. 12 respectively. The result shows that partially alloyed W-25% Re powder was in the early stages of milling.

Field Emission-SEM and XRD Pattern of HfC

Figure 13A:
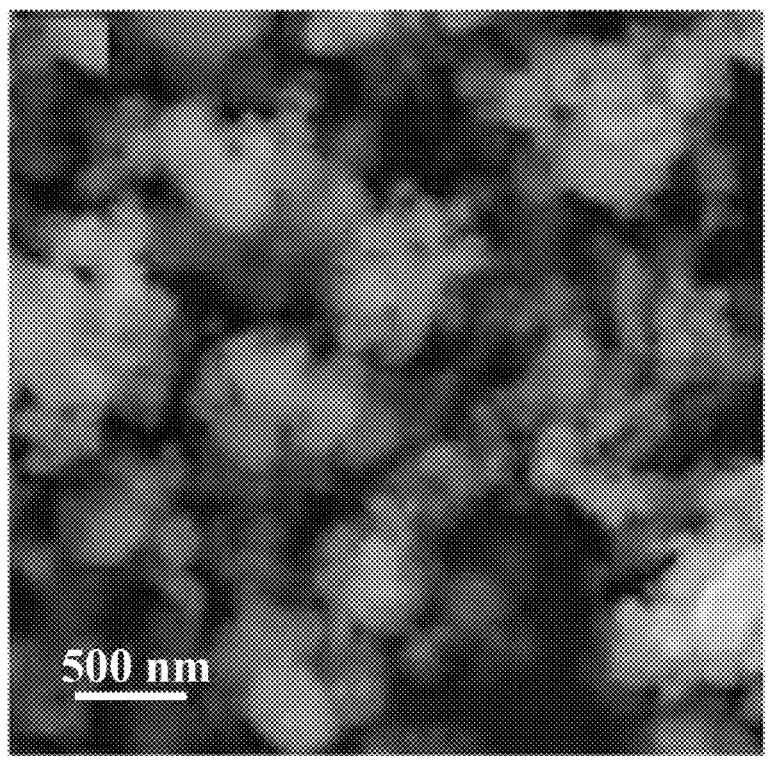
FIG. 13A is a Field Emission Scanning Electron Microscope (FE-SEM) of hafnium carbide particles.
Figure 13B:
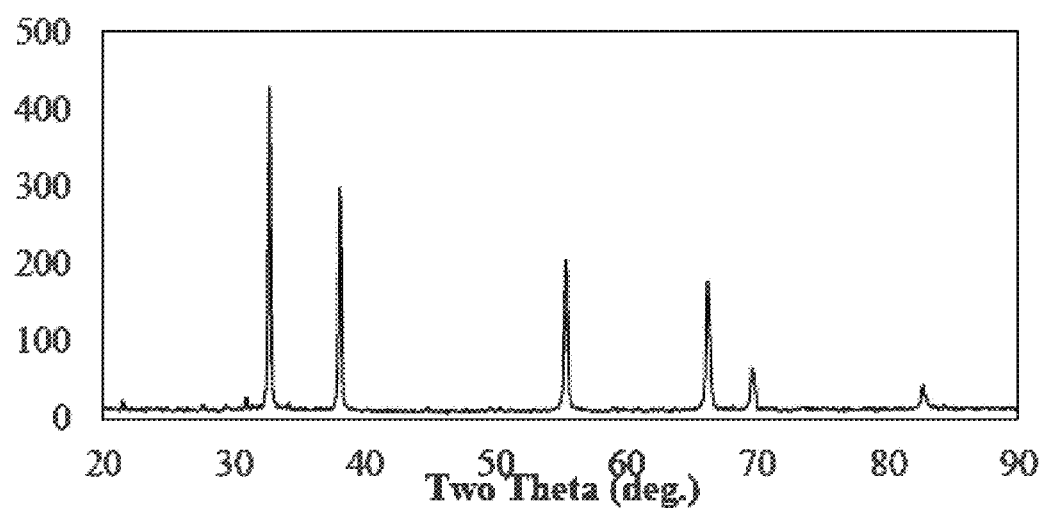
FIG. 13B represents an XRD spectrum of the hafnium carbide particles.

FE-SEM image of HfC powder is presented in FIG. 13A. The particles have sub-micron size and various shapes ranging from elongated to irregular. FIG. 13B shows XRD pattern of HfC powder, the compound has a cubic crystal structure of the NaCl type.

EXAMPLE 4

Characterization of Mechanically Alloyed Powder

FE-SEM Analysis of Synthesized Alloyed Powder

The as-received semi-alloyed W-25 wt % Re powder was synthesized by mechanical alloying of W and Re pure powders; a FE-SEM image showing the morphology of its particles is presented in FIG. 14A. It is known that in the course of mechanical alloying particles undergo flattening, cold welding, fracturing, and rewelding. In early stage of milling, plastic deformation and cold welding dominate and leads to change in particle shape and increase in particle size, respectively. See M. R. Akbarpour, E. Salahi, F. Alikhani Hesari, A. Simchi, H. S. Kim, Microstructure and compressibility of SiC nanoparticles reinforced Cu nanocomposite powders processed by high energy mechanical milling, Ceramics International 40 (2014) 951-960; and C. Suryanarayana, Mechanical alloying and milling, Prog. Mater. Sci. 46 (2001) 1-184, each incorporated herein by reference in their entirety. As can be noticed, in FIG. 14A, some particles have flattened shape and large particle size while others are more equiaxed and have small particle size. Since the as received W-25 wt % Re powder was not fully alloyed, it was further milled for different milling times up to 25 h to achieve complete solubility and obtain a nanostructured solid solution.

Mechanical alloying of the powder for 5 hours decreased the particle size and transformed the shape of particles from flattened to equiaxed, FIG. 14B at low magnification and FIG. 15B at high magnification. With the increase in milling time to 15 and 25 hours, the ability of the particles to strain harden decreases. Therefore, fracturing of particles became significant and leads to a decrease in particle size, FIGS. 14C and 14D at low magnification and FIGS. 15C and 15D at high magnification. This is in agreement with published work, where it was reported that mechanical alloying of W-25% Re powder mixture starting from W and Re particles with 10 and 30 μm in size deceased the particle size and led to the formation of rounded powder particles.

XRD Analysis of Synthesized Alloyed Powder

Figure 16:
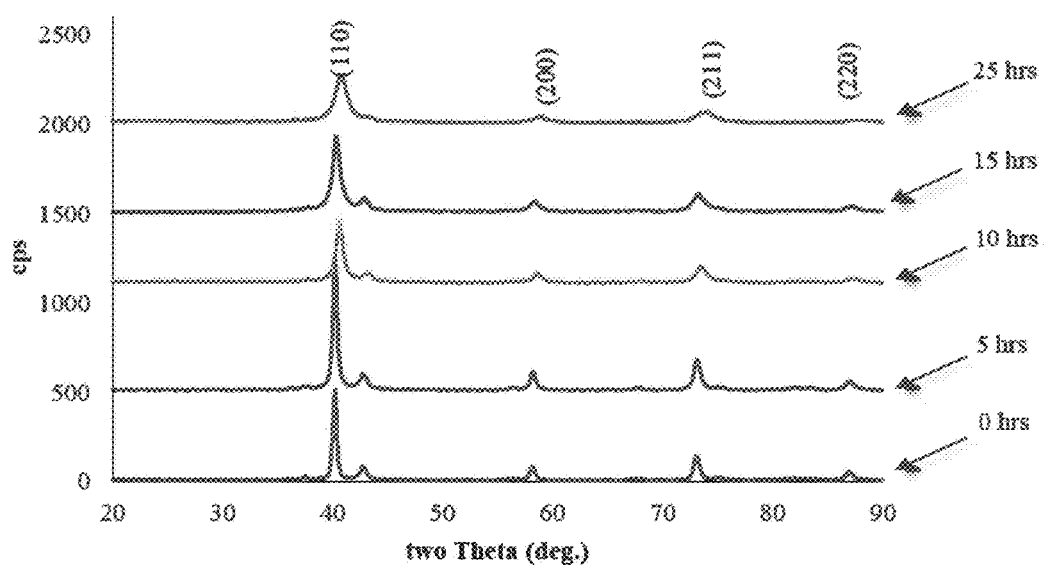
FIG. 16 represents an XRD spectrum of the alloyed W-25 wt % Re powder at different milling times.

XRD spectra of W-25 wt % Re powder, mechanically alloyed for different times, are shown in FIG. 16. Analysis of XRD spectrum of the as-received W-25 wt % Re powder, confirmed that it has body centered cubic crystal structure. XRD pattern has reflections both from W f,bcc, a=0.3167 nm) and Re (hcp, a=0.2781 nm). A peak characteristic of rhenium is present along with W—Re solid solution peaks. This indicates that rhenium is not completely dissolved in tungsten. XRD spectra of W-25 wt % Re powder milled for 5, 10, and 15 hours, presented in FIG. 16, shows that the peak characteristic of rhenium is still present but its intensity decreased. However, with the increase of milling time to 25 h, this peak disappeared and only W—Re solid solution peaks are present. This indicates complete solubility of rhenium in tungsten and formation of a single solid solution.

The peak positions was slightly shifted indicating the solid solution formation due to inter-diffusions of these two elements. Peaks of W shifted towards lower 2 theta values indicating decrease of lattice parameters. The atomic radius of W ($r_w$=0.1408 nm) is greater than Re ($r_{Re}$=0.1375) which results in shifting toward higher 2 theta values. Peak broadening was observed in the later stages due to reduction in crystallite size. The equilibrium maximum solid solubility limit of Re in tungsten was reported to be between 24 to 37% Re depending on the preparation method. See J. M. Dickinson, Richardson Trans. ASM, 51 (1959), pp. 758-771; E. M. Savitskii, M. A. Tylkina, K. B. Povarova, Rhenium alloys, Izv. Nauka, Moskva (1965); Israel Program for Scientific Translations, Jerusalem, 1970, pp. 139-334; and. R. I. Jaffee, C. T. Sims, J. J. Harwood, The effect of rhenium on the fabricability and ductility of molybdenum and tungsten, in: 3rd Plansee Seminar Proceedings, Pergamon, New York, 1959, pp. 380-411, each incorporated herein by reference in their entirety. Beyond this solubility, the σ phase precipitates and leads to failure of the alloys. In this work, the W-25 wt % Re solid solution was obtained by MA and formatin of the σ phase was not revealed. It was reported that MA could lead to the formation of stable and metastable phases including solid solutions. See C. Suryanarayana, Metals Mater., 2 (1996), pp. 195-209; and C. Suryanarayana, Bibliography on mechanical alloying and milling, Cambridge International Scientific Publishing, Cambridge, 1995, each incorporated herein by reference in their entirety. The technique was used to synthesize W-25% Re single-phase solid solution using steel vial and with steel grinding medium and tungsten carbide vials and balls. See F. H. Froes, B. D. Bryskin, C. R. Clark, C. Suryanarayana, E. G. Baburaj, Mechanical alloying of W-25 wt. % Re powder, in:

B. D. Bryskin (Ed.), Rhenium and Rhenium Alloys, TMS, Warrendale, Pa., 1997, pp. 569-583, incorporated herein by reference in its entirety.

Figure 17:
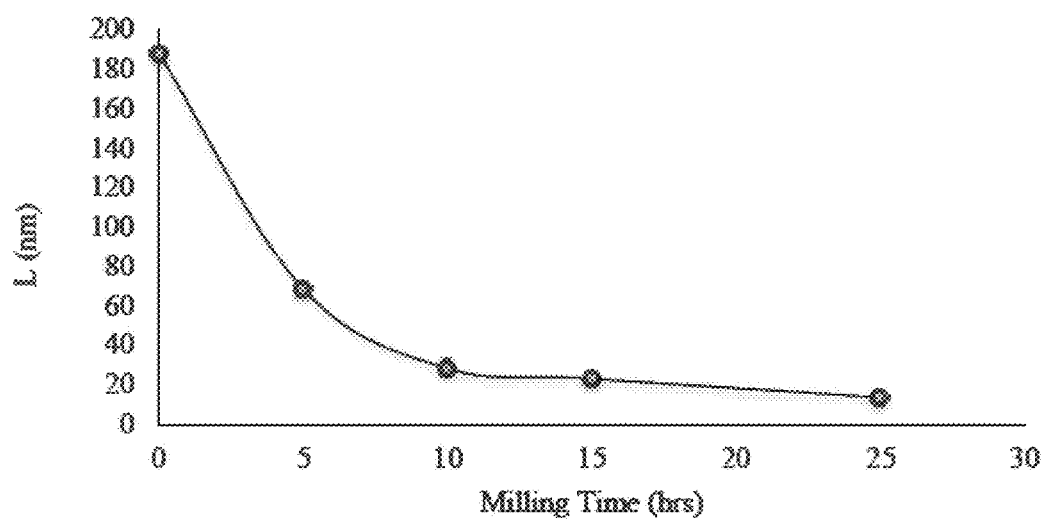
FIG. 17 represents a crystallite size of the alloyed W-25 wt % Re powder at different milling times.

Mechanical alloying decreased the intensity of the W—Re solid solution peaks. This decrease was accompanied with broadening of the peaks. This is due to the fact that mechanical milling of metallic powders is usually associated with a decrease in crystallite size and increase in lattice strain. See Y. Waseda, K. Shinoda, E. Matsubara, X-Ray Diffraction Crystallography, Springer-Verlag, Berlin Heidelberg, 2011, incorporated herein by reference in its entirety. The XRD data of mechanically alloyed W-25% Re powder was used to calculate the crystallite size and lattice strain as reported elsewhere. See Saheb N, Aliyu I K, Hassan S F, Al-Aqeeli N. Matrix Structure Evolution and Nanoreinforcement Distribution in Mechanically Milled and Spark Plasma Sintered Al—SiC Nanocomposites. Materials. 2014; 7(9):6748-6767, incorporated herein by reference in its entirety. FIG. 17 shows crystallite size change of the tungsten phase as function of milling time. The as-received and partially alloyed powder has a crystallite size of 188 nm, Milling of the powder for 5 hours decreased the crystallite size to 68 nm. A further increase in milling time to 10 and 15 h led a decrease in crystallite size to 28 and 23 nm, respectively. Equation 1 relates the crystallite size D with the peak broadening β and wavelength of x-ray used λ. The value of K is usually taken as 0.9.

$$\beta_{hkl} = \frac{K\lambda}{D} + 4\varepsilon \sin\theta \qquad \text{Equation 3.1}$$

A final crystallite size of 13 nm was obtained with the increase in milling time to 25 h. The decrease in crystallite size is believed to take place in three stages. Formation of large number of dislocations within shear bands, in the first stage. Recombination of these dislocations leads to the formation of small angle grain boundaries, in the second stage. Finally, the orientation of the formed grains become random, in the third stage. In XRD analysis, the crystallites may refer to the size of very small grains (sub-grains) that leads to broadening of the peak.

It is evident from FIG. 17 that the major reduction in crystallite size of the W—Re solid solution took place in the first 10 h. The increase in milling time beyond 10 h only led to very small change in crystallite size. This behavior is possible in MA because the smaller grains get saturated with defects and dislocation pile-ups and, hence, the structure cannot continue to develop the same way as in large-grained metals. See A. S. Khan, B. Farrokh, L. Takacs, Mater. Sci. Eng A, 489 (2008) 77, incorporated herein by reference in their entirety. Therefore, once the nanocrystalline structure is fully developed, further decrease in crystallite size become very difficult because of the large stress needed to deform the nano-grains. Under these conditions, creation and motion of dislocations become difficult, and the structure will continue to deform by grain boundary sliding mechanism.

Figure 18:
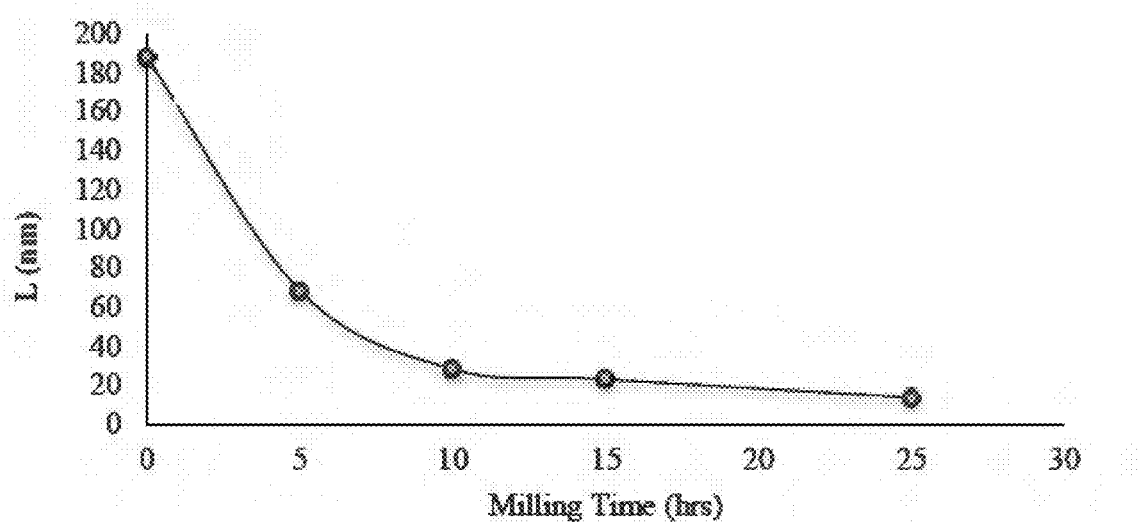
FIG. 18 represents a lattice strain of the alloyed W-25 wt % Re powder at different milling times.

On the other hand, grain size reduction may be hindered by recovery. See S. Hwang, C. Nishimura, P. G. McCormick, Mater. Sci. Eng. A, 318 (2001) 22, incorporated herein by reference in its entirety. However, mechanical alloying time was extended to 25 h to have complete solubility of Re in W. Mechanical alloying not only decreased the particle size and crystallite size but also increased lattice strain in the tungsten phase as presented in FIG. 18. During mechanical alloying, particles experience heavy plastic deformation, which increases dislocation density and leads to an increase in lattice strain.

FE-SEM Analysis of the Milled Composite Powders

The W-25% Re alloy powder milled for 25 h was mixed with HfC particles (5 and 10 vol. %) and further xtilled for different milling times up to 15 h. FIGS. 19A and 19B show FESEM images of W-25 wt % Re-5HfC and W-25 wt % Re-10HfC composite powders mechanically alloyed for 15 h. Since the W-25 wt % Re matrix alloy powder was milled for 25 h to obtain a nanostructured single solid solution, as presented in FIG. 14D, further milling of the composite powders did not bring about significant change in the powders' particle shape and size. Elemental mapping of Hf and C in the composite powders mechanically milled for 5 and 10 h revealed that HfC particles remained relatively agglomerated as shown in FIGS. 20A and 20B containing 5 vol. % HfC and FIGS. 21A and 21B containing 10 vol.% HfC respectively. However, homogenous composite powders with uniform distribution of HfC particles was obtained with the increase in milling time to 15 h as it can be seen in typical x-ray mapping of Hf and C, in the composite containing 5 vol. % of HfC and 10 vol. % HfC, presented in FIG. 20C and FIG. 21C, respectively.

XRD Analysis of Synthesized Composite Powders

Figure 22:
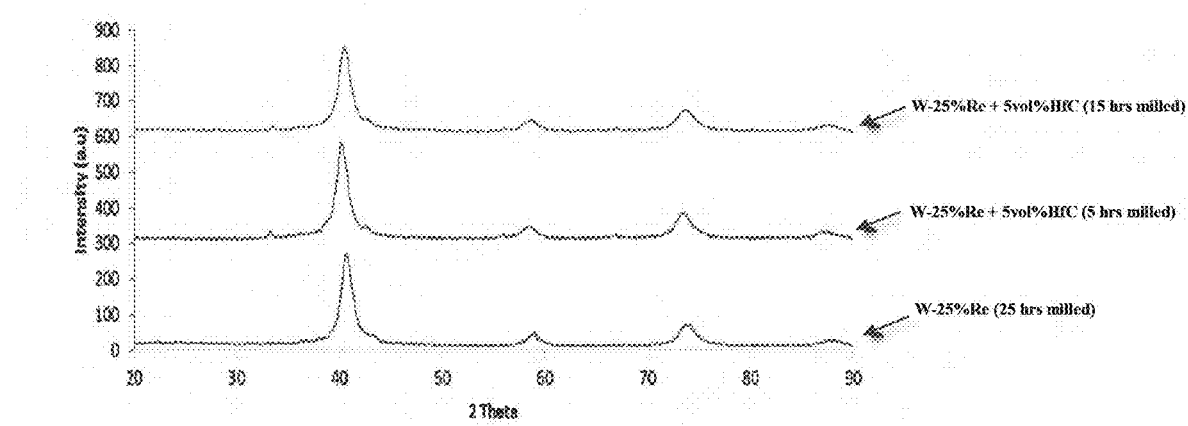
FIG. 22 represents XRD spectra of a milled composite of the alloyed W-25 wt % Re powder and 5 vol % hafnium carbide, after different milling times.

FIG. 22 shows the XRD patterns of the alloy and composites sample containing 5 vol % HfC milled for different length of time. XRD pattern of monolithic W-25% Re alloy milled for 25 hrs, the composite containing W-25% Re+5 vol % HfC milled for 5 h and 15 h is presented in this figure. As the milling for the synthesis of composites were performed by using a ball-to-powder ratio of 5:1 with a speed of 150 rpm, it did not result in the crystallite size reduction as evident from the broadening of the peaks. There is almost no broadening of peaks which confirms that the objective of uniformly distributing of second phase HfC was achieved without introducing strains in the composite powder.

EXAMPLE 5

Synthesis and Development of an Experimental Tool

This example deals with the consolidation of milled powders into cylindrical discs by using SPS. Spark plasma sintered specimens were characterized by metallography, field emission scanning electron Microscopy, X-ray Diffraction technique, microhardness, density determination by Archimedes and thermal conductivity. Later on, wear analysis was performed on these discs and wear morphology was studied by FESEM and optical profilometer.

Methodology

The prepared powders were consolidated using SPS equipment (FCT system, Germany), model HP D 5. More details on the SPS process were reported elsewhere. See W. M. Thomas, E. D. Nicholas, J. C. Needham, M. G. Murch, P. Templesmith, and C. J. Dawes, International Patent Application PCT/GB92/02203 and GB Patent Application 9125978.8, 1991, incorporated herein by reference in its entirety. Disc shaped specimens having 10 mm radius were produced with the help of a graphite die. A thermocouple was inserted through a drilled hole near the graphite die to record the temperature during the sintering process. In order to reduce the friction between the specimen powder and wall of the die, a graphite sheet was placed between them.

Compaction pressure of 50 MPa and heating rate of 100° C./min were used in all sintering experiments. The nanostructured W-25-wt. % Re alloy powder (milled for 25 h) was sintered at temperatures of 1500, 1700, and 1800° C. for 10 minutes, to determine the suitable sintering temperature; then the as-received W-25-wt. % Re powder and composites containing 5 and 10 vol. % HfC were sintered at 1800° C. for 10 minutes. Longer duration and very high temperatures were avoided in order to minimize the chances of diffusion of carbon in the sintered samples. See Shuaib, A. R., Al-Badour, F., & Merah, N. (2015, July). Friction Stir Seal Welding (FSSW) Tube-Tubesheet Joints Made of Steel. In ASME 2015 Pressure Vessels and Piping Conference (pp. V06BT06A005-V06BT06A005). American Society of Mechanical Engineers, incorporated herein by reference in its entirety. Jonathan et al. investigated the effect of temperature and holding time on the relative density of W-25% Re mixture during spark plasma sintering and it was found that with the increase of temperature and hold time, the relative density decreases. This is attributed to the diffusion of carbon from graphite dies.

EXAMPLE 6

Characterization of Consolidated Specimens

Metallography of Spark Plasma Sintered Specimens

A Hewlet Packard power supply devise, model 6216, was used to etch sintered samples. The etching process was performed in one molar concentrated solution of NaOH for 3 seconds at a voltage of 5 Volt. Tungsten base alloys and composites are generally difficult to etch by conventional etchants. Metallography feasibility of W-25% Re—HfC sintered samples was investigated by using different etchants for revealing the grain boundaries. Murakami reagent (10 g KOH or NaOH, 10 g potassium ferricyanide, 100 mL water), Lactic acid+HNO3 and NaOH were initially used in this study. Finally, sintered samples were electrolytically etched in 1 M NaOH solution. The consolidated samples were characterized microstructurally by optical microscopy and FESEM.

Figure 23:
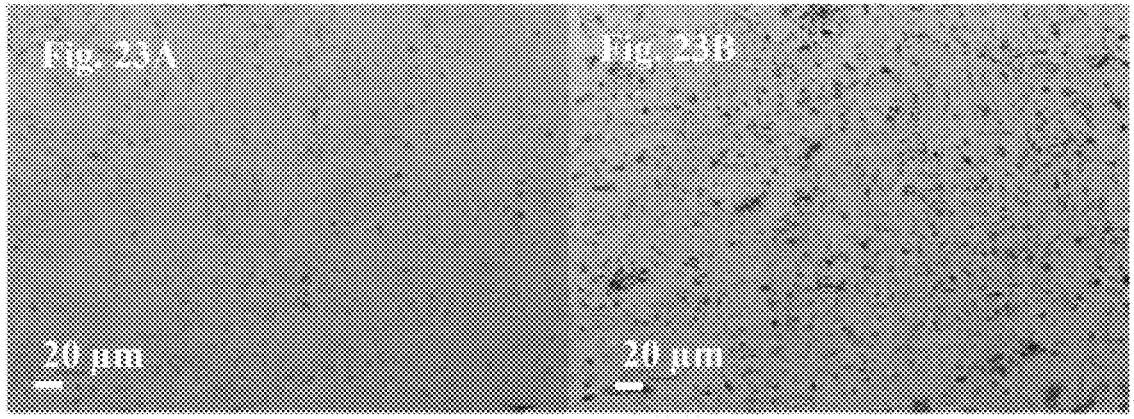
FIG. 23A is an optical image of a surface of W-25% Re before etching.
FIG. 23B is an optical image of a surface of W-25% Re after 15 minutes of etching with the Murakami reagent.
Figure 24:
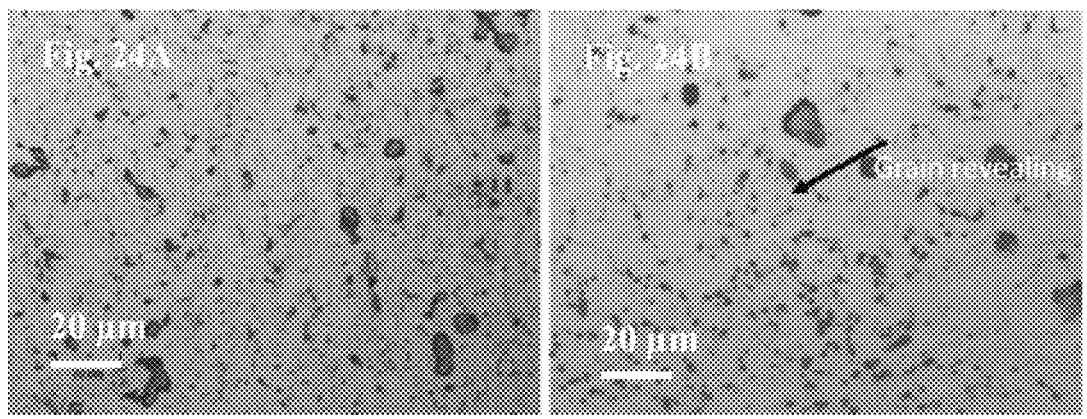
FIG. 24A is an optical image of a surface of W-25% Re after 3 minutes of etching with sodium hydroxide.
FIG. 24B is an optical image of a surface of W-25% Re after 15 minutes of etching with sodium hydroxide that reveals the grains.

Sintered samples were mounted, ground and polished. W-25% Re fully alloyed sintered at 1800° C. was etched for 1 to 15 min in Murakami reagent. Etching results in the form of optical images are shown in FIGS. 23A and 23B. The sample did not show any evidence of etching. Lactic acid+HNO3 was subsequently utilized for the same duration but this etchant was also proved ineffective in revealing the grain boundaries. This sample was etched with NaOH and results of etching are shown in FIGS. 24 and 25. The etchants reacted with the grain boundaries after 15 min but the etching process was still sluggish.

Electrolytic Etching

After achieving some success in revealing grain boundaries, NaOH was chosen for further investigation. Since the etching was sluggish, electrolytic or electrochemical etching was preferred to accelerate the etching process.

An electrolytic etching setup was used for the etching process. Accordingly, one molar concentrated solution of NaOH was prepared. The positive terminal of the low voltage direct current power supply was connected to the sample. The negative terminal was connected to a steel plate to make it cathode. Mounted samples were drilled small holes at the back to get connection and a screw was fitted in that hole. The screw touched the sample to make a secure connection. The sample was placed in the tank facing another plate which was attached to the cathode with a distance of 6 to 8 centimeters between them. Current flows from the sample to cathode resulting in the etching of the sample. The voltage was kept constant as 5 volt during the etching process. Specimens were etched for short time interval between 1 to 5 seconds and microstructural analysis was conducted after each etching step.

FIGS. 26A and 26B show the electrolytically etched optical images of the monolithic W25% Re alloy sintered at 1800° C. FESEM analysis of the samples conclude that optimized etching time was 3 seconds. Increasing time lead to over etching.

FE-SEM Analysis of SPSed Specimens

FIGS. 27A, 27B, and 27C show the FE-SEM images of the W-25% Re sintered at 1800° C. etched for different times. FIG. 27A shows the FESEM image of the sample etched that was etched for 3 seconds to reveal the grain boundaries. As the time is increased, over etching happened as shown in FIGS. 27B and 27C. A typical FE-SEM image of the microstructure of sample sintered at 1800° C. for 10 minutes is presented in FIG. 27A.

FIGS. 28A. 28B, and 28C show the FESEM images of the as-received pre-alloyed sample sintered at 1800° C. Secondary Electron (SE) and Back SE images of the etched sample shows that average grain size is approximately 10 μm. For the composite containing 5 vol % HfC, grain boundaries were revealed and HfC was found embedded in the matrix as shown in FIGS. 29A and 29B. This study was carried out at relatively low temperature to achieve nanocrystalline matrix reinforced with HfC. The sintered nanocrvstalline monolithic sample has an average grain size of 1-3 um. Due to lower temperature and shorter sintering time, the composite and fully alloyed specimens will retain their nanocrystallinity which will be discussed in detail in later stages.

The microstructure of the composite containing 5 vol. % HfC sintered at 1800° C. for 10 minutes is presented in FIGS. 29A and 29B. It reveals homogenous distribution of HfC in the matrix as indicated by arrows. In order to distinguish between different phases, both SE and BSE modes were used as shown in FIGS. 29A and 29B, respectively. It can be concluded that the homogenous dispersion of HfC in W-25 wt % Re-5HfC obtained by mechanical alloying was maintained in the sintered sample. This homogenous dispersion of the HfC particles, in the W-25 wt % Re-5HfC sintered composite, was confirmed through elemental mapping of Hf and C presented in FIGS. 31A, 31B, and 31C.

In addition, to the advantage of SPS in minimizing grain growth, further inhibition of grain growth in the composites is attributed to the presence of HfC particles. It was reported that HfC particles dispersed at the W grain boundaries inhibited the growth of W grains in HfC—W composites. See Dongju Lee, Malik Adeel Umer, Ho J. Ryu, Soon H. Hong, The effect of HfC content on mechanical properties HfC—W composites, Int. Journal of Refractory Metals and Hard Materials 44 (2014) 49-53, incorporated herein by reference in its entirety. Detailed features for the 5 vol % HfC are presented in FIG. 30A (SE mode) and 30B (BSE mode), which reveal the grain boundaries and homogenous dispersion of 5 vol % HfC in the monolithic nanocrystalline alloy. Composite containing 10 vol % HfC showed resistance to metallography (especially during polishing) due to the presence of relatively large amount of HfC contents and microstructural details were also not properly revealed as shown in FIG. 30C.

XRD Analysis for Consolidated Monolithic Alloy

Figure 32:
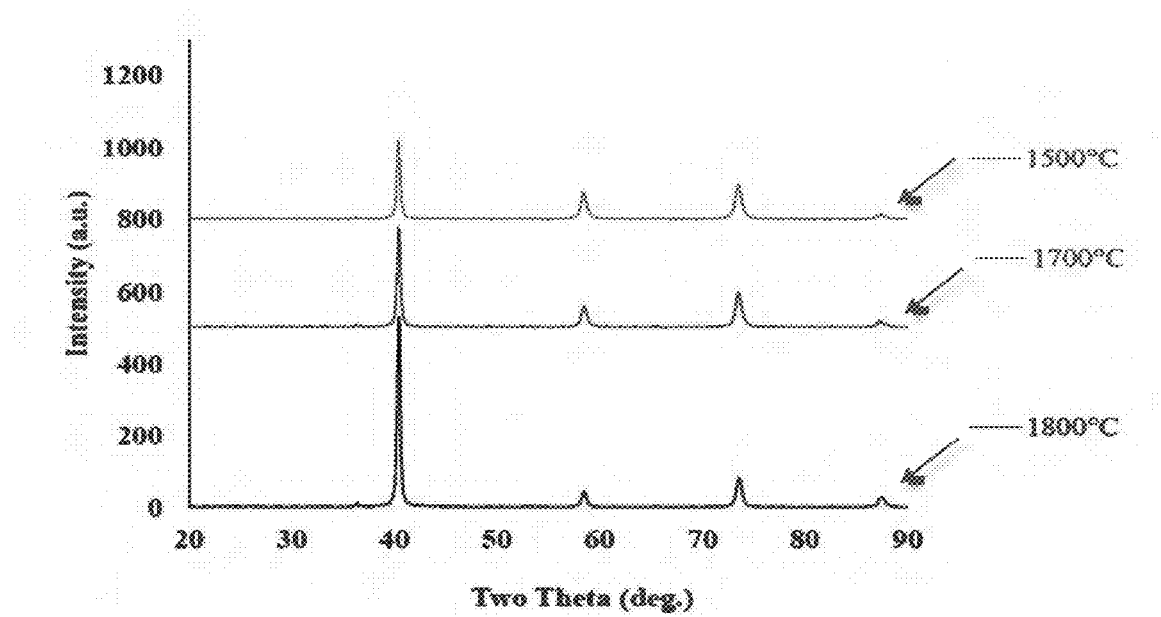
FIG. 32 represents XRD spectra of a sintered W-25 w%/Re powder at different sintering temperatures.

FIG. 32 shows XRD spectra of W-25 wt % Re alloy sintered at different temperatures for 10 minutes. It can be clearly seen that the intensity of the W—Re peaks increased and their broadening decreased with the increase in sintering temperature because of the increase in crystallite size. This is in fact the opposite of what occurred during milling. It is known that if polycrystalline materials are heated and left at high temperature, grain growth takes place to reduce the excess energy associated with grain boundaries. See J. M. Tao, X. K. Zhu, R. O. Scattergood, C. C. Koch, Mater. Design, 50 (2013) 22, incorporated herein by reference in its entirety. The calculated crystallite size of sintered W—Re is presented in FIG. 33. It is worth reiterating here that, before sintering, this crystallite size was 13 nm. Sintering at 1500° C. increased the crystallite size to 56 nm. The increase in sintering temperature to 1700° C. led to the increase in the crystallite size to 71 nm. Further increase in sintering temperature to 1800° C. resulted in further increase in crystallite size to 80 nm. FIGS. 32 and 33 show that the increase in sintering temperature resulted in the increase in crystallite size; and the higher the temperature, the more this growth was because of the enhanced diffusion rate. Isothermal grain growth dependence on temperature and time is generally described using the following simple equation:

$$G^n - G_0^n = Kt \qquad \text{Equation 4.1}$$

where $G_0$ and $G$ are the grain sizes at initial time $t_0$ and isothermal holding time t, respectively. K is the material's constant that depends on the temperature:

$$K = K_0 \exp\left(\frac{-Q}{RT}\right) \qquad \text{Equation 4.2}$$

where Q is the activation energy for grain growth, R is the gas constant and T is temperature. Although sintering led to crystallite size growth in all samples, the average crystallite size of the W—Re solid solution remained in the nanometer range and did not exceed 80 nm. In SPS, it is claimed that a local high temperature-state is generated momentarily because of spark discharge that takes place in the gap or at the contact point between particles. This leads to evaporation or melting on the surface of particles and formation of necks. In addition to the high-localized temperature, the applied pressure and current improve heating rates and reduce sintering time and temperature. Therefore, nanopowders might be consolidated using SPS without excessive grain growth. Crystallite sizes of the tungsten phase in composites containing 5 and 10 vol. % HfC, sintered at 1800° C. for 10 minutes, were 71 and 64 nm, respectively, compared to the monolithic sample, sintered under the same conditions, which had a crystallite size of 80 nm. Overall, the crystallite size of the matrix phase in the sintered composites remained in the nanometer range and did not exceed 100 nm.

Density and Microhardness

The bulk density of the consolidated samples was measured according to the Archimedes principle using Metler Toledo balance density determination KIT model AG285. Digital microhardness tester (Buehler, USA) was used to measure the microhardness of the developed materials. The obtained hardness values were the average of 10 readings. Conditions of a load of 300 gf and a time of 12 s were used in all measurements.

Figure 34:
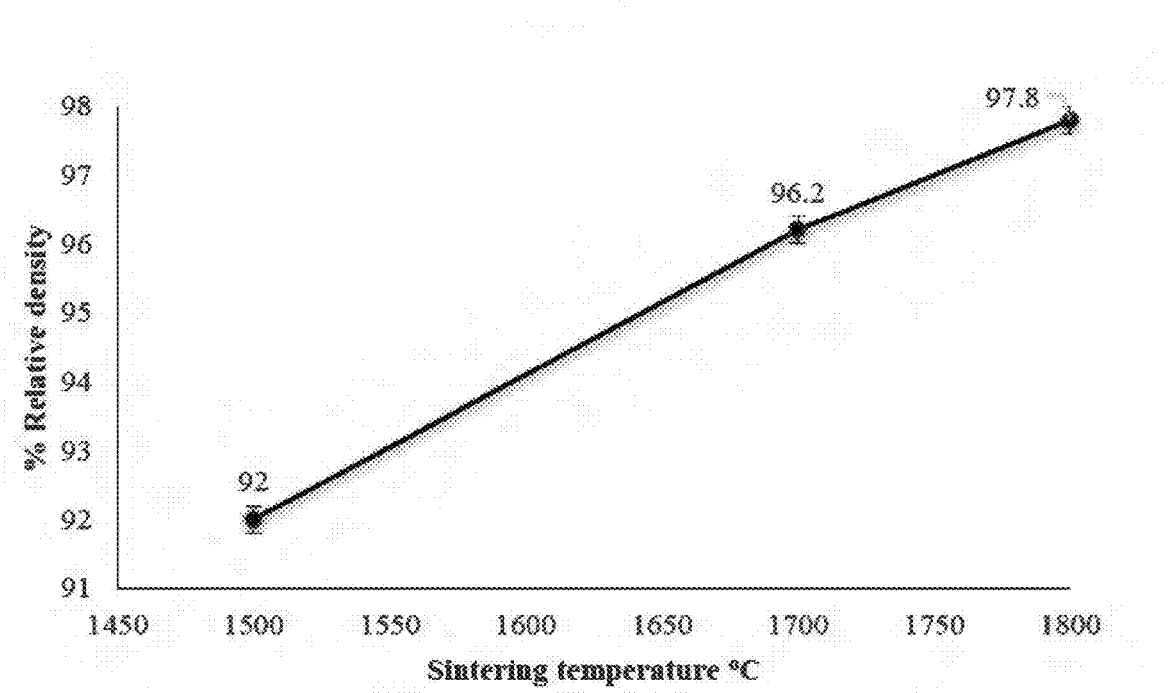
FIG. 34 represents a relative density of the sintered W-25 wt % Re powder at different sintering temperatures.
Figure 35:
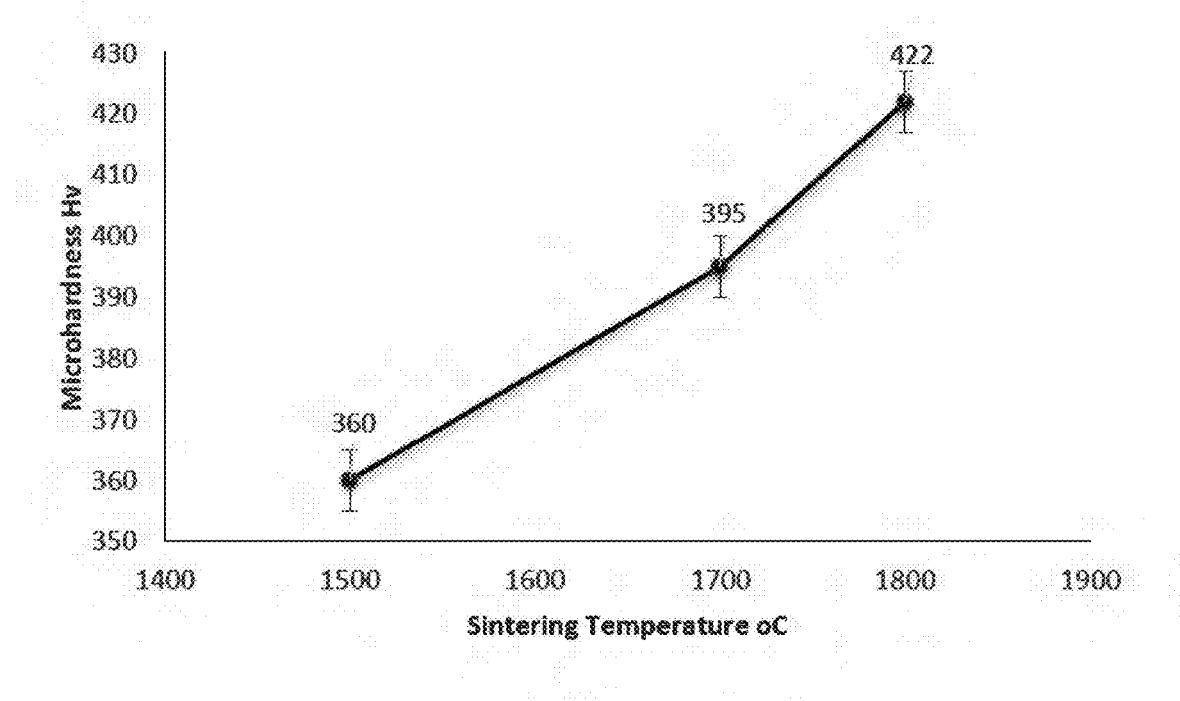
FIG. 35 represents a microhardness of the sintered W-25 wt % Re powder at different sintering temperatures.

Relative density and hardness of the fully alloyed and consolidated W-25 wt % Re is presented in FIGS. 34 and 35. The sample consolidated at 1500° C. for 10 minutes had a relative density of 92%. The increase in sintering temperature to 1700° C. increased its relative density to 96.2%. A further increase in sintering temperature to 1800° C. increased its relative density to 97.8%. Overall, the relative density increased with the increase in sintering temperature because of the enhanced diffusion rate. See R. M. German, Sintering Theory and Practice. New York, John Wiley, (1996), incorporated herein by reference in its entirety.

Therefore, the higher the sintering temperature, the higher the diffusion rate and the lower the remaining pores. This can be explained through the dependence of density on sintering temperature as follows.

$$\rho = s\left(\frac{T}{T_m}\right) + b \qquad \text{Equation 4.3}$$

where, $\rho$ is the relative density, s is the temperature sensitivity, T is the sintering temperature, and $T_m$ is the melting temperature. See J. E Garay, "Current-Activated, Pressure-Assisted Densification of Materials," Annual review of materials research, vol. 40, pp. 445-468, 2010. ORRÙ R, LICHERI R, MARJO A LOCCI, CINCOTTI A, CAO G, incorporated herein by reference in its entirety. On the other hand, the externally applied pressure contributes to the rearrangement of particles and breakdown of agglomerates. This leads to the increase in driving force for sintering. In addition, in SPS process, spark plasma, spark impact pressure, Joule heating, and an electrical field diffusion effect could be generated by the DC pulse discharge. See Consolidation/synthesis of materials by electric current activated/assisted sintering. Mater Sci Eng R. 2009, 63: 127-287; VISWANATHAN V, LAHA T. BALANI K, AGARWAL A, SEAL S. Challenges and advances in nanocomposite processing techniques. Mater Sci Eng R, 2006, 54: 121-285: ADACHI J, KUROSAKI K, UNO M, YAMANAKA S. Porosity influence on the mechanical properties of polycrystalline zirconium nitride ceramics. J Nucl Mater, 2006, 358: 106-110; and JIN X, GAO L, SUN J. Preparation of nanostructured Crl-xTixN ceramics by spark plasma sintering and their properties [J]. Acta Mater, 2006, 54: 4035-4041, each incorporated herein by reference in their entirety. The formation of plasma enhances sintering, however, the role of current is still not clear. See KIM Y H, SEKINO T, KUSUNOSE T, NAKAYAMA T, NIIHARA, K. KAWAOKA H. Electrical and mechanical properties of K, Ca ionic-conductive silicon nitride ceramics [J]. Ceram Trans, 2005, 165: 31-38, incorporated herein by reference in its entirety. It is believed that a local high temperature state momentarily occurs in the gap between particles of the powder because of the spark discharge. This induces vaporization and melting of the surfaces of the powder particles, which significantly increases diffusion rate and leads to higher densification.

Figure 36:
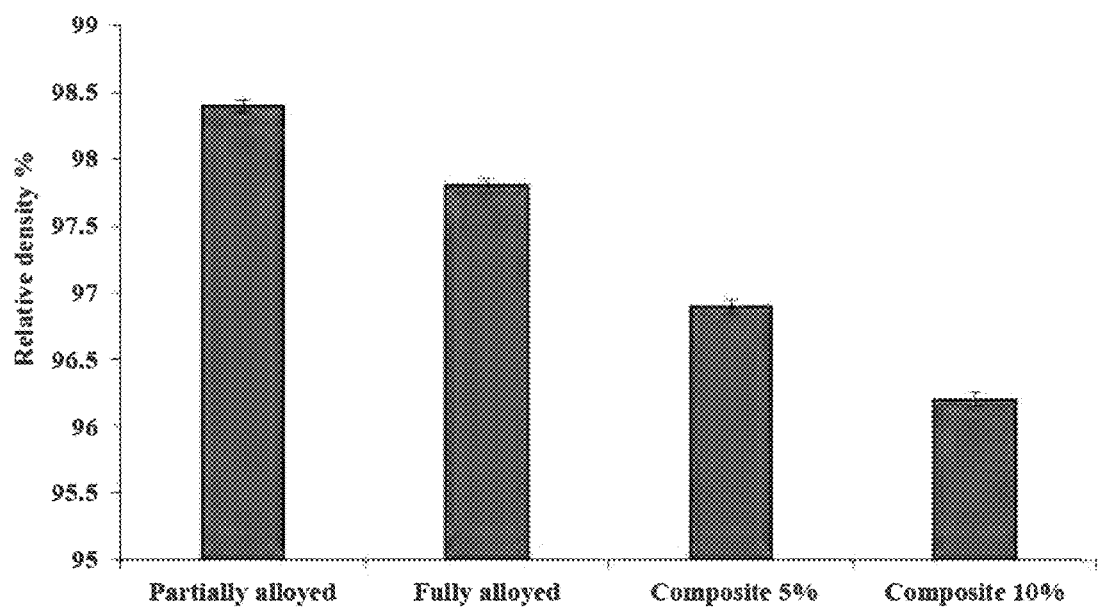
FIG. 36 represents a relative density of various sintered composites at a sintering temperature of 1800° C.
Figure 37:
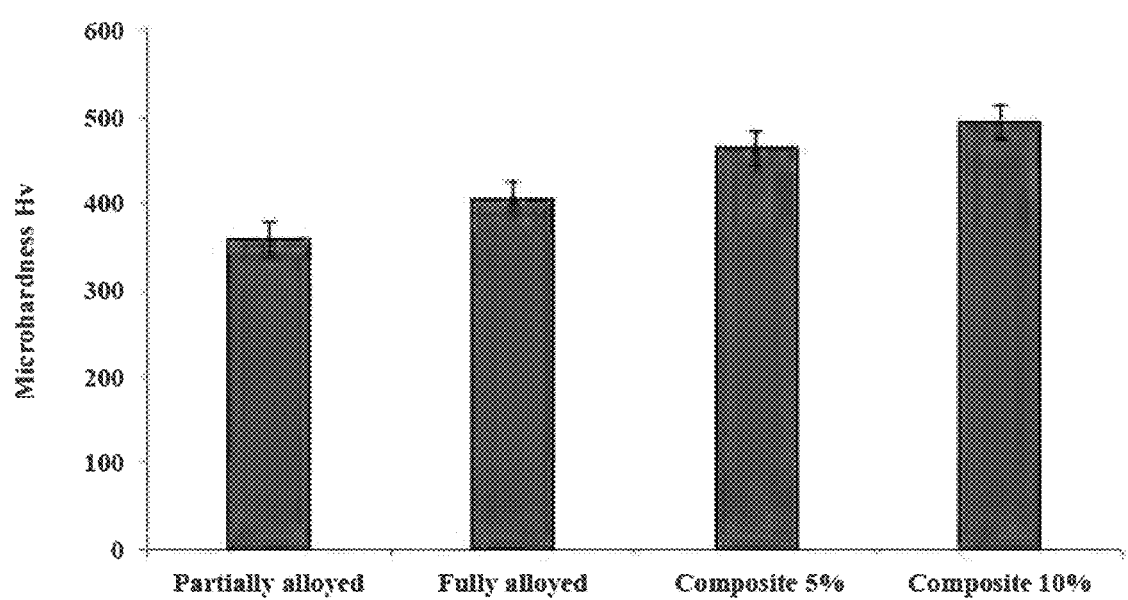
FIG. 37 represents a microhardness of various sintered composites at a sintering temperature of 1800° C.

The sample consolidated at 1500° C. for 10 minutes had a microhardness of 360. The increase in sintering temperature to 1700° C. increased its microhardness to 395. A further increase in sintering temperature to 1800° C. increased its microhardness to 422. The hardness of a sintered material mainly depends on its grain size and porosity. Generally, the grain size d dependence of the yield stress $\sigma_{y3}$ is described by a general expression (Hall-Petch relationship)

$$\sigma_{ys} = \sigma_0 + kd^{-1/2} \qquad \text{Equation 4.4}$$

where $\sigma_0$ is the lattice friction stress, k is a Hall-Petch slope. Vickers hardness of a polycrystalline material can be related to its yield strength through a simple relationship $H_v/\sigma_{ys} \approx 3$. Therefore, the hardness $H_v$ can be related to the grain size by $$H_v = H_0 + kd^{-1/2} \qquad \text{Equation 4.5}$$

where $H_0$ and k are constants. It is clear from the above relationship that the increase in the grain size reduces the hardness of a material. However, hardness of the alloy increased despite the increase in the grain size because of the fact that during sintering pores are eliminated and the density of the material increases. Therefore, the hardness of the material strongly depends on its relative density and the effect of grain growth will be small. This is more meaningful, specifically with a process such as spark plasma sintering where the heating rate is high, the sintering temperature is low, and the sintering time is short compared to other conventional sintering processes. See K. Rajeswari, U. S. Hareesh, R. Subasri, D. Chakravarty, R. Johnson, Science of Sintering, 42 (2010) 259; V. Pouchly, K. Maca, V. Xiong, J. Z. Shen, Science of Sintering, 44 (2012) 169; and D. Veljović, G. Vuković, I. Steins, E. Palcevskis, P. S. Uskoković, R. Petrović, D. Janaćković, Science of Sintering, 45 (2013) 233, each incorporated herein by reference in their entirety. This leads only to very marginal grain growth as explained above, and therefore the hardness is mainly influenced by density. Since higher density and hardness were obtained at a sintering temperature of 1800° C., all other samples were sintered at this temperature for 10 min. FIGS. 36 and 37 show the relative density and hardness of partially alloyed W-25 wt % Re, fully alloyed W-25 wt % Re, W-25 wt % Re-5HfC composite, and W-25 wt % Re-10HfC composites sintered at 1800° C. for 10 min. The partially and fully alloyed samples had relative densities of 98.2 and 97.8%, respectively. The composites containing 5 and 10 vol. % of HfC processed relative densities of 96,9 and 96.2%, respectively. The composites containing 5 and 10 vol. % HfC displayed slightly reduced relative density by −P0.92 and −P1.63%, respectively, with respect to the fully alloyed monolithic alloy; and by −P1.32 and −P2.03%, respectively, with respect to the partially alloyed monolithic alloy.

Compaction of nanostructured powders or nanocomposites reinforced with hard particles is believed to be more difficult than compaction of their conventional counterparts because of the larger stresses required and the higher spring back. Therefore, nanostructured green compacts usually contain remaining pores, and may not sinter to full density easily. See Grácio, Picu, C. R.; Vincze, G.; Mathew, N.; Schubert, T.; Lopes, A.; Buchheim, C. Mechanical Behavior of Al—SiC Nanocomposites Produced by Ball Milling and Spark Plasma Sintering. Metallurgical and Materials Transactions A 2013, 44, 5259-5269; Kamrani, S., Razavi Hesabi, Z., Riedel, R., Seyed Reihani, S. M. Synthesis and characterization of Al—SiC nanocomposites produced by mechanical milling and sintering, Advanced Composite Materials 2011, 20, 13-27; Candido, G. M.; Guido, V.; Silva, G.; Cardoso, K. R. Effect of the Reinforcement Volume Fraction on Mechanical Alloying of AA2124-SiC Composite, Materials Science Forum 2012, 660-661, 317-324, each incorporated herein by reference in their entirety. On the other hand, the addition of a reinforcement usually lowers the densification of the composite specifically at large volume fraction. As can be clearly seen in FIGS. 36 and 37, the evolution of Hardness of sintered samples, as presented in FIGS. 34 and 35, followed the same trend as in densification. The partially alloyed sample had a microhardness of 360. The fully alloyed sample had a microhardness of 423. Since the two alloys possessed very close relative densities i.e. 98.2 and 97.8%, respectively, the higher hardness of fully alloyed sample is attributed the effect of mechanical alloying because the fully alloyed sample was milled for an additional 25 h.

The addition of 5% HfC increased the microhardness to 450. Further increase in HfC content to 10 vol. % increased the microhardness to 495. The composites containing 5 and 10 vol. % of HfC possessed improved hardness by −P11 and −P22%, respectively, with respect to the fully alloyed monolithic alloy; and by −P25 and −P37.5%, respectively, with respect to the partially alloyed monolithic alloy. The composite containing 10 vol. % of HfC possessed the highest Vickers hardness value of 495. As for the composites, the increase in hardness can be attributed to the same factors which lead to the increase in the strength of particle reinforced metal matrix composites. This include small grain size of the matrix (Hall Petch theory), presence of particles (Orowan strengthening), increase in dislocations' density, load transfer from the matrix to the reinforcement, and strain gradient. See Munoz-Morris, M.; Garcia Oca, C.; Morris, D. An analysis of strengthening mechanisms in a mechanically alloyed, oxide dispersion strengthened iron aluminide intermetallic. Acta. Mater. 2002, 50, 2825-2836; Dai, L.; Ling, Z.; Bai, Y. A strain gradient-strengthening law for particle reinforced metal matrix composites. Scripta Mater. 1999, 41, 245-252; Chawla, N.; Shen, Y.-L. Mechanical behavior of particle reinforced metal matrix composites. Adv. Eng. Mater. 2001, 3, 357-370; and Casati, R.; Vedani, M. Metal matrix composites reinforced by nano-particles-a review. Metals 2014 4, 65-83, each incorporated herein by reference in their entirety.

The decrease in grain size leads to the increase in grain boundaries, which has a significant influence on strength. This is because grain boundaries restrict dislocation motion due to the different orientation of adjacent grains and the discontinuity at the highly disordered grain boundary region. In Orowan strengthening, the moving dislocations bow out between particles and yielding takes place when the bowed-out dislocations become semi-circular in shape, after that dislocations leaves Orowan loops around the particles. These loops hinders dislocation movement, which leads to work hardening. On the other hand, during cooling from sintering temperature to room temperature, geometrically necessary dislocations are formed due to the difference in coefficient of thermal expansion and modulus of elasticity between the reinforcement and the matrix. This leads to strain hardening of the material.

Thermal Conductivity

Figure 38:
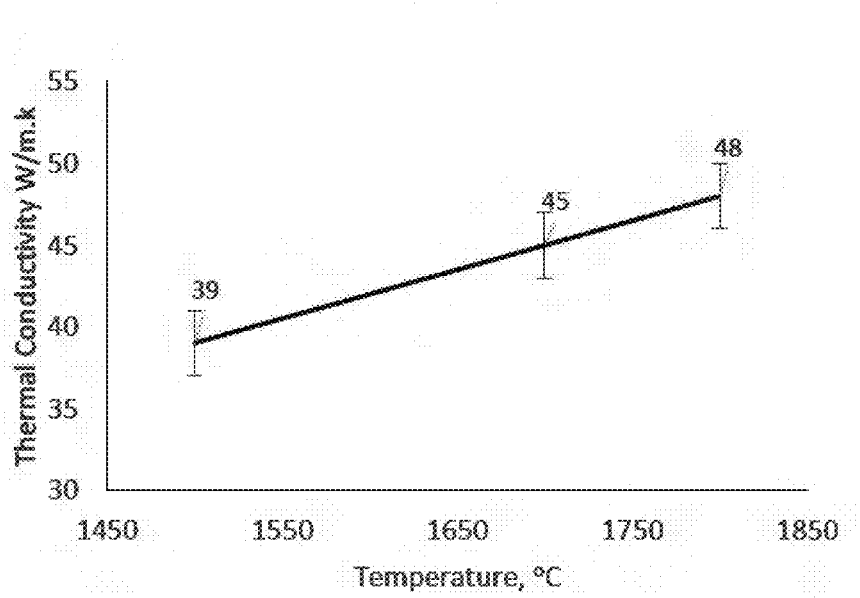
FIG. 38 represents a thermal conductivity of the sintered W-25 wt % Re powder at different sintering temperatures.
Figure 39:
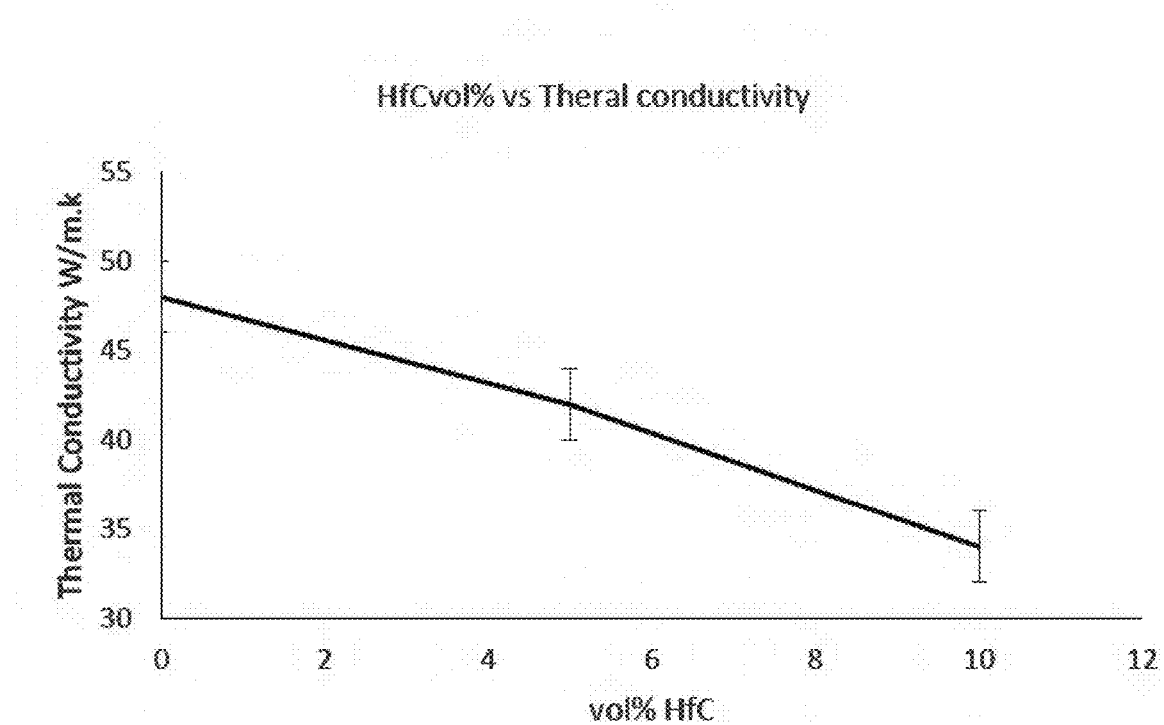
FIG. 39 represents a thermal conductivity of various sintered composites having different hafnium carbide contents.

Thermal conductivity analysis for the consolidated specimens were carried out by Thermal Conductivity Analyzer equipment. Three drops of water were used to make a contact between the specimen and the thermal conductivity probe. Thermal conductivity behavior of monolithic W-25 wt % Re alloy sintered at 1500° C., 1700° C. and 1800° C. is presented in FIG. 38. It was found that thermal conductivity was increased with the rise of consolidating temperature. The increase in TC (thermal conductivity) can be attributed to the high relative density achieved at high temperature as discussed in previous section. At high temperature, degree of porosity will be reduced and particle to particle contact will be more compact and as a result thermal conductivity will be increased. Thermal conductivity of the composites consolidated samples were found to decrease with the increase of HfC contents as shown in FIG. 39. HfC has a lower thermal conductivity than the monolithic metallic matrix as a result thermal conductivity decreases with the increase of HfC contents.

Sliding Wear Behavior

Figure 40:
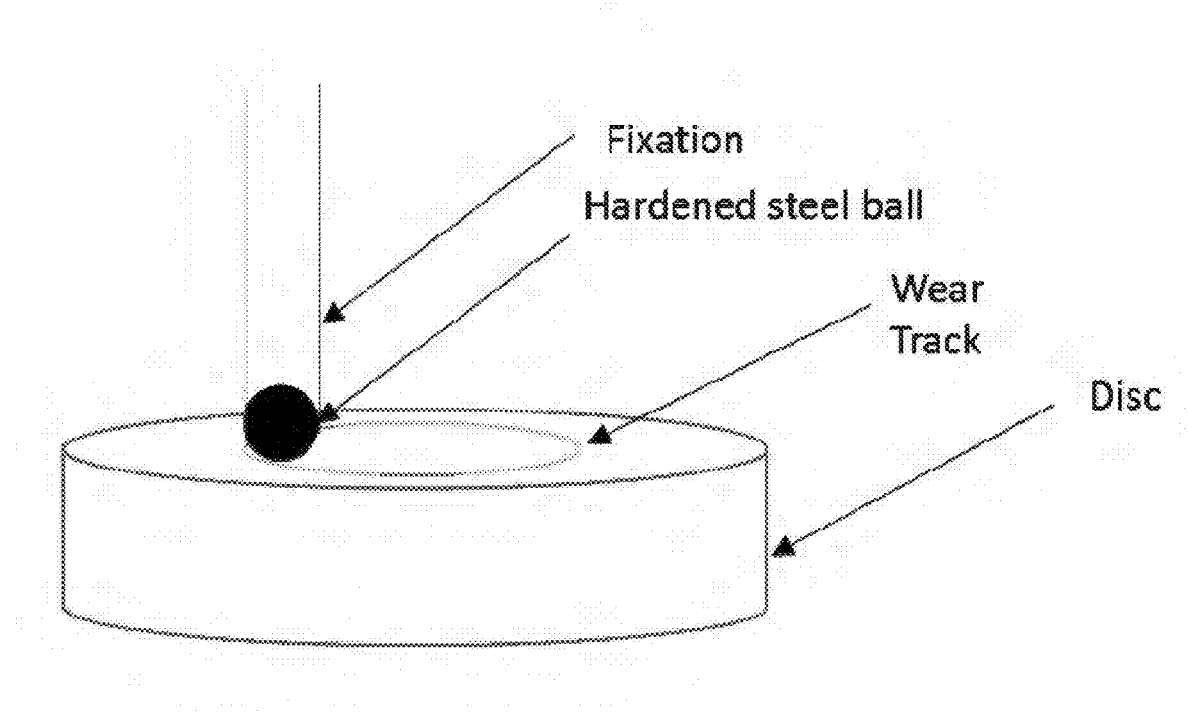
FIG. 40 is a schematic of a ball-on-disc setup for a wear test.

Wear characteristics of monolithic W-25 wt % Re alloy sintered at 1500° C. and 1800° C. and W-25% Re-5HfC composite sintered at 1800° C. have been investigated in dry sliding conditions against a steel counter face using a pin-on-disk equipment as shown in FIG. 40. W-25 wt % Re-10HfC composite was also tested under same conditions but it got heated and resulted in extensive wear of the pin so wear behavior of this composite is not included in this section. Cylindrical discs having diameter of 20 mm and a height of 4 mm were prepared from sintered monolithic alloy and the composite. Specimens were cut into discs for the wear tests and surface was prepared for metallography analysis. After metallography, specimens were electrolytically etched in 1 M NaOH for 3 seconds to reveal the microstructure. Before the start of each wear experiment, the specimens and the balls were both rinsed ultrasonically in acetone. Experiments were carried out by using Oscillating Tribometer Testing Machine. Tests were performed according to ASTMG 99 standards with a load of 5-15N. The linear sliding speed was 50 mm/s and the total sliding distance was 100 m with an angular velocity of 120 rpm. The tests were performed at ambient temperature. Wear analysis of worn out surfaces and wear debris of nine specimens was carried out by using FE-SEM and optical profilometer. Wear rate and Coefficient of Friction COF were calculated from the test data.

Morphology of Worn Surfaces

FIGS. 41A, 41B, and 41C show FE-SEM images of wear tracks for monolithic and composite specimens. It can be observed that wear track profiles are different in size for the alloy SPSed at two different temperatures as shown in FIGS. 41A and 41B, and composite sample as shown in FIG. 41C. Significant improvements in wear resistance, as indicated by the reduction in wear track width, was attained by increasing sintering temperature from 1500° C. to 1800° C. This can attributed to a reduced microcracking in the materials due improved density, hardness and reduced porosity as explained earlier and reported by other researcher. See B. K. Prasad, K. Venkateswarlu, O. P. Modi, A. H. Yegneswaran, J. Mater. Sci. Lett. 15 (1996) 1773, incorporated herein by reference in its entirety.

Sintering is a thermally activated process controlled mainly by diffusion. Monolithic sample sintered at 1500° C. shows greater amount of wear which can be attributed to extensive ploughing actions for the poorly bonded sintered sample. As porosity increases, the wear becomes more prominent because pores acts as a source of crack nucleation and propagation leading to excessive sub-surface fracturing.

Wear resistance was further enhanced by the addition of HfC in the matrix as shown in FIG. 41C. The improvement in the wear resistance of the composite was attributed to improved microhardness due to the increase in the volume fraction of the relatively hard second phase reinforcement. See M. Y. Nazmy, in: N. S. Staloff, V. K. Sikka (Eds.), Physical Metallurgy and Processing of Intermetallic Compounds, Chapman & Hall, New York, 1996, p. 120, incorporated herein by reference in its entirety.

FIGS. 42A, 42B, 42C. and 42D show the wear morphology of the monolithic alloy sintered at 1500° C. It has gone for extensive wear with a width of wear track of 820 μm and a depth of 10 μm as indicated by optical profile presented in FIG. 42A. The worn out material tends to buildup on the inner and outer periphery of wear track as depicted in FIG. 42B. A prominent surface damage with deformed appearance can be observed on the wear track.

The shape of the debris looks like flakes as noticed in FIG. 42C. To understand the wear mechanisms, surface grooves and marks were analyzed. It can be inferred from the micrographs that wear is predominantly an abrasive in nature. The specimen has lower density and has greater amount of porosity due to lower sintering temperature as discussed earlier. Moreover, it has been reported by some researchers that wear resistance of a material, synthesized by powder metallurgy, is very sensitive to the amount of pores present in the sample. See H.-L. Lee, W.-H. Lu, S. L.-I. Chan. Abrasive wear of powder metallurgy Al alloy 6061-SiC composites, Wear 159 (1992) 223-231, incorporated herein by reference in its entirety.

FIGS. 43A, 43B, 43C, and 43D show the wear track images and its detailed morphology for the monolithic sample sintered at 1800° C. It is evident that material has been removed due to ploughing action of the ball on the material. In some areas, the presence of grooves on the worn surface was indicative of abrasive wear due to presence of abrasive marks, parallel grooves and stripes on the track. Pockmarks representing regions from which large chunk of material have been removed can also be observed. FIG. 43A shows optical profile image which illustrates considerable reduction of track width from 821 μm to 185 μm when sintering temperature was increased from 1500° C. to 1800° C. Track depth was found to be 1.5 μm. The reduction in wear damage at 1800° C., can be explained on the bases of enhanced diffusion at high temperature and improved density due to more elimination of porosity at high temperature.

FIGS. 44A, 44B, 44C, 44D, and 44E show the FESEM images of the wear profile and morphology of debris of composite specimen. FIGS. 44B and 44C show that large areas were covered with wear debris. These small sized wear debris have been removed from the material by adhesive wear as shown in FIGS. 44D and 44E. The addition of HfC in the monolithic alloy has reduced the width of the track from 185 μm to 145 μm and depth from 1.5 μm to of 1.1 μm as shown in FIG. 44A. The higher wear resistance of the composite can be attributed to its higher values of hardness as compared to the monolithic alloy. To further understand the difference in wear behavior between alloy and composite, debris and sliding configuration were observed. There are no marks of abrasive wear on the wear track as depicted for alloy sample.

Each of the debris has a shape of a rounded chip. The wear mechanism can be identified as adhesion. Continuous sliding friction between HfC and matrix could be a source of detachment of HfC particles. It is difficult to confirm any signs for existence of abrasive wear as there were no parallel grooves on the track profile. Wear resistance dominantly rely on the dispersion of second phase and consolidation technique. See I.-Y. Kim, J.-H. Lee, G.-S. Lee, S.-H. Baik, Y.-J. Kim Y.-Z. Lee, Friction and wear characteristics of the carbon nanotube-aluminum composites with different manufacturing conditions, Wear 267 (2009) 593-598, incorporated herein by reference in its entirety.

Wear Rate Study

Figure 45:
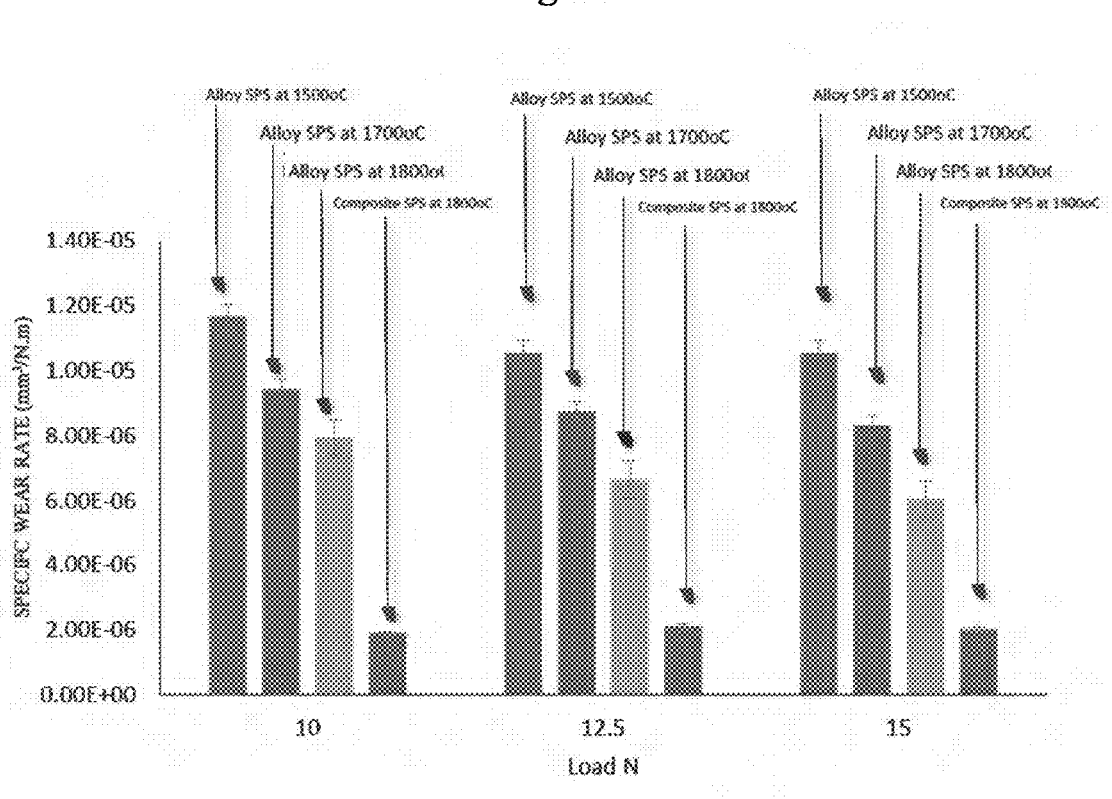
FIG. 45 represents wear rates of various composites tested at 5, 10 and 15 N for a 10 m sliding, distance.

FIG. 45 shows the comparison of preliminary results of specific wear rate for different loads for a sliding distance of 10 m. These results show a trend for load, sintering temperature and reinforcement contents. Wear rate increases with the increase of load and decrease with the increase of sintering temperature and reinforcement contents. Since amount of wear was not significant due to smaller sliding distance, so another set of experiments were performed to get a conclusive evidence.

FIG. 45 shows the wear behavior of monolithic sample sintered for different temperature and composite containing 5 vol % HfC sintered at 1800° C. A trend for increase in wear resistance can be observed from these bar graphs with the increase of sintering temperature and by the addition of HfC contents. Wear resistance was found to decrease with the increase of load. Since the wear rate order is low for 10 m sliding distance, another set of experiment was performed for a sliding distance of 100 m.

Figure 46:
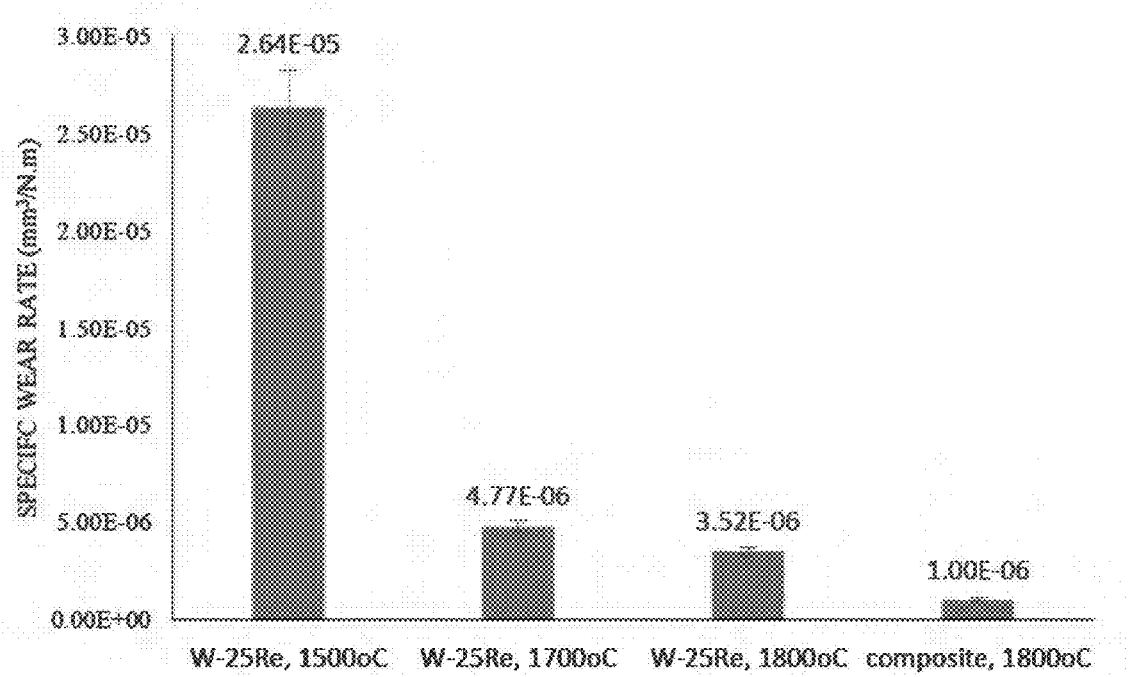
FIG. 46 represents a specific wear rate for various composites.

FIG. 46 shows the comparison of wear rate of alloy and composite specimens. It also provides the effect of sintering temperature on the wear resistance of alloyed specimen. Wear resistance is improved with the increase of sintering temperature. This is in agreement with the FESEM analysis of the wear profile. This trend is also exhibited by most metallic materials. See J. Halling, Wear 35 (1975) 239; J. F. Archad, J. Appl. Phys. 24 (1953) 981; and A. J. Clegg, A. A. Das, Brit. Foundryman 70 (1977) 333, each incorporated herein by reference in their entirety. An improvement in wear resistance was attained due to the enhanced consolidation and improved hardness of alloy with the increase of temperature as shown in FIG. 46. The wear resistance was further improved for composite due to strengthening by the second phase hafnium carbide. This fact is supported by the laws of wear i.e. the wear rate of a material is inversely proportional to the hardness of the softer sliding component. See A. D. Sarkar, Wear of Metals, Pergamon Press, Oxford, 1976, p. 49, incorporated herein by reference in its entirety. A comparison of relative density, microhardness and wear is presented in Table 4. The results showed that relative density, microhardness and consequently wear resistance was increased for monolithic alloy with the increase of sintering temperature. Wear resistance was found to improve with the addition of 5 vol % HfC in W-25 wt % Re matrix.

TABLE 4

Effect of sintering temperature and HfC on hardness and relative density

| Composition | Temperature (° C.) | Microhardness (Hv) | Relative density (%) | Spec. wear rate (mm³/N · m) |
|---|---|---|---|---|
| W—25%Re | 1500 | 360 | 92.2 | 2.64E–05 |
| W—25%Re | 1700 | 396 | 96.5 | 4 77E–06 |
| W—25%Re | 1800 | 425 | 98.3 | 3.52E–06 |
| 5 vol % HfC | 1800 | 495 | 95.2 | 1.00E–06 |

Figure 47:
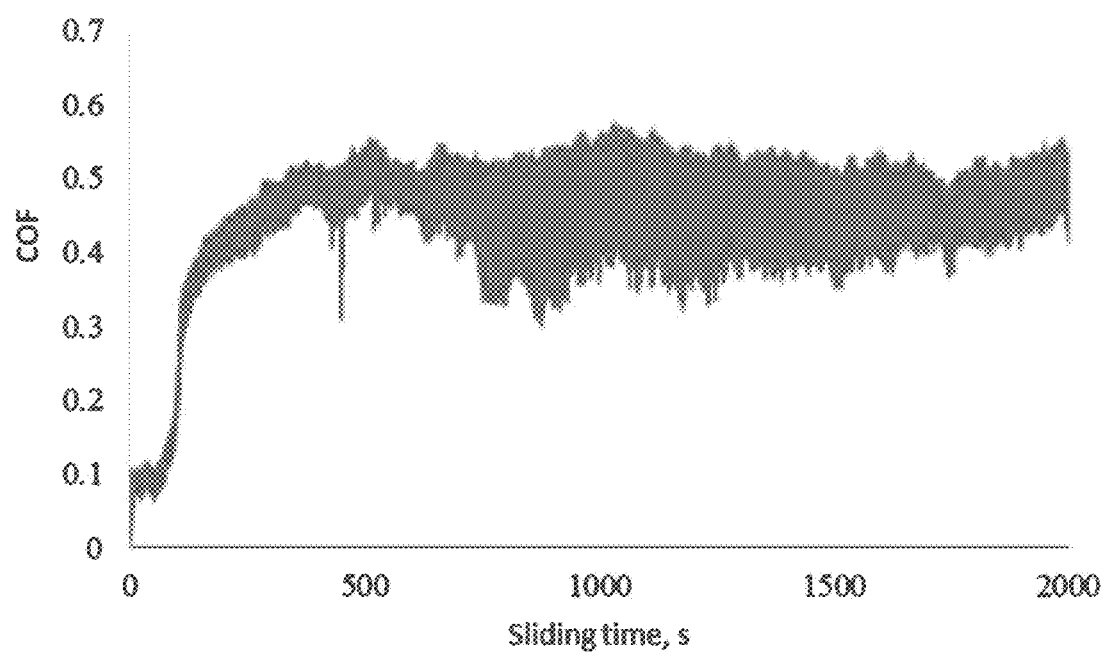
FIG. 47 represents a coefficient of friction for the sintered W-25 wt % Re powder that is sintered at 1500° C.
Figure 48:
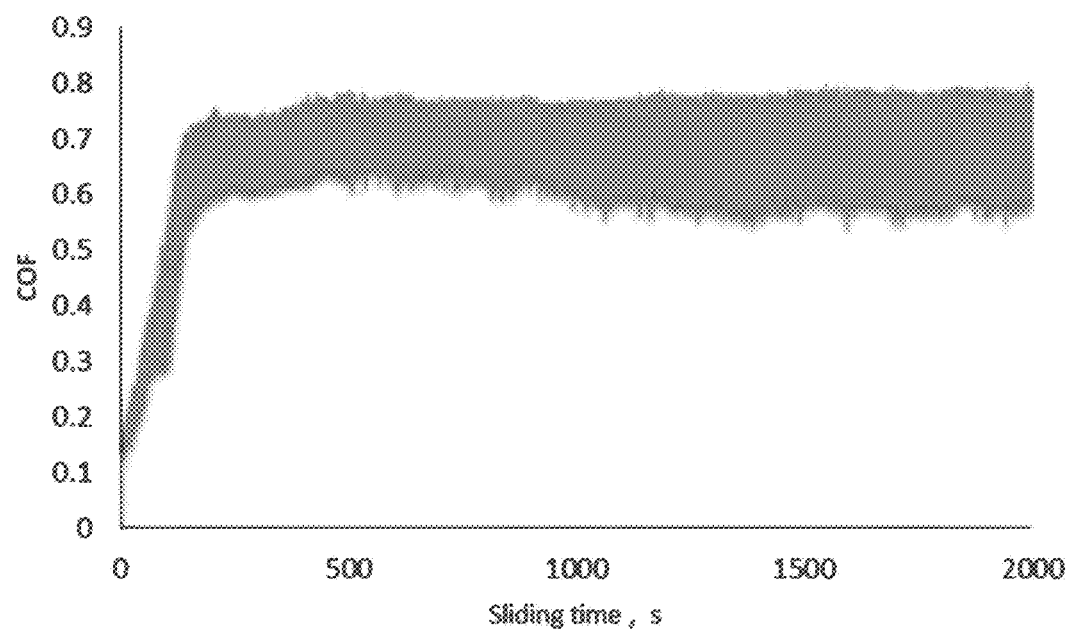
FIG. 48 represents a coefficient of friction for the sintered W-25 wt % Re powder that is sintered at 1800° C.
Figure 49:
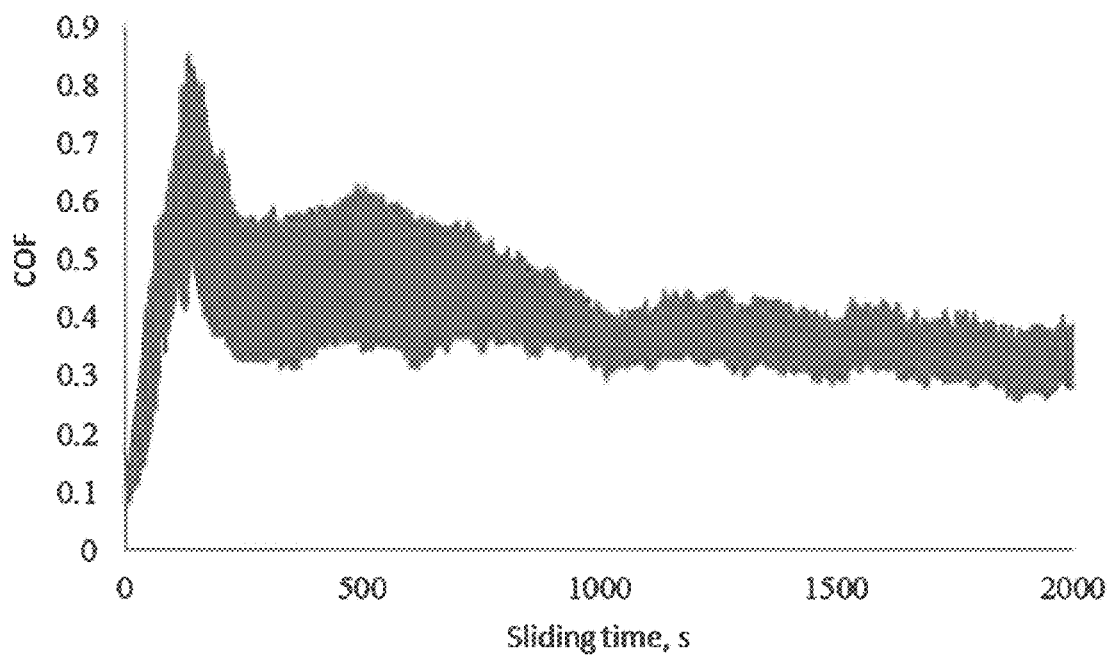
FIG. 49 represents a coefficient of friction for the sintered composite of the alloyed W-25 wt % Re powder and 5 vol % hafnium carbide that is sintered at 1800° C.

FIG. 47 shows the coefficient of friction (COF) of monolithic alloy vanes between 0.35 and 0.52 when sintered at 1500° C. with no evidence of steady state for these conditions. FIG. 48 shows the coefficient of friction alloy specimen sintered at 1800° C. The COF varies between 0.63 and 0.76 which can be due high contact forces between the surfaces.

Initially friction coefficient of the monolithic alloy increased continuously and remained steady for the remaining interval of the experiments.

Initial stage behavior can be attributed to a polishing process during the wear test, trying to establish a smooth wear track surface, by plowing away the surface asperities or roughness irregularities. However, COF remained steady at an average value of 0.39 for the remaining time interval. It is also evident that the composite's friction coefficient is not only lower but also has considerably less fluctuation as compared to the monolithic alloy.

EXAMPLE 7

Friction Stir Welding of High Melting Point Materials

The main objective of this section is to study the performance of an extruded W-25% Re pin tool for the FSW of ASTM A516 Grade 70 mild steel plates. The outcome of this part will provide base line parameters for the feasibility of newly developed pin tool in FSW of steel in later stages. The pin tool was designed by Edison Welding Institute (EWI) and manufactured using extrusion by Rhenium Alloys Inc., in the USA. Main emphasis will be put on the wear behavior of the tool. It will also cover the effect of Friction Stir Welding (FSW) process parameters such as tool rotation speed on the quality of the bead. Tool reactions forces, microstructural features along with microhardness behavior were investigated by varying tool rotational speed.

Experimental Set-Up

A set of single-pass partial penetration bead on plate (BOP) were produced using fully instrumented MTI (Manufacturing Technology Inc.) Model RM-1 friction stir welding machine. Proprietary W-25 wt. % Re tool was used to produce the beads on ASTM A516 Grade 70 carbon steel plates containing 0.25% C and 0.24% Si. ASTM A516 Grade 70 is widely used in producing pressure vessels and heat exchangers.

A schematic diagram presenting the initial tool pin-shoulder dimensions is shown in FIG. 50A (Tool shape) and 50B (tool geometry in mm) along with FSW tool photograph. The tool consists of a simple tapered tool pin and a flat shoulder. This tool geometry was adopted for seal welding applications where full penetration is not required. In all tests, welding speed was ramped from 15 mm/min to a final velocity of 40 mm/min (15 mm/min (0-5 mm), 30 mm/min (5-15 mm), 40 mm/min (15-end mm), with a combination of tool rotational speeds of 800, 1500 and 2000 rpm. Speed was gradually increased to avoid tool-pin fracture. The machine tilt angle was 0.1° and the dwell time was fixed to 3 seconds. Argon shielding gas was used during the friction stir welding of these beads in order to avoid oxidation of the base metal, as well as to prevent deterioration of the tool pin surface.

Tool axial force and torque were recorded using the machine built-in sensors as well as data recording system. Tool axial force and torque were recorded using the machine built-in sensors as well as data recording system. The data collected during the process was used to (1) study the effect of tool rotational speed on the dependent process parameters (i.e. tool axial load and torque), (2) find the relationship between weld quality (surface integrity) and load profiles, and (3) estimate the heat input or line energy as shown in Eq. (5.1)

$$E = \frac{2pNT}{u(1+f)} \quad \text{Equation 5.1}$$

Where f is the tool/workpiece heat ratio, N is the tool rotational speed in rpm, is averaged measured tool torque in N·m, and u is the tool traverse speed (welding speed) in mm/sec. The tool/workpiece heat fraction f can be estimated using Bastier's model that describes one-dimensional steady-state heat transfer from a point heat source located at the interface of dissimilar metals presented in Eq. (5.2). See Bastier Maitoumam M h, Dang Van K, and Roger F., 2006, "Steady state thermo-mechanical modeling of friction stir welding", Science and Technology of Welding & Joining, 11, pp. 278-288, incorporated herein by reference in its entirety.

$$f = \frac{J_T}{J_W} = \sqrt{\frac{(krC_p)_T}{(krC_p)_W}} \quad \text{Equation 5.2}$$

where k is the thermal conductivity, $\rho$ is the density, and $C_p$ is the specific heat. Subscripts T and W indicates tool and workpiece, respectively.

In order to perform microstructural, microhardness and chemical analysis and investigate the effect of tool rotational speed on weld quality, fabricated beads were transversely sectioned in zones where final welding speed (40 mm/min) was achieved. Samples were mounted, grinded, polished and etched using 2% Nital solution to examine microstructural features and then perform microhardness measurements.

Optical magnifier was also utilized to study the nugget soundness of the developed bead by revealing the processed zone and developed volumetric defects if any. Optical microscopy analysis of the bead sections was conducted at different magnifications in order to investigate the microstructural details of the developed bead zones. Microhardness of bead was measured using Vickers microhardness tester. The indenter load was set at 300 g for a period of 15 seconds. The hardness was measured across the bead and the depth from the bead's centerline. Moreover, spectroscopy analysis was performed to study the chemical composition in the processed zone, and to understand the effect of tool rotational speed on tool diffusion wear.

Figure 51:
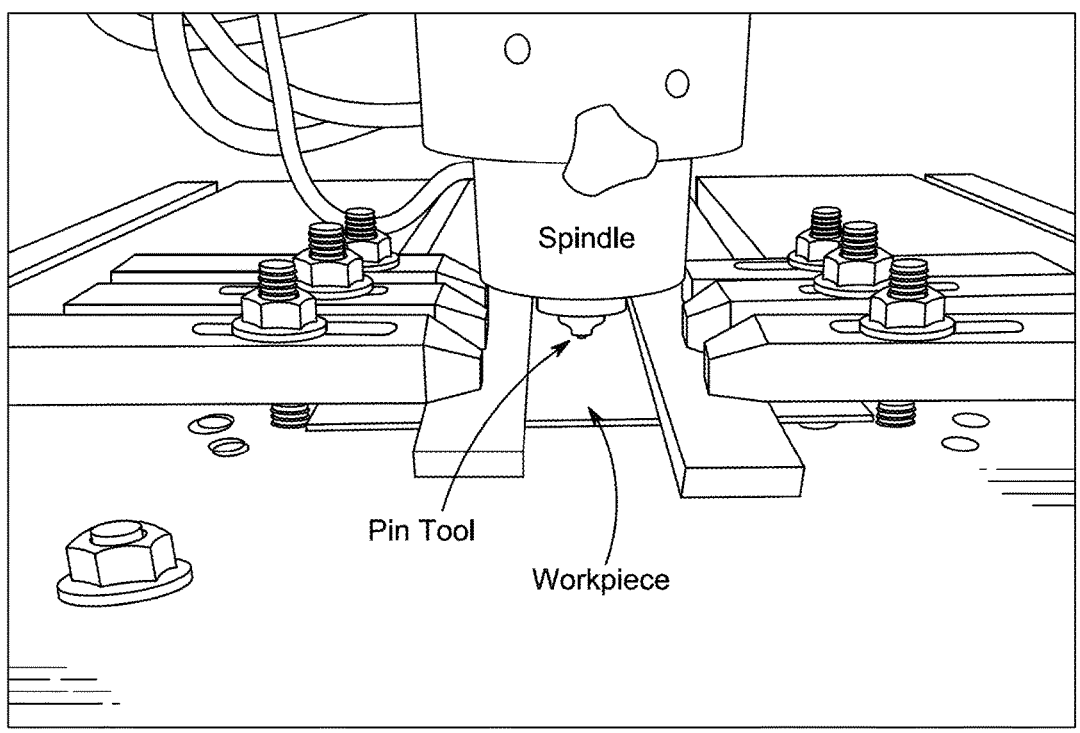
FIG. 51 is an image of a friction stir welding setup.

The setup for workpiece fixture shown in FIG. 51 consists of backing plate for supporting the workpiece fixture, clamps and screws for holding the workpiece. Argon shielding gas was used to avoid the oxidation of the base metal at high temperature developed during the process.

The spindle and the tool were cooled by ethylene glycol coolant to avoid the overheating of the tool assembly. Loads profiles were recorded at different welding conditions. They were found to be strongly coupled to bead surface quality.

EXAMPLE 8

Development and Characterization of FSW Bead-on-Plate (BoP)

Influence of Rotational Speed on Bead Quality and Reaction Loads

FIGS. 52A, 52B, 52C, 53A, 53B, 53C, 54A, 54B, 54C, 56, and 57 show developed beads surface, with measured tool reaction loads at process conditions mentioned in the previous section. It can be seen from recorded tool loads that steadiness of tool axial force and torque indicated a stabilized process, which is reflected on bead surface quality (FIGS. 52A, 52B, 52C, 54A, 54B, and 54C). Tool axial force and torque-displacement profiles were found to be strongly coupled to bead surface quality. As mentioned previously, three different tool rotational speeds were investigated in this work. Three beads were produced at 800 rpm, shown in FIGS. 52A, 52B, 52C, 53A, 53B, 53C, 54A, 54B, and 54C, while 2 more samples produced at 1500, and 2000 rpm shown in FIG. 56 and FIG. 57 respectively.

Although the same welding conditions were used for the first three beads, some discrepancies in outcome findings were observed. They were brought by material build-up on the tool shoulder and pin. In. FIGS. 52A, 52B, and 52C, the trend of the performed welding indicated a uniform pattern in the beginning. After the tool traveled a distance of 50 mm, fluctuations in torque and axial force accompanied with repeated pattern surface defect were noticed as indicated by the dashed circle.

After welding, the tool was examined by visually and Scanning Electron Microscope SEM as shown in FIGS. 55A and 55B. Visual inspection shows large amount of steel deposition accumulated on the tool. The deposited steel resulted in creating an eccentric tool profile. The tool with built-up (or accumulated debris) was used to produce the second bead shown in FIG. 55C. Uniform (repeated) surface defects pattern was obtained at every shoulder advancement (10 mm). These defects were accompanied by fluctuations in tool loads. Surface defect were similar to those formed at the end of the first bead in FIGS. 52A, 52B, 52C.

Similar deposition was found on the tool after completion of the second bead, which support that the formed surface defects were resulted from the tool built-up. To remove the deposited material (built-up), a small bead was intentionally produced with larger over plunging depth, in order to increase the process temperature. As a result, a clean tool surface emerged. Using the clean tool a third bead was produced with a smooth and defect free surface manifesting a stable tool reaction loads as shown in FIGS. 54A, 54B, and 54C.

The built-up of working material on the tool is extremely critical; as it modifies the tool profile that may result in reducing the weld quality. However, there are many parameters that control the work material build-up; namely, the tool temperature and its surface condition. Enhancing the tool surface quality may reduce the problem of the build-up material.

Figure 56:
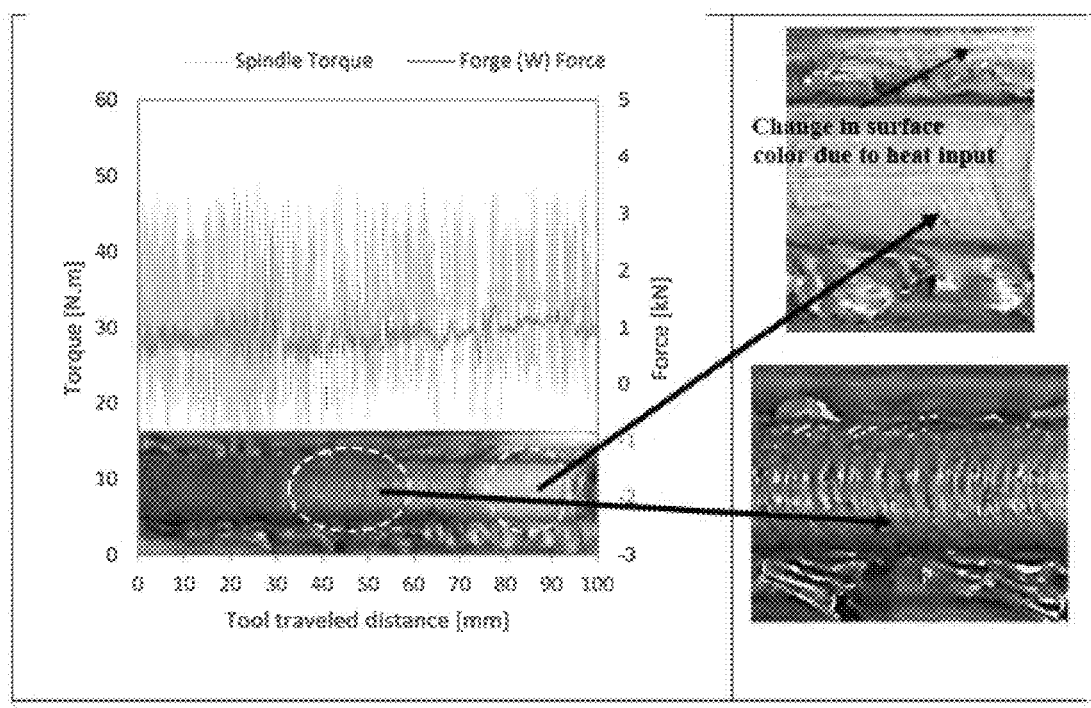
FIG. 56 represents a forge force and a spindle torque of the friction stir welding setup and corresponding weld beads, at a shaft rotational speed of 1500 rpm, a welding speed of 15 to 40 mm/min, and a plunging depth of 1.65 mm.
Figure 57:
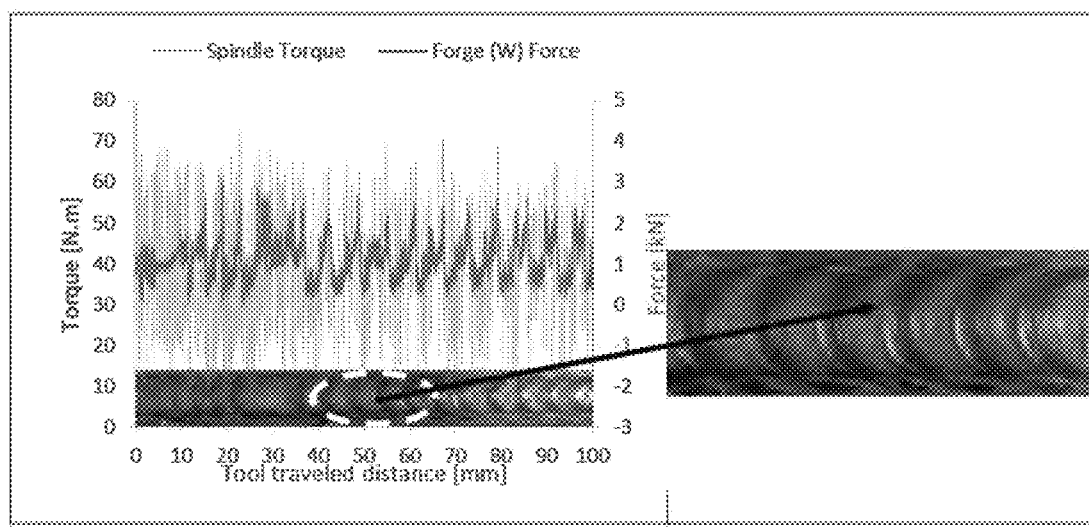
FIG. 57 represents a forge force and a spindle torque of the friction stir welding setup and corresponding weld beads, at a shaft rotational speed of 2000 rpm, a welding speed of 15 to 40 mm/min, and a plunging depth of 1.65 mm.

Increasing the tool rotational speed from 800 to 1500 rpm and then to 2000 rpm resulted in excessive fluctuations in tool reaction loads, with an increase in peak-to-peak axial force and torque values (FIG. 56 and FIG. 57). Fluctuations in torque could be attributed to the stick slip action between the tool and the workpiece. Bead surface pattern produced at rotational speed of 1500 rpm was not uniform. It can be seen from FIG. 56 that a smoother surface was generated at the end of the bead, with signs of excessive heat input (change in surface colors) at the bead sides (FIG. 56).

Moreover, the formed flash was larger and thicker as compared to other performed bead. At 2000 rpm, the generated bead surface shows repeated patterns of shoulder marks (FIG. 57). It may indicate that tool-machine dynamic characteristics play a role in identifying optimum process conditions and controlling joint and surface quality. From the obtained tool load-displacement results and bead surface images, it can be concluded that a more stable process could be achieved with better surface finish and smaller shoulder marks at lower tool rotational speeds. However, risk of material build up is more susceptible to occur in this case.

In welding, heat input or line energy is considered one of most important parameters that may affect weld quality. It is always preferable to perform welding at low heat input in order to avoid temperature related problems and defect, for example, residual stresses. Using the average recorded tool torque and rotational speeds together with Equations and (5.2), the line energy was calculated and presented in Table 5 along with measured tool reaction loads. From Table 5, the average recorded spindle torque in all beads was found to fall in the range of 30 and 40 N·m. Varying the tool rotational speed did not result in major changes in average torque, but it exhibited excessive fluctuations in tool loads, as mentioned previously. On the other hand, recorded axial force was found to decrease with increasing the tool rotational speed, where the average axial force was about 2500 N at 800 rpm. However, at higher rotational speeds (1500, 2000 rpm) it was dropped to 1000 N, but the heat input had increased.

TABLE 5

Average recorded tool reaction loads and calculated heat input.

| Tool Rotational Speed [rpm] | Average Tool Axial Force [N] | Average Tool Torque [N · m] | Average Heat Input [kJ/mm] | Maximum Tool Torque [N · m] |
|---|---|---|---|---|
| 800 | 2443 | 41 | 1.8 | 41.7 |
| 1500 | 945 | 33 | 2.8 | 49 |
| 2000 | 1095 | 39 | 4.4 | 69 |

Influence of Tool Rotational Speed on the Microstructure

Figure 58A:
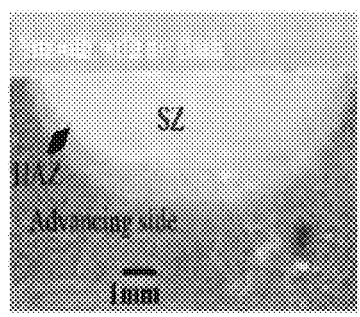
FIG. 58A is an optical image of a weld bead after a friction stir welding process at a shaft rotational speed of 800 rpm.
Figure 58B:
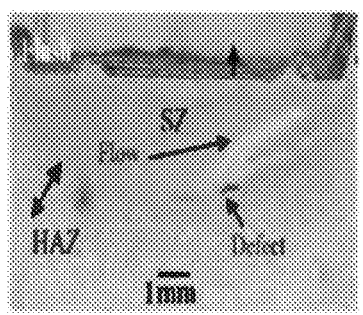
FIG. 58B is an optical image of a weld bead after a friction stir welding process at a shaft rotational speed of 1500 rpm.
Figure 58C:
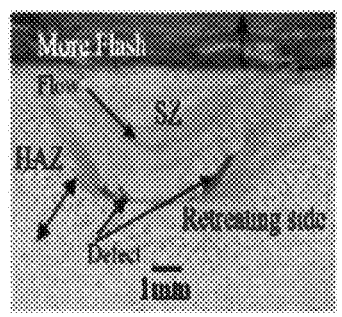
FIG. 58C is g optical image of a weld bead after a friction stir welding process at a shaft rotational speed of 2000 rpm.

FIGS. 58A, 58B, and 58C show cross sections of the produced beads captured using optical magnifier. Beads were sectioned at locations where steady state condition was achieved (at welding speed of 40 mm/min) in order to study the impact of the tool rotational speed alone on the quality of the nugget. Optical magnifier and optical microscope were used to examine the different developed microstructural zones, material flow, and volumetric defects. At 800 rpm a sound bead was developed with no visible defect as shown in FIG. 58A. Moreover, material flow contours were not visible. The welding process conditions may have resulted in a stable process for this bead. At higher rotational speeds, however, root defects in the nugget were observed, as shown in FIG. 58B and FIG. 58C. These defects may have been developed because of insufficient material flow at the tip of the tool pin. It can also be noticed that flow lines are more visible, due to excessive interruption in metal flow, which was also reflected on measured tool torque and axial force.

The nugget produced at low rotational speed has better smooth bead formation with small Heat Affected Zone (HAZ) due to stable and optimized process conditions. On the other hand, the nugget developed at high rotational speed (1500 and 2000 rpm) showed defects in the stir zones (SZ) below the tool pin toward the retreating side. The HAZ was about 0.9 mm in width for 800 rpm whereas it was found to be 1.8 mm for 1500 rpm and 2.4 mm wide for 2000 rpm. Similar behavior was reported in another study for welding speed used in tube-tubesheet welds where they found that increasing welding speed increases the size of the void formed in the nugget.

In all beads, the HAZ in the advancing side was wider as compared to the retreating side. This could be attributed to the asymmetry in temperature distribution about the weld centerline, as the temperatures at the advancing side are higher than those of the retreating side. Moreover, HAZ was also found in wider at high rotational speeds as compared to lower ones. This was expected due to the increase in heat input. It was also evident that there is change in color around the bead indicating larger HAZ area around the nugget.

Figures 59A, 59B, 59C:
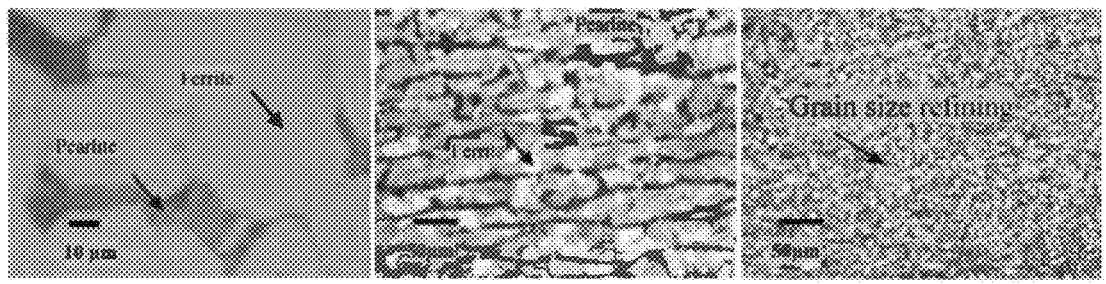
FIG. 59A is an optical image of a weld bead after a friction stir welding process at a shaft rotational speed of 800 rpm.
FIG. 59B is a magnified optical image of a weld bead after a friction stir welding process at a shaft rotational speed of 800 rpm.
FIG. 59C is a magnified optical image of a weld bead near the stir zone, after a friction stir welding process at a shaft rotational speed of 800 rpm.

Optical micrographs of the weld beads were examined at different regions of the bead to assess the effect of the pin tool rotation speed on microstructural features. FIGS. 59A, 59B, and 59C shows the optical images of the base metal and friction stirred bead produced at 800 rpm. FIGS. 59A and 59B depict the optical microscopic images of the parent metal, showing typical distinct phases of ferrite and pearlite. The as-received base metal exhibited a microstructure of ferrite grains approximately 20 to 30 μm in diameter ad smaller grains of fine pearlite. Grain size refining was observed in the SZ at all welding conditions and in all weld beads.

At 800 rpm tool rotation speed, equiaxed grains of almost 5 μm were generated as a result of thermomechanical actions during the welding process as shown in FIG. 59C. When the rotational speed is increased to 1500 rpm, the grain-coarsening took place, which could be attributed to the increase in temperature and hence to increase in heat input. Further increase in rotation speed to 2000 RPM resulted in higher temperature softening and grain coarsening as compared to 1500 rpm conditions. The obtained results also confirm that axial forces were found to decrease with the increase of rotational speed resulting in a softening of the workpiece which is attributed to grain coarsening. Intense plastic deformation and heat input have resulted in recrystallization of the bead nugget at all investigated welding conditions. The recrystallization of the SZ produced fine grain microstructure, which is of significant importance in post-weld hardness.

Figure 60A:
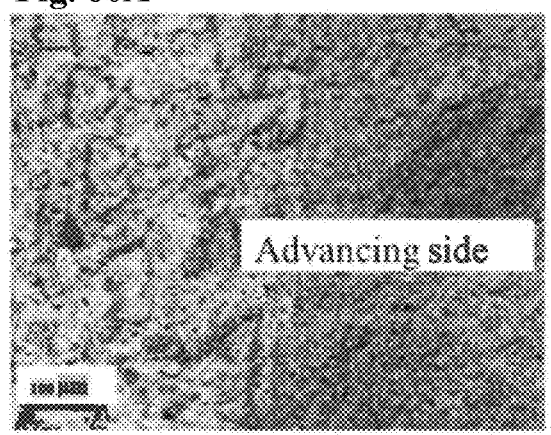
FIG. 60A is an optical image of a weld bead near the heat affected zone, after a friction stir welding process at a shaft rotational speed of 800 rpm.
Figure 60B:
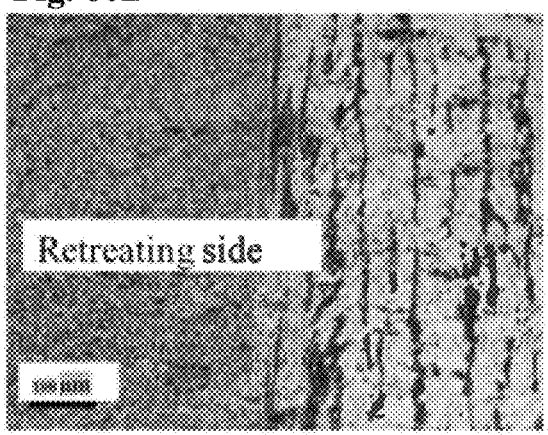
FIG. 60B is an optical image of a weld bead near the heat affected zone, after a friction stir welding process at a shaft rotational speed of 800 rpm.
Figure 60C:
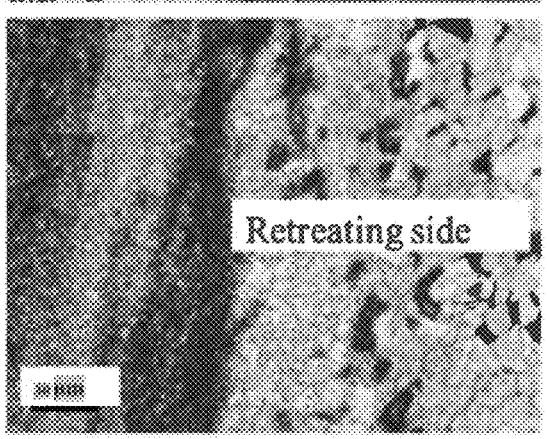
FIG. 60C is an optical image of a weld bead near the heat affected zone, after a friction stir welding process at a shaft rotational speed of 1500 rpm.
Figure 60D:
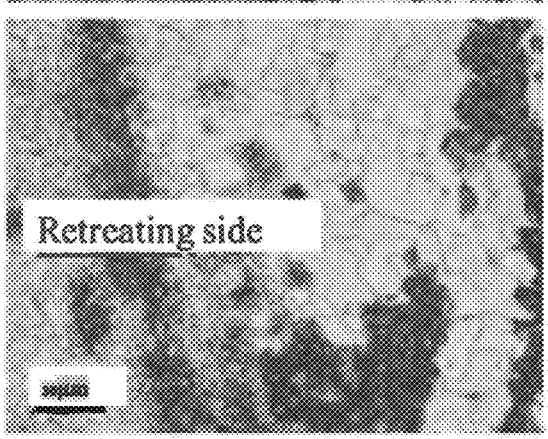
FIG. 60D is an optical image of a weld bead near the heat affected zone, after a friction stir welding process at a shaft rotational speed of 2000 rpm.

FIGS. 60A, 60B, 60C, and 60D show microstructurally distinct regions namely SZ along the bead centerline, HAZ around the SZ of the beads. No TMAZ (Thermomechanical Affected Zone) was seen in the steel beads, which is unlike to aluminium alloys. In FIG. 60A, ferrite and pearlite on the advancing side were partially dissolved showing no distinct phases of ferrite and pearlite due to higher temperature on the advancing side. At higher rotational speed, however, more grain coarsening was observed in the HAZ region adjacent to SZ as shown in FIGS. 60C and 60D. It is believed that temperature of the SZ is greater than that of the HAZ. Normally FSW processes of steel generates temperature around 1200° C. See G. E. Linnert, "Welding Metallurgy: Carbon and Alloy Steels" American Welding Society. 3rd ed., Vol. 2. pp. 312-325, 1967, incorporated herein by reference in its entirety.

The HAZ has no apparent deformation during FSW. Therefore, microstructural evolution in the various regions of the HAZ of the steel can be compared to Fe—Fe3C phase diagram. It was also reported that grain coarsened region of HAZ experienced the highest temperature and results of the some other researcher showed that temperature is above A3 line temperature in the phase diagram meaning that the grain growth of the austenite will be inevitable. See T. H. Courtney, "Mechanical Behavior of Materials". pp. 309-317. New York. N.Y: McGraw-Hill, 1990, incorporated herein by reference in its entirety. Existence of any TMAZ was probably lost due to decomposition of austenite during cooling.

The microstural investigation of the SZ is not an easy task as it is depicted in HAZ. It is also worth mentioning that microstural evolution in FSW of steel is consistent with continuous cooling curve of the arc welding of similar steels. See K. E. Hughes, K. D. Nair, and C. M. Sellars, "Temperature and flow stress during hot extrusion of steel" Metals Technology, Vol. 1(4), 161-169,1974, incorporated herein by reference in its entirety. In fact, the HAZ bears only a thermal cycle, whereas the SZ experiences both thermal and mechanical cycles so both processes will be considered to discuss the evolution of phases in the SZ. Actually during FSW of steel, dynamic recovery, dynamic recrystallization, and metadynamic recrystallization in those regions, which are near the tool shoulder that bears large strain near the surface. See W. M. Thomas, P. L. Threadgill, and E. D. Nicholas, "Feasibility of friction stir welding of steel" Science and Technology of Welding and Joining 4(6): 365-372. 1999, incorporated herein by reference in its entirety. Large strain will increase the grain size refinement. Therefore, the SZ will experience an increase in grain size refinement as compared to other bead zones. For the remaining zones including the bottom of the bead, they will experience lower strain and slow cooling rates resulting in an increase in grain coarsening.

Influence of Tool Rotational Speed on Bead Microhardness

Figure 61:
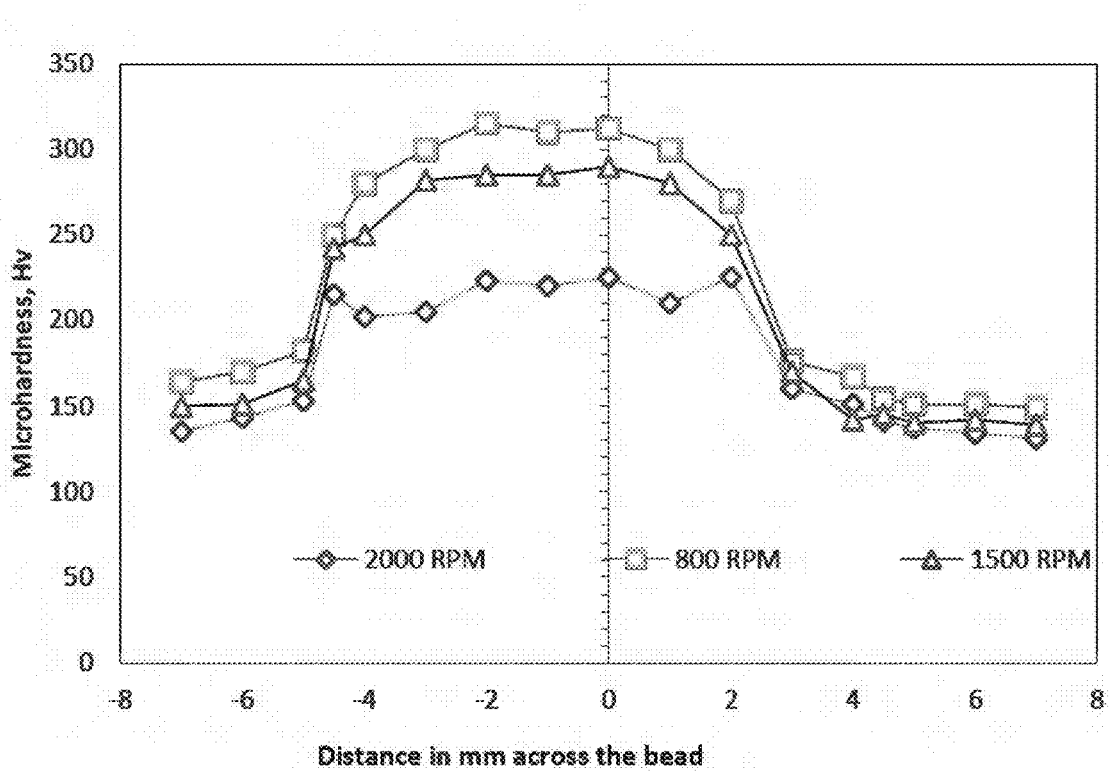
FIG. 61 represents a microhardness across the weld bead at different shaft rotational 20 speeds.

FIG. 61 shows hardness of beads produced at different rotational speeds and constant welding speed of 40 mm/min. The hardness of the base metal was 135±3 VHN. Microhardness of the SZ portion of the weld bead was found to be greater than those of the surrounding zones including the BM and the HAZ. This was expected due to the grain size refinement that resulted from thermomechanical cycles in the SZ. The highest microhardness values were obtained at 800 rpm. Microhardness values ranges from 275-310 VHN for 800 rpm. The increase in hardness values could be attributed to refined microstructure. Moreover, lower rotational speed will generate lower temperature that will prevent grain growth. At higher rotational speed (2000 rpm), however, grain coarsening occurred and hardness decreased drastically. Hardness values recorded in the SZ were found to vary from 200 to 240 VHN.

Figure 62:
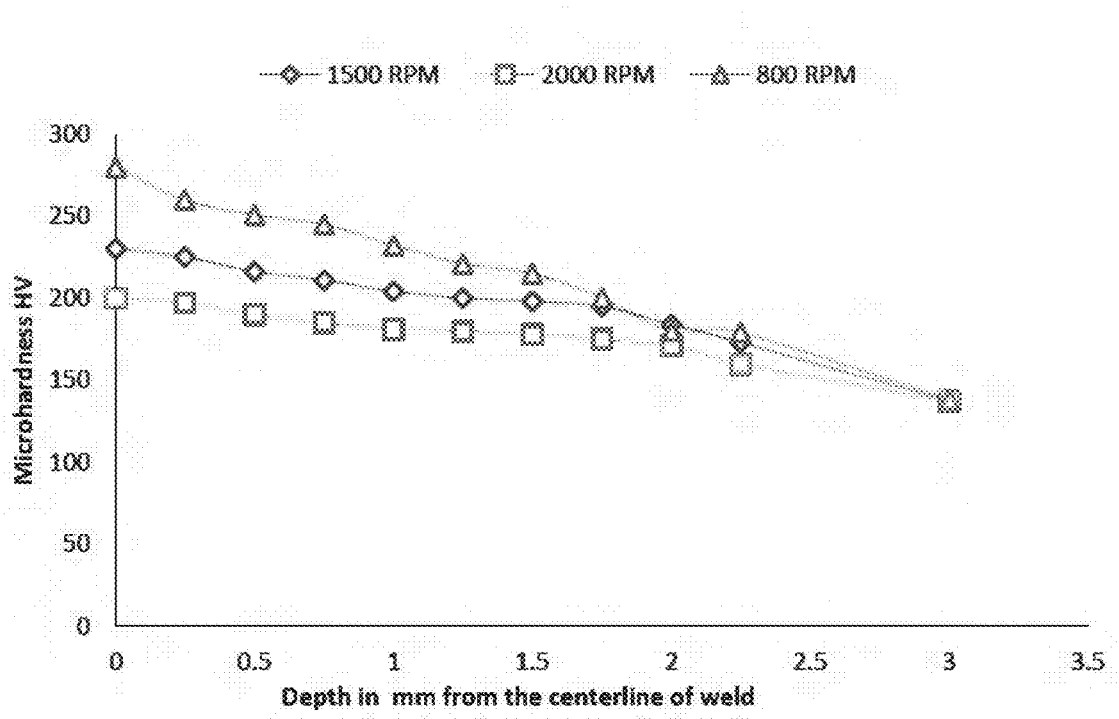
FIG. 62 represents a microhardness along a depth of the weld bead at different shaft rotational speeds.

Similar observations were found by A. Pradeep and S. Muthukumaran. See A. Pradeep, S. Muthukumaran, "Two modes of metal transfer phenomenon in friction stir welding of low alloy steel plates" Proceedings of the 1st International Joint Symposium on Joining and Welding, Pages 305-312, 2013, incorporated herein by reference in its entirety. Same trends were observed when hardness analysis was conducted along the depth of the bead as shown in FIG. 62. Microhardness values decrease from top to bottom of the bead. Higher hardness at top surface could be attributed to high strain and high cooling rates due to direct contact of tool shoulder with the workpiece. The remaining regions were having lower hardness due to low strain and cooling rates.

Influence of Tool Rotational Speed and Travel Distance on Tool Wear

Figure 63:
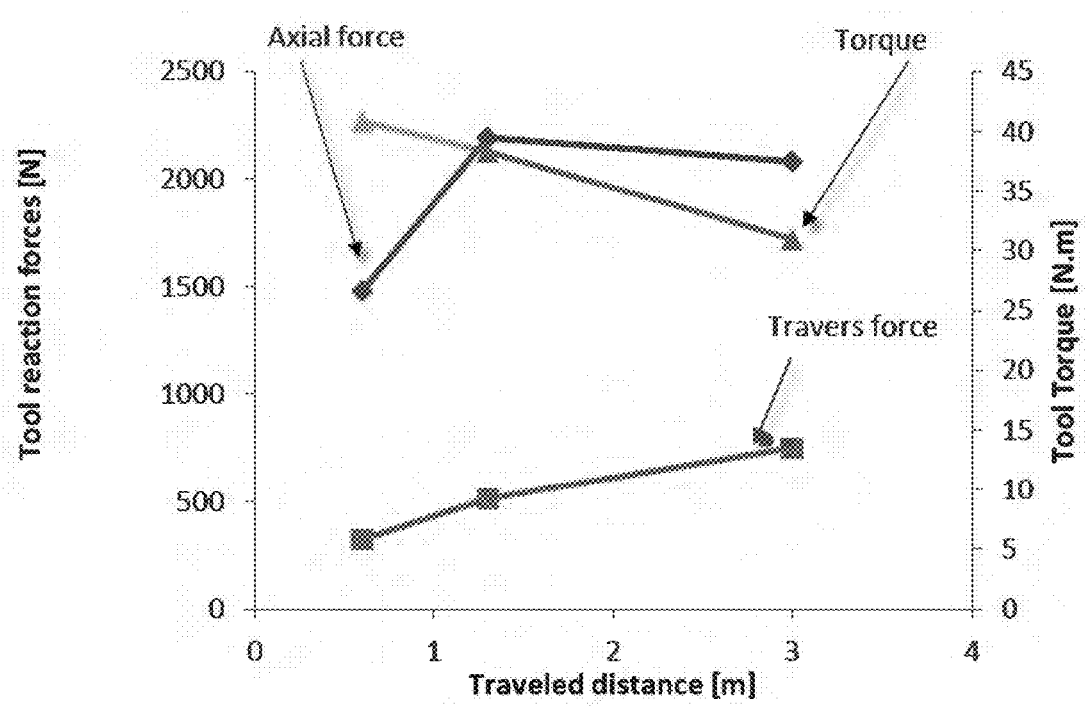
FIG. 63 represents an effect of tool travel distance on the tool axial and traverse forces and spindle torque.

The W-25% Re tool under investigation has traveled almost 3.5 m, and performed over 50 plunges. The tool pin plunging depth was initially 1.60 mm, and after traveling for more than 3 meters, the plunging depth increased to about 2.2 mm, this is due to changes in the diameters and lengths of the shoulder and pin. FIG. 63 shows the average values of the axial force, traverse (welding) force, and torque on the travel distance, i.e. the length of the beads made by the tool, when friction steel welding the steel plates at welding speed of 40 mm/min and spindle rotation of 800 rpm. The rotational speed is proportional to the tool life in service. The FIG. 63 indicates that traverse (welding) force increases with the tool life whereas the torque decreases with the increase in tool life. This is due to the wear and mechanical deformation of the pin tool.

Table 6 shows chemical analysis of the base metal and weld bead used in the present work. The analysis of the base metal shows that it has typical mild steel composition. The chemical analysis was performed using spectrometer. The analysis was conducted to study and understand the effect of rotational speed on tool wear. The analysis of the base metal shows that it has 0.0209 wt % tungsten.

Figure 64:
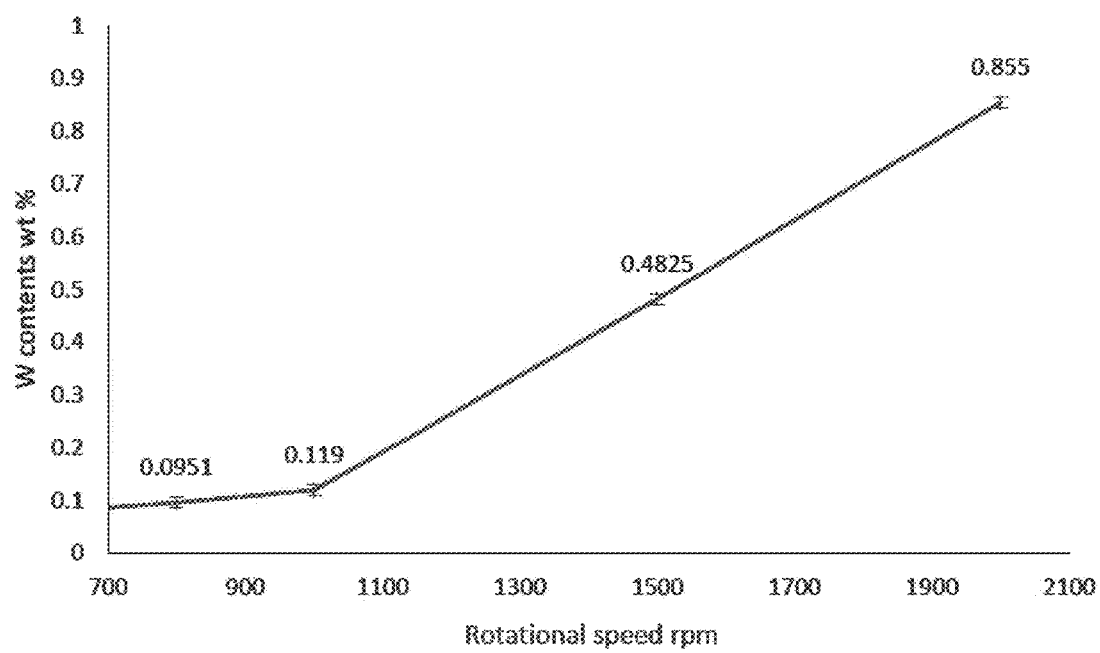
FIG. 64 represents an effect of the shaft rotational speed on a diffusion of tungsten from the tool to the weld bead.

FIG. 64 shows the graph for the corresponding Table 6. It is noticed that increasing the rotational speed resulted in an increase in the Tungsten contents of the weld bead. This phenomenon could be attributed to the rise in temperature with the increase of rotational speed. As a result, more diffusion of tool material to the weld nugget is obtained.

TABLE 6

Spectroscopy analysis of the bead developed

| Specimens | wt % C | wt % Si | wt % Mn | wt % P | wt % S | wt % W |
| --- | --- | --- | --- | --- | --- | --- |
| Base Metal | 0.244 | 0.241 | 1.09 | 0.011 | 0.008 | 0.0209 |
| 800 RPM | 0.261 | 0.200 | 0.912 | 0.0053 | 0.0031 | 0.0951 |
| 1000 RPM | 0.294 | 0.263 | 0.912 | 0.0077 | 0.0048 | 0.119 |
| 1500 RPM | 0.250 | 0.225 | 0.917 | 0.0081 | 0.0057 | 0.4825 |
| 2000 RPM | 0.264 | 0.238 | 0.909 | 0.0062 | 0.0048 | 0.855 |

FIGS. 65A and 65B show the initial tool tip pin and shoulder length. Overall, the tool had experienced severe conditions of fluctuating forces and higher thermal input which resulted in wear out and plastic deformation of the tool shoulder and pin. After covering a 3.5 m distance in more than 50 plunges, the tool shoulder shank deformed significantly as it was shortened by 0.8 mm as shown in FIG. 65A (right image) after the tool had traveled an accumulative welding distance of 3.5 meter. It is well known that tool shoulder is mainly responsible for the frictional heat generation. Therefore, it is subjected to severe thermal and mechanical harsh conditions of FSW. It can be seen that the length of the pin increased by 0.6 mm as shown in FIG. 65B (right image).

This change in length is due to the wear of the tool shoulder shank and the effects of competing mechanical deformation mechanisms acting on the pin tool. By calculating the tool pin and shoulder shank volume for the tool in its initial use and after 3 m of welding, it was found that the tool pin shoulder volume dropped by 40%. Similar observations on excessive wear of W-25% Re tool were reported by Shuaib et al. where it was stated that abrasion wear was the main wear mechanism. In addition, creep may also take place due to excessive process temperature while welding steel.

Table 7 shows the base line parameters which may be consulted for the newly developed nanocrystalline tool.

TABLE 7

Base line parameters obtained during the FSW of mild steel

| Category | Parameter/Process | Category | Parameter/Process |
| --- | --- | --- | --- |
| Process | FSW | Tool Material | W-25 wt % Re |
| Spindle rotational speed | 800 RPM | Materials Joined | ASTM A516 Grade 70 |
| Spindle tilt angle | 0.1° | Type of weld joint | Buttjoint |
| Dwell time | 3 sec | Control | Displacement control |
| Penetration depth | 1.6 mm | Torque | 40 N · M |

TABLE 7-continued

Base line parameters obtained during the FSW of mild steel

| Category | Parameter/Process | Category | Parameter/Process |
|---|---|---|---|
| Plunging rate | 5 mm/min | Forging force, Fz | 2500 N |
| Welding speed | 15 mm/min to 40 mm/min | Traverse forces, Fx and Fy | 400 N |
| Microhardness Hv | 286 ± 3 | Thermal conductivity | 45-50 Wm−1 k−1 |

It was shown that, by using a small pin tool, defect free bead-on plate, with good surface finish and intensive grain refinement was achieved at 800 rpm. Low rotational speeds are recommended for the newly developed tool. At high rotational speeds, grain growth occurs due to increase in temperature and consequently, axial force decreases. In HAZ, more grain growth was observed at high rotational speed. Furthermore, the spectroscopy results showed the presence of W in the weld bead in the range of 0.0951 to 0.855 wt %. This is due to tool material transfer to the weldment through competing wear mechanisms including diffusion, abrasion, and chipping. Shoulder of the tool was found to be more prone to wear compared to tool pin.

The wear of the tool shoulder could be attributed to abrasive wear (removal of material or thinning of shoulder height), adhesive wear (due to stick slip action during the FSW process) and diffusional wear (as indicated by the spectroscopy analysis of the beads).

The wear resistant of the tool materials can be improved by synthesizing them using a combination of novel techniques such MA and SPS. W-25% Re can be reinforced with HfC to improve the abrasive wear resistance. Tool life is depended on the tool degradation during friction stir welding. Metallurgical challenges which will affect tool life are crystallite size of the matrix, homogenous dispersion of second phase in the matrix. Nanocrystallinity of the alloy is difficult to retain by conventional consolidating techniques as it involves longer sintering duration. So these challenges are difficult to address by using these techniques. Therefore, the author proposes using such techniques as mechanical alloying and spark plasma sintering to prepare W—Re pin tools to overcome these challenges during welding steels.

EXAMPLE 9

Friction Stir Welding of Thin Mild Sheet

Friction Stir Spot Welding FSSW tests were also conducted on thin mild steel sheets by using disc shape nanocrystalline tool in order to investigate its feasibility for the process.

In order to evaluate the performance of the developed tool material under the harsh conditions of Friction Stir Spot Welding of steel, preliminary results are presented here. Fully alloyed W-25 wt % Re tool in cylindrical disc shape was used in Friction Spot Welding of 2 mm thin mild steel in order to confirm the soundness and suitability of tool for FSW of steel. AISI 4140 alloy steel holder was manufactured to grip the tool during the process. Fully instrumented MTI (Manufacturing Technology Inc.) Model RM-1 friction stir welding machine was used to perform the FSSW tests. Welding speed was 40 mm/min, with tool rotational speeds of 400, 500 and 600 rpm for all the experiments. The machine tilt angle was 0° and dwell time was fixed to 5 seconds. Argon gas was used as shielding gas during the friction stir welding in order to avoid the oxidation of the base metal as well as the surface of the tool. Temperature was recorded during the process using telemetry system installed with the set up.

Initially, fully alloyed W-25% Re disc sintered at 1800° C. was used as a tool to join the thin sheets. The disc type tool and the tool holder shank were manufactured in the machine lab as shown in FIGS. 66A, 66B, 66C, and 66D. A provision for the thermocouple in the tool holder was created near the tool surface for the measurement of temperature developed during the process. It was difficult to machine and grip the tool in machining set up as the tool was only 4 mm in height as presented in FIG. 66B. Milling operation was successful on composite disc containing 5 vol % HfC however it offered a resistance to machining due the presence of hard HfC particle as shown in FIG. 66E. Composite samples have also lower thermal conductivity as discussed in earlier section. Lower thermal conductivity of the tool can produce localized heating of the workpiece resulting in hotspot in the welds.

Figure 67A:
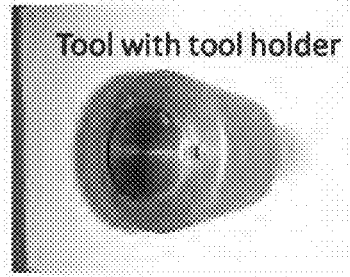
Figure 67B:
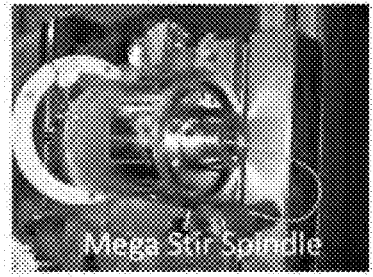
Figure 67C:
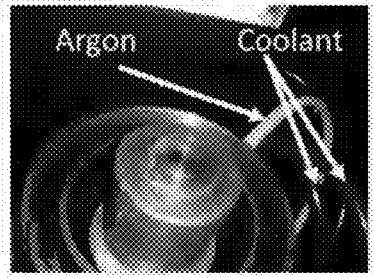

FIGS. 67A, 67B, and 67C show W-25% Re tool along with the tool holder assembly. The test was performed using a rotational speed of 400 rpm and with a welding speed of 40 mm/min.

Figure 67D:
Figure 67E:
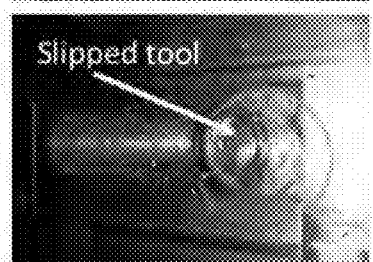
Figure 67F:
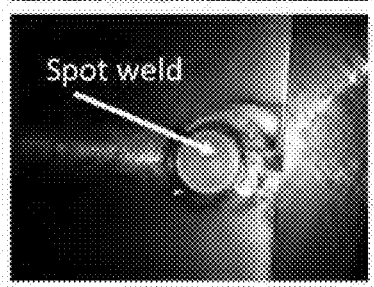

During this process tool holder became soft due to frictional heat between tool and workpiece and filially it deformed in later stages as shown in FIG. 67D. It happened because the tool holder was not at all heat treated and does not have sufficient strength to sustain the load during the process. It is also evident that the process did not develop the sufficient heat input in the early part of the experiment and the disc tool was slipped from the tool holder as shown in FIG. 67E, however, sufficient heat was generated at the end of the process to produce a spot weld as shown in FIG. 67F. Maximum temperature was recorded around 750° C. during the process. However during this severe damage of the tool holder, tool showed excellent resistance to any damage or wear except some slippage marks as shown in FIGS. 68A and 68B. Tool pin was 2 mm in height and it did not change after the experiment.

Friction Stir Spot Welding of Thin Mild Sheet

New tool holder was manufactured from AISI 4140 alloy steel. A heat treatment was performed on the tool holder to make it harder and stronger. Tool holder was heated at 845° C. (1550° F.) followed by quenching in oil. After hardening the alloy was given as tempering treatment to get an appropriate hardness of 54 HRC. The tool was retraced and machined with new geometry as shown in FIG. 69A. Friction Stir Spot Welding was performed on the workpiece with a rotational speed of 500 and 600 rpm as shown in FIGS. 69B and 69C. The process produced good quality spot welds. Spot weld 1 was performed with a rotational speed of 600 rpm that shows a wider heat affected zone when compared to spot weld 2 produced at 500 rpm. There were no visible defects in weld zones. The tool showed an excellent resistance to any physical or dimensional changes after these tests.

Optical Microscopy

FIGS. 70A, 70B, and 70C show the optical image of the base metal and nugget junction of friction stir weld produced at 600 rpm. Parent base mild steel shows typical distinct phases of ferrite and pearlite. Grain size refining was observed in the SZ which could be attributed to the increase in temperature during the process as shown in FIGS. 70B and 70C. The process temperature of SZ must be in austenitic zone of Fe—Fe carbide diagram in order to justify the grain size refining phenomenon.

FIGS. 71A and 71B show cross sections of the spot weld produced at rotational speed of 500 and 600 rpm respectively. Both conditions produced sound weld cross sections with no visible defect. It was also observed that HAZ was in large spread for FSW spot welded at 600 rpm compared to 500 rpm.

FIG. 72 shows the effect of rotational speed on the diffusion of W contents into the weld. It can be pointed out that when the rotational speed was increased, relatively increase in tungsten contents was observed in the base metal. This phenomena was attributed to the increase in temperature with the increase of rotational speed and hence more diffusion of the tool material to the base metal.

The invention claimed is:

1. A method of making a welding article, wherein the welding article is a friction stir welding tool having a cylindrical, conical or triangular tip, and a shoulder, comprising:
    forming a composite of a ball-milled tungsten-rhenium alloy and hafnium carbide particles, by:
        ball-milling a tungsten-rhenium alloy for no more than 25 hours to forma first powder, wherein a concentration of rhenium is in the range of 20 to 30 wt %, relative to the total weight of the tungsten-rhenium alloy;
        mixing hafnium carbide particles with the first powder to form a second powder, wherein a concentration of hafnium carbide particles in the second powder is in the range of 1 to 15 vol %, relative to the total volume of the second powder;
        ball-milling, with tungsten carbide balls in a tungsten carbide vial, the second powder for no more than 15 hours to form a third powder; and
        spark-plasma-sintering the third powder at a temperature of 1500 to 2000° C. for no more than 10 minutes to foam the composite of the ball-milled tungsten-rhenium alloy and hafnium carbide particles, wherein the ball-milled hafnium carbide particles are dispersed within the ball-milled tungsten-rhenium alloy, and wherein the ball-milled tungsten-rhenium alloy has a crystallite size of no more than 100 nm;
    coating the composite with a lubricant; and then
    extruding the composite to form the friction stir welding tool.

2. The method of claim 1, wherein the third powder is compacted with a pressure of 40 to 60 MPa during the spark-plasma-sintering.

3. The method of claim 1, wherein the tungsten-rhenium alloy is ball-milled in an inert atmosphere with a milling speed of 200 to 300 rpm, wherein a ball-to-powder weight ratio is in the range of 6:1 to 10:1.

4. The method of claim 1, wherein the second powder is ball-milled in an inert atmosphere with a milling speed of 100 to 200 rpm, wherein a ball-to-powder weight ratio is in the range of 4:1 to 6:1.

5. The method of claim 1, wherein, the lubricant is at least one selected from the group consisting of a colloidal graphite, glass powder, a silica particle, a silicon adhesive and combinations thereof.

* * * * *